US012739581B2

(12) United States Patent
Hartung et al.

(10) Patent No.: US 12,739,581 B2
(45) Date of Patent: Sep. 15, 2026

(54) CALIBRATION BASED ON AUDIO CONTENT

(71) Applicant: Sonos, Inc., Santa Barbara, CA (US)

(72) Inventors: Klaus Hartung, Boston, MA (US); Dayn Wilberding, Portland, OR (US)

(73) Assignee: Sonos, Inc., Santa Barbara, CA (US)

( * ) Notice: Subject to any disclaimer, the term of this patent is extended or adjusted under 35 U.S.C. 154(b) by 196 days.

(21) Appl. No.: 18/502,349

(22) Filed: Nov. 6, 2023

(65) Prior Publication Data

US 2024/0171923 A1 May 23, 2024

Related U.S. Application Data

(63) Continuation of application No. 18/058,659, filed on Nov. 23, 2022, now Pat. No. 11,818,553, which is a (Continued)

(51) Int. Cl.
*H04R 29/00* (2006.01)
*H04R 5/02* (2006.01)
(Continued)

(52) U.S. Cl.
CPC ............. *H04R 29/007* (2013.01); *H04R 5/02* (2013.01); *H04R 27/00* (2013.01); *H04S 7/301* (2013.01);
(Continued)

(58) Field of Classification Search
CPC ........ H04R 29/007; H04R 5/02; H04R 27/00; H04R 3/00; H04R 2227/003;
(Continued)

(56) References Cited

U.S. PATENT DOCUMENTS 4,306,113 A 12/1981 Morton
4,342,104 A 7/1982 Jack
(Continued)

FOREIGN PATENT DOCUMENTS

CN 1369188 A 9/2002
CN 1447624 A 10/2003
(Continued)

OTHER PUBLICATIONS

Excerpts from Morfey, Christopher L., Dictionary of Acoustics. Copyright 2001, 4 pages [produced by Google in IPR of U.S. Pat. No. 9,219,460, IPR2021-00475 on Feb. 5, 2021].
(Continued)

*Primary Examiner* — Mark Fischer
(74) *Attorney, Agent, or Firm* — FORTEM IP LLP

(57) ABSTRACT

Example techniques may involve multiple calibrations for a playback device. In an example implementation, a playback device plays back audio content according to a first calibration via the one or more audio amplifiers. The playback device detects that an arrangement of one or more listeners relative to the first playback device has changed from a first arrangement to a second arrangement. Based on detection that the arrangement of one or more listeners relative to the first playback device has changed from the first arrangement to the second arrangement, the playback device applies a second calibration to playback by the first playback device.

20 Claims, 20 Drawing Sheets

Related U.S. Application Data continuation of application No. 17/316,371, filed on May 10, 2021, now Pat. No. 11,516,612, which is a continuation of application No. 17/129,670, filed on Dec. 21, 2020, now Pat. No. 11,006,232, which is a continuation of application No. 16/944,884, filed on Jul. 31, 2020, now Pat. No. 11,184,726, which is a continuation of application No. 16/542,418, filed on Aug. 16, 2019, now Pat. No. 10,735,879, which is a continuation of application No. 16/011,402, filed on Jun. 18, 2018, now Pat. No. 10,390,161, which is a continuation of application No. 15/005,853, filed on Jan. 25, 2016, now Pat. No. 10,003,899.

(51) Int. Cl.
*H04R 27/00* (2006.01)
*H04S 7/00* (2006.01)
*H04R 3/00* (2006.01)

(52) U.S. Cl.
CPC .......... *H04R 3/00* (2013.01); *H04R 2227/003* (2013.01); *H04R 2227/005* (2013.01)

(58) Field of Classification Search
CPC ... H04R 2227/005; H04S 7/301; H04S 7/302; H04S 7/305
See application file for complete search history.

(56) References Cited

U.S. PATENT DOCUMENTS 4,504,704 A 3/1985 Ohyaba et al.
4,592,088 A 5/1986 Shimada
4,628,530 A 12/1986 Op De Beek et al.
4,631,749 A 12/1986 Rapaich
4,694,484 A 9/1987 Atkinson et al.
4,773,094 A 9/1988 Dolby
4,885,782 A 12/1989 Eberbach
4,995,778 A 2/1991 Bruessel
5,218,710 A 6/1993 Yamaki et al.
5,255,326 A 10/1993 Stevenson
5,323,257 A 6/1994 Abe et al.
5,386,478 A 1/1995 Plunkett
5,440,644 A 8/1995 Farinelli et al.
5,553,147 A 9/1996 Pineau
5,581,621 A 12/1996 Koyama et al.
5,586,172 A 12/1996 Sakurai et al.
5,717,768 A 2/1998 Laroche
5,754,774 A 5/1998 Bittinger et al.
5,757,927 A 5/1998 Gerzon et al.
5,761,320 A 6/1998 Farinelli et al.
5,857,172 A 1/1999 Rozak
5,910,991 A 6/1999 Farrar
5,923,902 A 7/1999 Inagaki
5,939,656 A 8/1999 Suda
6,018,376 A 1/2000 Nakatani
6,032,202 A 2/2000 Lea et al.
6,072,879 A 6/2000 Ouchi et al.
6,111,957 A 8/2000 Thomasson
6,256,554 B1 7/2001 DiLorenzo
6,363,155 B1 3/2002 Horbach
6,404,811 B1 6/2002 Cvetko et al.
6,469,633 B1 10/2002 Wachter
6,522,886 B1 2/2003 Youngs et al.
6,548,967 B1 4/2003 Dowling et al.
6,573,067 B1 6/2003 Dib-Hajj et al.
6,611,537 B1 8/2003 Edens et al.
6,631,179 B1 10/2003 Sifuentes
6,631,410 B1 10/2003 Kowalski et al.
6,639,989 B1 10/2003 Zacharov et al.
6,643,744 B1 11/2003 Cheng
6,704,421 B1 3/2004 Kitamura
6,721,428 B1 4/2004 Allred et al.
6,731,760 B2 5/2004 Pedersen
6,757,517 B2 6/2004 Chang
6,760,451 B1 7/2004 Craven et al.
6,766,025 B1 7/2004 Levy et al.
6,778,869 B2 8/2004 Champion
6,798,889 B1 9/2004 Dicker et al.
6,862,440 B2 3/2005 Sampath
6,916,980 B2 7/2005 Ishida et al.
6,931,134 B1 8/2005 Waller, Jr. et al.
6,985,694 B1 1/2006 De Bonet et al.
6,990,211 B2 1/2006 Parker
7,031,476 B1 4/2006 Chrisop et al.
7,039,212 B2 5/2006 Poling et al.
7,058,186 B2 6/2006 Tanaka
7,072,477 B1 7/2006 Kincaid
7,092,535 B1 8/2006 Pedersen et al.
7,092,537 B1 8/2006 Allred et al.
7,103,187 B1 9/2006 Neuman
7,130,608 B2 10/2006 Hollstrom et al.
7,130,616 B2 10/2006 Janik
7,143,939 B2 12/2006 Henzerling
7,187,947 B1 3/2007 White et al.
7,236,773 B2 6/2007 Thomas
7,289,637 B2 10/2007 Montag et al.
7,295,548 B2 11/2007 Blank et al.
7,312,785 B2 12/2007 Tsuk et al.
D559,197 S 1/2008 Lim et al.
7,391,791 B2 6/2008 Balassanian et al.
D575,801 S 8/2008 Kusano et al.
D582,429 S 12/2008 Kusano et al.
7,477,751 B2 1/2009 Lyon et al.
7,483,538 B2 1/2009 McCarty et al.
7,483,540 B2 1/2009 Rabinowitz et al.
7,489,784 B2 2/2009 Yoshino
7,490,044 B2 2/2009 Kulkarni
7,492,909 B2 2/2009 Carter et al.
7,519,188 B2 4/2009 Berardi et al.
7,529,377 B2 5/2009 Nackvi et al.
7,571,014 B1 * 8/2009 Lambourne ............ G06F 3/165 700/94
7,590,772 B2 9/2009 Marriott et al.
7,630,500 B1 12/2009 Beckman et al.
7,630,501 B2 12/2009 Blank et al.
7,643,894 B2 1/2010 Braithwaite et al.
7,657,910 B1 2/2010 McAulay et al.
7,664,276 B2 2/2010 McKee
7,676,044 B2 3/2010 Sasaki et al.
7,689,305 B2 3/2010 Kreifeldt et al.
7,697,701 B2 4/2010 Pedersen et al.
7,720,237 B2 5/2010 Bharitkar et al.
7,742,740 B2 6/2010 Goldberg et al.
7,769,183 B2 8/2010 Bharitkar et al.
7,792,311 B1 9/2010 Holmgren et al.
7,796,068 B2 9/2010 Raz et al.
7,835,689 B2 11/2010 Goldberg et al.
7,853,341 B2 12/2010 McCarty et al.
7,876,903 B2 1/2011 Sauk
7,925,203 B2 4/2011 Lane et al.
7,949,140 B2 5/2011 Kino
7,949,707 B2 5/2011 Mcdowall et al.
7,961,893 B2 6/2011 Kino
7,970,922 B2 6/2011 Svendsen
7,987,294 B2 7/2011 Bryce et al.
8,005,228 B2 8/2011 Bharitkar et al.
8,014,423 B2 9/2011 Thaler et al.
8,042,961 B2 10/2011 Massara et al.
8,045,721 B2 10/2011 Burgan et al.
8,045,952 B2 10/2011 Qureshey et al.
8,050,652 B2 11/2011 Qureshey et al.
8,063,698 B2 11/2011 Howard
8,074,253 B1 12/2011 Nathan
8,103,009 B2 1/2012 McCarty et al.
8,116,476 B2 2/2012 Inohara
8,126,156 B2 2/2012 Corbett et al.
8,126,172 B2 2/2012 Horbach et al.
8,131,390 B2 3/2012 Braithwaite et al.
8,139,774 B2 3/2012 Berardi et al.
8,144,883 B2 3/2012 Pdersen et al.
8,160,276 B2 4/2012 Liao et al.
8,160,281 B2 4/2012 Kim et al.

(56) References Cited

U.S. PATENT DOCUMENTS 8,170,260 B2 5/2012 Reining et al.
8,175,292 B2 5/2012 Aylward et al.
8,175,297 B1 5/2012 Ho et al.
8,194,874 B2 6/2012 Starobin et al.
8,229,125 B2 7/2012 Short
8,233,632 B1 7/2012 Macdonald et al.
8,234,395 B2 7/2012 Millington
8,238,547 B2 8/2012 Ohki et al.
8,238,578 B2 8/2012 Aylward
8,239,206 B1 8/2012 Lebeau et al.
8,243,961 B1 8/2012 Morrill
8,264,408 B2 9/2012 Kainulainen et al.
8,265,310 B2 9/2012 Berardi et al.
8,270,620 B2 9/2012 Christensen
8,279,709 B2 10/2012 Choisel et al.
8,281,001 B2 10/2012 Busam et al.
8,290,185 B2 10/2012 Kim
8,291,349 B1 10/2012 Park et al.
8,300,845 B2 10/2012 Zurek et al.
8,306,235 B2 11/2012 Mahowald
8,325,909 B2 12/2012 Tashev et al.
8,325,931 B2 12/2012 Howard et al.
8,325,935 B2 12/2012 Rutschman
8,325,944 B1 12/2012 Duwenhorst et al.
8,331,585 B2 12/2012 Hagen et al.
8,332,414 B2 12/2012 Nguyen et al.
8,340,975 B1 12/2012 Rosenberger
8,379,876 B2 2/2013 Zhang
8,385,557 B2 2/2013 Tashev et al.
8,391,501 B2 3/2013 Khawand et al.
8,392,505 B2 3/2013 Haughay et al.
8,401,202 B2 3/2013 Brooking
8,423,893 B2 4/2013 Ramsay et al.
8,433,076 B2 4/2013 Zurek et al.
8,452,020 B2 5/2013 Gregg et al.
8,463,184 B2 6/2013 Dua
8,483,853 B1 7/2013 Lambourne
8,488,799 B2 7/2013 Goldstein et al.
8,503,669 B2 8/2013 Mao
8,527,876 B2 9/2013 Wood et al.
8,577,045 B2 11/2013 Gibbs
8,577,048 B2 11/2013 Chaikin et al.
8,600,075 B2 12/2013 Lim
8,620,006 B2 12/2013 Berardi et al.
8,682,002 B2 3/2014 Wihardja et al.
8,731,206 B1 5/2014 Park
8,755,538 B2 6/2014 Kwon
8,762,156 B2 6/2014 Chen
8,798,280 B2 8/2014 Goldberg et al.
8,819,554 B2 8/2014 Basso et al.
8,831,244 B2 9/2014 Apfel
8,855,319 B2 10/2014 Liu et al.
8,862,273 B2 10/2014 Karr
8,879,761 B2 11/2014 Johnson et al.
8,903,526 B2 12/2014 Beckhardt et al.
8,914,559 B2 12/2014 Kalayjian et al.
8,930,005 B2 1/2015 Reimann
8,934,647 B2 1/2015 Joyce et al.
8,934,655 B2 1/2015 Breen et al.
8,942,252 B2 1/2015 Balassanian et al.
8,948,426 B2 2/2015 Thomasson et al.
8,965,033 B2 2/2015 Wiggins
8,965,546 B2 2/2015 Visser et al.
8,977,974 B2 3/2015 Kraut
8,984,442 B2 3/2015 Pirnack et al.
8,989,406 B2 3/2015 Wong et al.
8,995,687 B2 3/2015 Marino, Jr. et al.
8,995,688 B1 3/2015 Chemtob et al.
8,996,370 B2 3/2015 Ansell
9,002,024 B2 4/2015 Nakadai et al.
9,014,380 B2 4/2015 Gautama et al.
9,020,153 B2 4/2015 Britt, Jr.
9,021,153 B2 4/2015 Lu
9,042,556 B2 5/2015 Kallai et al.
9,047,857 B1 6/2015 Barton
9,065,929 B2 6/2015 Chen et al.
9,084,058 B2 7/2015 Reilly et al.
9,088,336 B2 7/2015 Mani et al.
9,094,768 B2 7/2015 LaBosco
9,100,766 B2 8/2015 Soulodre et al.
9,106,192 B2 8/2015 Sheen et al.
9,148,742 B1 9/2015 Koulomzin et al.
9,179,233 B2 11/2015 Kang
9,215,545 B2 12/2015 Dublin et al.
9,219,460 B2 12/2015 Bush
9,231,545 B2 1/2016 Agustin et al.
9,247,365 B1 1/2016 Ellis et al.
9,264,839 B2 2/2016 Oishi et al.
9,286,384 B2 3/2016 Kuper et al.
9,288,596 B2 3/2016 Gossain et al.
9,288,597 B2 3/2016 Carlsson et al.
9,300,266 B2 3/2016 Grokop
9,307,340 B2 4/2016 Seefeldt
9,319,816 B1 4/2016 Narayanan
9,332,371 B2 5/2016 De Bruijn
9,348,824 B2 5/2016 Coburn, IV
9,355,555 B2 5/2016 Reichert et al.
9,398,392 B2 7/2016 Ridihalgh et al.
9,401,058 B2 7/2016 De La Fuente et al.
9,431,021 B1 8/2016 Scalise et al.
9,431,029 B2 8/2016 Yook et al.
9,438,996 B2 9/2016 Maher et al.
9,451,377 B2 9/2016 Massey et al.
9,456,279 B1 9/2016 Murdoch
9,462,399 B2 10/2016 Bharitkar et al.
9,467,779 B2 10/2016 Iyengar et al.
9,472,201 B1 10/2016 Sleator
9,473,207 B2 10/2016 McCormack et al.
9,489,948 B1 11/2016 Chu et al.
9,491,499 B2 11/2016 Wagenaar et al.
9,516,444 B2 12/2016 Riggi et al.
9,524,098 B2 12/2016 Griffiths et al.
9,538,305 B2 1/2017 Lehnert et al.
9,538,308 B2 1/2017 Isaac et al.
9,544,701 B1 1/2017 Rappoport
9,560,449 B2 1/2017 Carlsson et al.
9,560,460 B2 1/2017 Chaikin et al.
9,569,073 B2 2/2017 Tan
9,575,615 B1 2/2017 Nicholls et al.
9,584,915 B2 2/2017 Fullam et al.
9,596,531 B1 3/2017 Zhang
9,609,383 B1 3/2017 Hirst
9,615,171 B1 4/2017 O'Neill et al.
9,628,911 B2 4/2017 Rabinowitz et al.
9,632,748 B2 4/2017 Faaborg
9,648,422 B2 5/2017 Sheen et al.
9,654,073 B2 5/2017 Apodaca
9,654,545 B2 5/2017 Gossain
9,672,812 B1 6/2017 Watanabe et al.
9,674,625 B2 6/2017 Armstrong-Muntner et al.
9,678,708 B2 6/2017 Bierbower et al.
9,686,625 B2 6/2017 Patel
9,689,960 B1 6/2017 Barton et al.
9,690,271 B2 6/2017 Sheen et al.
9,690,539 B2 6/2017 Sheen et al.
9,691,384 B1 6/2017 Wang et al.
9,693,165 B2 6/2017 Downing et al.
9,699,582 B2 7/2017 Sheerin et al.
9,706,319 B2 7/2017 Peters et al.
9,706,323 B2 7/2017 Sheen et al.
9,715,365 B2 7/2017 Kusano et al.
9,723,420 B2 8/2017 Family et al.
9,729,984 B2 8/2017 Tan et al.
9,736,584 B2 8/2017 Sheen et al.
9,743,207 B1 8/2017 Hartung
9,743,208 B2 8/2017 Oishi et al.
9,749,763 B2 8/2017 Sheen
9,763,018 B1 9/2017 McPherson et al.
9,769,580 B2 9/2017 Rabinowitz et al.
9,781,532 B2 10/2017 Sheen
9,788,113 B2 10/2017 Wilberding et al.
9,794,722 B2 10/2017 Petrov
9,807,536 B2 10/2017 Liu et al.
9,810,784 B2 11/2017 Altman et al.

(56) References Cited

U.S. PATENT DOCUMENTS

| | | | |
|---|---|---|---|
| 9,817,549 | B2 | 11/2017 | Chandrasekaran |
| 9,842,584 | B1 | 12/2017 | Hart et al. |
| 9,860,662 | B2 | 1/2018 | Jarvis et al. |
| 9,864,574 | B2 | 1/2018 | Hartung et al. |
| 9,866,964 | B1 | 1/2018 | Haskin et al. |
| 9,898,250 | B1 | 2/2018 | Williams et al. |
| 9,900,723 | B1 | 2/2018 | Choisel et al. |
| 9,910,634 | B2 | 3/2018 | Sheen et al. |
| 9,913,056 | B2 | 3/2018 | Master et al. |
| 9,916,126 | B2 | 3/2018 | Lang |
| 9,916,839 | B1 | 3/2018 | Scalise et al. |
| 9,952,825 | B2 | 4/2018 | Sheen |
| 9,984,703 | B2 | 5/2018 | Ur et al. |
| 9,997,151 | B1 | 6/2018 | Ayrapetian et al. |
| 10,002,259 | B1 | 6/2018 | Mai |
| 10,007,481 | B2 | 6/2018 | Daly et al. |
| 10,028,069 | B1 | 7/2018 | Lang |
| 10,045,142 | B2 | 8/2018 | McPherson et al. |
| 10,074,371 | B1 | 9/2018 | Wang et al. |
| 10,097,919 | B2 | 10/2018 | Jarvis et al. |
| 10,111,002 | B1 | 10/2018 | Poulad |
| 10,114,605 | B2 | 10/2018 | Gossain et al. |
| 10,125,006 | B2 | 11/2018 | Jacobsen et al. |
| 10,127,006 | B2 | 11/2018 | Sheen |
| 10,152,969 | B2 | 12/2018 | Reilly et al. |
| 10,154,359 | B2 | 12/2018 | Sheen |
| 10,200,800 | B2 | 2/2019 | Thomson |
| 10,206,052 | B2 | 2/2019 | Perianu |
| 10,248,376 | B2 | 4/2019 | Keyser-Allen et al. |
| 10,249,205 | B2 | 4/2019 | Hammersley et al. |
| 10,275,213 | B2 | 4/2019 | Daly |
| 10,299,054 | B2 | 5/2019 | McPherson et al. |
| 10,299,061 | B1 | 5/2019 | Sheen |
| 10,304,440 | B1 | 5/2019 | Panchapagesan et al. |
| 10,402,154 | B2 | 9/2019 | Hartung et al. |
| 10,440,492 | B2 | 10/2019 | Crockett |
| 10,555,077 | B2 | 2/2020 | Jarvis et al. |
| 10,567,900 | B2 | 2/2020 | Tanaka et al. |
| 10,567,901 | B2 | 2/2020 | Po et al. |
| 10,586,534 | B1 | 3/2020 | Argyropoulos et al. |
| 10,720,173 | B2 | 7/2020 | Freeman et al. |
| 10,791,407 | B2 | 9/2020 | Oishi et al. |
| 10,811,015 | B2 | 10/2020 | Smith et al. |
| 10,817,249 | B2 | 10/2020 | Tanaka et al. |
| 10,847,137 | B1 | 11/2020 | Mandal et al. |
| 10,853,022 | B2 | 12/2020 | Wilberding |
| 10,853,027 | B2 | 12/2020 | Shih et al. |
| 10,863,295 | B2 | 12/2020 | Bush |
| 10,904,691 | B2 | 1/2021 | Tu et al. |
| 10,986,460 | B2 | 4/2021 | Reilly et al. |
| 11,062,705 | B2 | 7/2021 | Watanabe et al. |
| 11,184,704 | B2 | 11/2021 | Jarvis et al. |
| 11,184,726 | B2 | 11/2021 | Hartung et al. |
| 11,197,117 | B2 | 12/2021 | Reilly et al. |
| 11,295,754 | B2 | 4/2022 | Eubank et al. |
| 11,356,520 | B2 | 6/2022 | Starobin et al. |
| 11,513,216 | B1 | 11/2022 | Kamath Koteshwara et al. |
| 11,540,073 | B2 | 12/2022 | Oishi et al. |
| 11,696,074 | B2 | 7/2023 | Woo et al. |
| 11,696,081 | B2 | 7/2023 | Bush |
| 11,700,139 | B2 | 7/2023 | Drake |
| 11,727,936 | B2 | 8/2023 | Smith et al. |
| 11,736,877 | B2 | 8/2023 | Jarvis et al. |
| 11,803,350 | B2 | 10/2023 | Sheen |
| 11,816,393 | B2 | 11/2023 | Vega-Zayas et al. |
| 11,825,290 | B2 | 11/2023 | Reilly et al. |
| 11,832,068 | B2 | 11/2023 | Jarvis et al. |
| 11,849,299 | B2 | 12/2023 | Reilly et al. |
| 11,889,276 | B2 | 1/2024 | McPherson et al. |
| 2001/0038702 | A1 | 11/2001 | Lavoie et al. |
| 2001/0042107 | A1 | 11/2001 | Palm |
| 2001/0043592 | A1 | 11/2001 | Jimenez et al. |
| 2001/0053228 | A1 | 12/2001 | Jones |
| 2002/0022453 | A1 | 2/2002 | Balog et al. |
| 2002/0026442 | A1 | 2/2002 | Lipscomb et al. |
| 2002/0054685 | A1 | 5/2002 | Avendano et al. |
| 2002/0055950 | A1 | 5/2002 | Witteman |
| 2002/0072816 | A1 | 6/2002 | Shdema et al. |
| 2002/0078161 | A1 | 6/2002 | Cheng |
| 2002/0089529 | A1 | 7/2002 | Robbin |
| 2002/0124097 | A1 | 9/2002 | Isely et al. |
| 2002/0126852 | A1 | 9/2002 | Kashani |
| 2002/0136414 | A1 | 9/2002 | Jordan et al. |
| 2002/0146136 | A1 | 10/2002 | Carter, Jr. |
| 2002/0169583 | A1 | 11/2002 | Gutta et al. |
| 2003/0002689 | A1 | 1/2003 | Folio |
| 2003/0031334 | A1 | 2/2003 | Layton et al. |
| 2003/0081115 | A1 | 5/2003 | Curry et al. |
| 2003/0108212 | A1 | 6/2003 | Yun |
| 2003/0157951 | A1 | 8/2003 | Hasty, Jr. |
| 2003/0159569 | A1 | 8/2003 | Ohta |
| 2003/0161479 | A1 | 8/2003 | Yang et al. |
| 2003/0161492 | A1 | 8/2003 | Miller et al. |
| 2003/0179891 | A1 | 9/2003 | Rabinowitz et al. |
| 2003/0235311 | A1 | 12/2003 | Grancea et al. |
| 2004/0024478 | A1 | 2/2004 | Hans et al. |
| 2004/0071294 | A1 | 4/2004 | Halgas, Jr. et al. |
| 2004/0114771 | A1 | 6/2004 | Vaughan et al. |
| 2004/0131338 | A1 | 7/2004 | Asada et al. |
| 2004/0153321 | A1 | 8/2004 | Chung et al. |
| 2004/0237750 | A1 | 12/2004 | Smith et al. |
| 2005/0021470 | A1 | 1/2005 | Martin et al. |
| 2005/0031143 | A1 | 2/2005 | Devantier et al. |
| 2005/0063554 | A1 | 3/2005 | Devantier et al. |
| 2005/0129254 | A1 | 6/2005 | Connor et al. |
| 2005/0131558 | A1 | 6/2005 | Braithwaite et al. |
| 2005/0147261 | A1 | 7/2005 | Yeh |
| 2005/0157885 | A1 | 7/2005 | Olney et al. |
| 2005/0276425 | A1 | 12/2005 | Forrester et al. |
| 2006/0008256 | A1 | 1/2006 | Khedouri et al. |
| 2006/0013197 | A1 | 1/2006 | Anderson |
| 2006/0026521 | A1 | 2/2006 | Hotelling et al. |
| 2006/0032357 | A1 | 2/2006 | Roovers et al. |
| 2006/0093998 | A1 | 5/2006 | Vertegaal et al. |
| 2006/0104454 | A1 | 5/2006 | Guitarte Perez et al. |
| 2006/0147057 | A1 | 7/2006 | Aggarwal et al. |
| 2006/0153391 | A1 | 7/2006 | Hooley et al. |
| 2006/0161964 | A1 | 7/2006 | Chung |
| 2006/0195480 | A1 | 8/2006 | Spiegelman et al. |
| 2006/0209197 | A1 | 9/2006 | Vanhatalo |
| 2006/0225097 | A1 | 10/2006 | Lawrence-Apfelbaum |
| 2006/0238877 | A1 | 10/2006 | Ashkenazi et al. |
| 2007/0003067 | A1 | 1/2007 | Gierl et al. |
| 2007/0022207 | A1 | 1/2007 | Millington |
| 2007/0025559 | A1 | 2/2007 | Mihelich et al. |
| 2007/0032895 | A1 | 2/2007 | Nackvi et al. |
| 2007/0038999 | A1 | 2/2007 | Millington |
| 2007/0086597 | A1 | 4/2007 | Kino |
| 2007/0087686 | A1 | 4/2007 | Holm et al. |
| 2007/0116254 | A1 | 5/2007 | Looney et al. |
| 2007/0121955 | A1 | 5/2007 | Johnston et al. |
| 2007/0135061 | A1 | 6/2007 | Buck et al. |
| 2007/0142944 | A1 | 6/2007 | Goldberg et al. |
| 2007/0217619 | A1 | 9/2007 | Hall et al. |
| 2008/0002839 | A1 | 1/2008 | Eng |
| 2008/0014989 | A1 | 1/2008 | Sandegard et al. |
| 2008/0031475 | A1 | 2/2008 | Goldstein |
| 2008/0045140 | A1 | 2/2008 | Korhonen |
| 2008/0065247 | A1 | 3/2008 | Igoe |
| 2008/0069378 | A1 | 3/2008 | Rabinowitz et al. |
| 2008/0077261 | A1 | 3/2008 | Baudino et al. |
| 2008/0098027 | A1 | 4/2008 | Aarts |
| 2008/0107128 | A1 | 5/2008 | Lo et al. |
| 2008/0136623 | A1 | 6/2008 | Calvarese |
| 2008/0144864 | A1 | 6/2008 | Huon et al. |
| 2008/0146289 | A1 | 6/2008 | Korneluk et al. |
| 2008/0147461 | A1 | 6/2008 | Lee et al. |
| 2008/0160977 | A1 | 7/2008 | Ahmaniemi et al. |
| 2008/0175411 | A1 | 7/2008 | Greve |
| 2008/0192946 | A1 | 8/2008 | Faller |
| 2008/0214160 | A1 | 9/2008 | Jonsson |
| 2008/0232603 | A1 | 9/2008 | Soulodre |
| 2008/0266385 | A1 | 10/2008 | Smith et al. |
| 2008/0268823 | A1 | 10/2008 | Shalev et al. |

(56) References Cited

U.S. PATENT DOCUMENTS

2008/0281523 A1 11/2008 Dahl et al.
2008/0316863 A1 12/2008 Walley
2009/0003613 A1 1/2009 Christensen
2009/0013255 A1 1/2009 Yuschik et al.
2009/0024662 A1 1/2009 Park et al.
2009/0047993 A1 2/2009 Vasa
2009/0063274 A1 3/2009 Dublin, III et al.
2009/0089054 A1 4/2009 Wang et al.
2009/0110218 A1 4/2009 Swain
2009/0138507 A1 5/2009 Burckart et al.
2009/0147134 A1 6/2009 Iwamatsu
2009/0169025 A1 7/2009 Chen
2009/0175216 A1 7/2009 Bozarth et al.
2009/0175476 A1 7/2009 Bottum
2009/0175510 A1 7/2009 Grim, III et al.
2009/0180632 A1 7/2009 Goldberg et al.
2009/0196428 A1 8/2009 Kim
2009/0202082 A1 8/2009 Bharitkar et al.
2009/0204410 A1 8/2009 Mozer et al.
2009/0214048 A1 8/2009 Stokes, III et al.
2009/0232481 A1 9/2009 Baalbergen et al.
2009/0235236 A1 9/2009 Nickerson et al.
2009/0252481 A1 10/2009 Ekstrand
2009/0285404 A1 11/2009 Hsu et al.
2009/0304194 A1 12/2009 Eggleston et al.
2009/0304205 A1 12/2009 Hardacker et al.
2009/0316923 A1 12/2009 Tashev et al.
2009/0326949 A1 12/2009 Douthitt et al.
2010/0013550 A1 1/2010 Tanaka
2010/0095332 A1 4/2010 Gran et al.
2010/0104114 A1 4/2010 Chapman
2010/0114944 A1 5/2010 Adler et al.
2010/0128902 A1 5/2010 Liu et al.
2010/0131642 A1 5/2010 Chalikouras et al.
2010/0135501 A1 6/2010 Corbett et al.
2010/0136952 A1 6/2010 Rofougaran
2010/0142735 A1 6/2010 Yoon et al.
2010/0146445 A1 6/2010 Kraut
2010/0162117 A1 6/2010 Basso et al.
2010/0189203 A1 7/2010 Wilhelmsson et al.
2010/0195846 A1 8/2010 Yokoyama
2010/0260348 A1 10/2010 Bhow et al.
2010/0272270 A1 10/2010 Chaikin et al.
2010/0290643 A1 11/2010 Mihelich et al.
2010/0296659 A1 11/2010 Tanaka
2010/0299639 A1 11/2010 Ramsay et al.
2010/0303248 A1 12/2010 Tawada
2010/0303250 A1 12/2010 Goldberg et al.
2010/0317332 A1 12/2010 Bathiche et al.
2010/0323793 A1 12/2010 Andall
2010/0329472 A1 12/2010 Nakadai et al.
2011/0002471 A1 1/2011 Wihardja et al.
2011/0007904 A1 1/2011 Tomoda et al.
2011/0007905 A1 1/2011 Sato et al.
2011/0019833 A1 1/2011 Kuech et al.
2011/0029111 A1 2/2011 Sabin et al.
2011/0044461 A1 2/2011 Kuech et al.
2011/0087842 A1 4/2011 Lu et al.
2011/0091055 A1 4/2011 Leblanc
2011/0135103 A1 6/2011 Sun et al.
2011/0150228 A1 6/2011 Yoon et al.
2011/0150230 A1 6/2011 Tanaka
2011/0150247 A1 6/2011 Oliveras
2011/0157168 A1 6/2011 Bennett et al.
2011/0164188 A1 7/2011 Karaoguz et al.
2011/0170710 A1 7/2011 Son
2011/0176687 A1 7/2011 Birkenes
2011/0216093 A1 9/2011 Griffin
2011/0216924 A1 9/2011 Berardi et al.
2011/0234480 A1 9/2011 Fino et al.
2011/0235808 A1 9/2011 Kon
2011/0267985 A1 11/2011 Wilkinson et al.
2011/0268281 A1 11/2011 Florencio et al.
2011/0286601 A1 11/2011 Fukui et al.
2011/0293123 A1 12/2011 Neumeyer et al.
2012/0027218 A1 2/2012 Every et al.
2012/0032928 A1 2/2012 Alberth et al.
2012/0051558 A1 3/2012 Kim et al.
2012/0057724 A1 3/2012 Rabinowitz et al.
2012/0063615 A1 3/2012 Crockett et al.
2012/0076308 A1 3/2012 Kuech et al.
2012/0093320 A1 4/2012 Flaks et al.
2012/0114152 A1 5/2012 Nguyen et al.
2012/0127831 A1 5/2012 Gicklhorn et al.
2012/0140936 A1 6/2012 Bonnick et al.
2012/0148075 A1 6/2012 Goh et al.
2012/0183156 A1 7/2012 Schlessinger et al.
2012/0184335 A1 7/2012 Kim et al.
2012/0213391 A1 8/2012 Usami et al.
2012/0215530 A1 8/2012 Harsch
2012/0224457 A1 9/2012 Kim et al.
2012/0237037 A1 9/2012 Ninan et al.
2012/0237047 A1 9/2012 Neal et al.
2012/0243697 A1 9/2012 Frye et al.
2012/0254220 A1 10/2012 Verthein et al.
2012/0263325 A1 10/2012 Freeman et al.
2012/0268145 A1 10/2012 Chandra et al.
2012/0269356 A1 10/2012 Sheerin et al.
2012/0270653 A1 10/2012 Kareemi et al.
2012/0275613 A1 11/2012 Soulodre
2012/0283593 A1 11/2012 Searchfield et al.
2012/0288124 A1 11/2012 Fejzo et al.
2013/0003981 A1 1/2013 Lane
2013/0010970 A1 1/2013 Hegarty et al.
2013/0019193 A1 1/2013 Rhee et al.
2013/0024880 A1 1/2013 Moloney-Egnatios et al.
2013/0028443 A1 1/2013 Pance et al.
2013/0051572 A1 2/2013 Goh et al.
2013/0066453 A1 3/2013 Seefeldt
2013/0080167 A1 3/2013 Mozer
2013/0080171 A1 3/2013 Mozer et al.
2013/0083948 A1 4/2013 Schmidt
2013/0108055 A1 5/2013 Hanna et al.
2013/0111347 A1 5/2013 Reilly et al.
2013/0129100 A1 5/2013 Sorensen
2013/0129102 A1 5/2013 Li et al.
2013/0129122 A1 5/2013 Johnson et al.
2013/0166227 A1 6/2013 Hermann et al.
2013/0170363 A1 7/2013 Millington et al.
2013/0170647 A1 7/2013 Reilly et al.
2013/0173794 A1 7/2013 Agerbak et al.
2013/0177188 A1 7/2013 Apfel et al.
2013/0179535 A1 7/2013 Baalu et al.
2013/0202131 A1 8/2013 Kemmochi et al.
2013/0211843 A1 8/2013 Clarkson
2013/0216071 A1 8/2013 Maher et al.
2013/0223642 A1 8/2013 Warren et al.
2013/0230175 A1 9/2013 Bech et al.
2013/0259254 A1 10/2013 Xiang et al.
2013/0279706 A1 10/2013 Marti et al.
2013/0283169 A1 10/2013 Van Wie
2013/0289994 A1 10/2013 Newman et al.
2013/0305152 A1 11/2013 Griffiths et al.
2013/0308794 A1 11/2013 Jochim et al.
2013/0315405 A1 11/2013 Kanishima et al.
2013/0329896 A1 12/2013 Krishnaswamy et al.
2013/0331970 A1 12/2013 Beckhardt et al.
2013/0336499 A1 12/2013 Beckhardt et al.
2013/0339028 A1 12/2013 Rosner et al.
2013/0346559 A1 12/2013 Van Erven et al.
2014/0003611 A1 1/2014 Mohammad et al.
2014/0003622 A1 1/2014 Ikizyan et al.
2014/0003623 A1 1/2014 Lang
2014/0003625 A1 1/2014 Sheen et al.
2014/0003626 A1 1/2014 Holman et al.
2014/0003635 A1 1/2014 Mohammad et al.
2014/0006587 A1 1/2014 Kusano
2014/0016784 A1 1/2014 Sen et al.
2014/0016786 A1 1/2014 Sen
2014/0016802 A1 1/2014 Sen
2014/0023196 A1 1/2014 Xiang et al.
2014/0029201 A1 1/2014 Yang et al.
2014/0032709 A1 1/2014 Saussy et al.
2014/0037097 A1 2/2014 Labosco

(56) References Cited

U.S. PATENT DOCUMENTS

2014/0037107 A1 2/2014 Marino, Jr. et al.
2014/0052770 A1 2/2014 Gran et al.
2014/0064501 A1 3/2014 Olsen et al.
2014/0075308 A1 3/2014 Sanders et al.
2014/0079242 A1 3/2014 Nguyen et al.
2014/0084014 A1 3/2014 Sim et al.
2014/0086423 A1 3/2014 Domingo et al.
2014/0093093 A1 4/2014 Dusan et al.
2014/0094151 A1 4/2014 Klappert et al.
2014/0112481 A1 4/2014 Li et al.
2014/0112502 A1 4/2014 Lee
2014/0119551 A1 5/2014 Bharitkar et al.
2014/0122075 A1 5/2014 Bak et al.
2014/0126730 A1 5/2014 Crawley et al.
2014/0154993 A1* 6/2014 Bates ................. H04N 21/8113 455/66.1
2014/0161265 A1 6/2014 Chaikin et al.
2014/0169569 A1 6/2014 Toivanen et al.
2014/0170979 A1 6/2014 Samanta Singhar
2014/0180684 A1 6/2014 Strub
2014/0180697 A1 6/2014 Torok et al.
2014/0188476 A1 7/2014 Li et al.
2014/0192986 A1 7/2014 Lee et al.
2014/0219456 A1 8/2014 Morrell et al.
2014/0219483 A1 8/2014 Hong
2014/0226823 A1 8/2014 Sen et al.
2014/0226837 A1 8/2014 Grokop
2014/0242913 A1 8/2014 Pang
2014/0244712 A1 8/2014 Walters et al.
2014/0267148 A1 9/2014 Luna et al.
2014/0270202 A1 9/2014 Ivanov et al.
2014/0270216 A1 9/2014 Tsilfidis et al.
2014/0270248 A1 9/2014 Ivanov et al.
2014/0270282 A1 9/2014 Tammi et al.
2014/0273859 A1 9/2014 Luna et al.
2014/0274203 A1 9/2014 Ganong, III et al.
2014/0274212 A1 9/2014 Zurek et al.
2014/0278343 A1 9/2014 Tran
2014/0279889 A1 9/2014 Luna
2014/0285313 A1 9/2014 Luna et al.
2014/0286496 A1 9/2014 Luna et al.
2014/0294200 A1 10/2014 Baumgarte et al.
2014/0294201 A1 10/2014 Johnson et al.
2014/0310269 A1 10/2014 Zhang et al.
2014/0321670 A1 10/2014 Nystrom et al.
2014/0323036 A1 10/2014 Daley et al.
2014/0334644 A1 11/2014 Selig et al.
2014/0341399 A1 11/2014 Dusse et al.
2014/0344689 A1 11/2014 Scott et al.
2014/0355768 A1 12/2014 Sen et al.
2014/0355794 A1 12/2014 Morrell et al.
2014/0363022 A1 12/2014 Dizon et al.
2014/0364056 A1 12/2014 Belk et al.
2014/0369519 A1 12/2014 Leschka et al.
2015/0006176 A1 1/2015 Pogue et al.
2015/0011195 A1 1/2015 Li
2015/0016642 A1 1/2015 Walsh et al.
2015/0018992 A1 1/2015 Griffiths et al.
2015/0023509 A1 1/2015 Devantier et al.
2015/0023521 A1* 1/2015 Jones ....................... H04R 3/12 381/80
2015/0031287 A1 1/2015 Pang et al.
2015/0032844 A1 1/2015 Tarr et al.
2015/0036847 A1 2/2015 Donaldson
2015/0036848 A1 2/2015 Donaldson
2015/0039303 A1 2/2015 Lesso et al.
2015/0039310 A1 2/2015 Clark et al.
2015/0039311 A1 2/2015 Clark et al.
2015/0043736 A1 2/2015 Olsen et al.
2015/0051723 A1 2/2015 Bates et al.
2015/0063610 A1 3/2015 Mossner
2015/0073807 A1 3/2015 Kumar
2015/0078586 A1 3/2015 Ang et al.
2015/0078596 A1 3/2015 Sprogis
2015/0086034 A1 3/2015 Lombardi et al.
2015/0100991 A1 4/2015 Risberg et al.
2015/0106085 A1 4/2015 Lindahl
2015/0112672 A1 4/2015 Giacobello et al.
2015/0124975 A1 5/2015 Pontoppidan
2015/0126255 A1 5/2015 Yang et al.
2015/0146886 A1 5/2015 Baumgarte
2015/0149943 A1 5/2015 Nguyen et al.
2015/0154953 A1 6/2015 Bapat et al.
2015/0161360 A1 6/2015 Paruchuri et al.
2015/0195666 A1 7/2015 Massey et al.
2015/0200923 A1 7/2015 Triplett
2015/0201274 A1 7/2015 Ellner et al.
2015/0208184 A1 7/2015 Tan et al.
2015/0208188 A1 7/2015 Carlsson et al.
2015/0215382 A1 7/2015 Arora et al.
2015/0220558 A1 8/2015 Snibbe et al.
2015/0222563 A1 8/2015 Burns et al.
2015/0223002 A1 8/2015 Mehta et al.
2015/0223004 A1 8/2015 Deprez et al.
2015/0229699 A1 8/2015 Liu
2015/0260754 A1 9/2015 Perotti et al.
2015/0263692 A1 9/2015 Bush
2015/0264023 A1 9/2015 Reno
2015/0271593 A1 9/2015 Sun et al.
2015/0271616 A1 9/2015 Kechichian et al.
2015/0271620 A1 9/2015 Lando et al.
2015/0281866 A1 10/2015 Williams et al.
2015/0286360 A1 10/2015 Wachter
2015/0289064 A1 10/2015 Jensen et al.
2015/0350766 A1 12/2015 Schobel et al.
2015/0358756 A1 12/2015 Harma et al.
2015/0382128 A1 12/2015 Ridihalgh et al.
2016/0007116 A1 1/2016 Holman
2016/0011846 A1 1/2016 Sheen
2016/0011850 A1 1/2016 Sheen et al.
2016/0014509 A1 1/2016 Hansson et al.
2016/0014510 A1 1/2016 Sheen
2016/0014511 A1 1/2016 Sheen et al.
2016/0014534 A1 1/2016 Sheen
2016/0014535 A1 1/2016 Wilberding et al.
2016/0014536 A1 1/2016 Sheen
2016/0021458 A1 1/2016 Johnson et al.
2016/0021473 A1 1/2016 Riggi et al.
2016/0021481 A1 1/2016 Johnson et al.
2016/0027440 A1 1/2016 Gelfenbeyn et al.
2016/0027467 A1 1/2016 Proud
2016/0029142 A1 1/2016 Isaac et al.
2016/0034448 A1 2/2016 Tran
2016/0035337 A1 2/2016 Aggarwal et al.
2016/0036404 A1 2/2016 Fleischmann et al.
2016/0036881 A1 2/2016 Tembey et al.
2016/0037277 A1 2/2016 Matsumoto et al.
2016/0061597 A1 3/2016 De Bruijn
2016/0066087 A1 3/2016 Solbach et al.
2016/0070525 A1 3/2016 Sheen et al.
2016/0070526 A1 3/2016 Sheen
2016/0073210 A1 3/2016 Sheen
2016/0088438 A1 3/2016 O'Keeffe
2016/0093281 A1 3/2016 Kuo et al.
2016/0098393 A1 4/2016 Hebert
2016/0098992 A1 4/2016 Renard et al.
2016/0118048 A1 4/2016 Heide
2016/0119730 A1 4/2016 Virtanen
2016/0140969 A1 5/2016 Srinivasan et al.
2016/0142849 A1 5/2016 Satheesh et al.
2016/0148612 A1 5/2016 Guo et al.
2016/0154089 A1 6/2016 Altman
2016/0155443 A1 6/2016 Khan et al.
2016/0165297 A1 6/2016 Jamal-Syed et al.
2016/0192098 A1 6/2016 Oishi et al.
2016/0192099 A1 6/2016 Oishi et al.
2016/0192100 A1 6/2016 Rabinowitz et al.
2016/0212535 A1 7/2016 Le Nerriec et al.
2016/0239255 A1 8/2016 Chavez et al.
2016/0241907 A1 8/2016 Pearson
2016/0246449 A1 8/2016 Jarske
2016/0254696 A1 9/2016 Plumb et al.
2016/0260140 A1 9/2016 Shirley et al.
2016/0309276 A1 10/2016 Ridihalgh et al.

(56) References Cited

U.S. PATENT DOCUMENTS

| | | | | |
|---|---|---|---|---|
| 2016/0316502 | A1 | 10/2016 | DeCicco | |
| 2016/0330562 | A1 | 11/2016 | Crockett | |
| 2016/0342201 | A1 | 11/2016 | Jehan | |
| 2016/0353018 | A1 | 12/2016 | Anderson et al. | |
| 2016/0366517 | A1 | 12/2016 | Chandran et al. | |
| 2016/0373860 | A1 | 12/2016 | Leschka et al. | |
| 2017/0026769 | A1 | 1/2017 | Patel | |
| 2017/0041724 | A1 | 2/2017 | Master et al. | |
| 2017/0069338 | A1 | 3/2017 | Elliot et al. | |
| 2017/0070817 | A1* | 3/2017 | Seo | H03G 3/32 |
| 2017/0070826 | A1 | 3/2017 | Pedersen et al. | |
| 2017/0083279 | A1 | 3/2017 | Sheen | |
| 2017/0084278 | A1 | 3/2017 | Jung | |
| 2017/0084292 | A1 | 3/2017 | Yoo | |
| 2017/0086003 | A1 | 3/2017 | Rabinowitz et al. | |
| 2017/0090864 | A1 | 3/2017 | Jorgovanovic | |
| 2017/0103754 | A1 | 4/2017 | Higbie et al. | |
| 2017/0105084 | A1 | 4/2017 | Holman | |
| 2017/0110130 | A1 | 4/2017 | Sharifi et al. | |
| 2017/0110144 | A1 | 4/2017 | Sharifi et al. | |
| 2017/0133011 | A1 | 5/2017 | Chen et al. | |
| 2017/0142532 | A1 | 5/2017 | Pan | |
| 2017/0207762 | A1 | 7/2017 | Porter et al. | |
| 2017/0215017 | A1 | 7/2017 | Hartung et al. | |
| 2017/0223447 | A1 | 8/2017 | Johnson et al. | |
| 2017/0230772 | A1 | 8/2017 | Johnson et al. | |
| 2017/0236512 | A1 | 8/2017 | Williams et al. | |
| 2017/0242653 | A1 | 8/2017 | Lang et al. | |
| 2017/0242657 | A1 | 8/2017 | Jarvis et al. | |
| 2017/0257722 | A1 | 9/2017 | Kerdranvat et al. | |
| 2017/0269975 | A1 | 9/2017 | Wood et al. | |
| 2017/0280265 | A1 | 9/2017 | Po | |
| 2017/0286052 | A1 | 10/2017 | Hartung et al. | |
| 2017/0287496 | A1 | 10/2017 | Heitkamp et al. | |
| 2017/0303039 | A1 | 10/2017 | Iyer et al. | |
| 2017/0311108 | A1 | 10/2017 | Patel | |
| 2017/0332168 | A1 | 11/2017 | Moghimi et al. | |
| 2017/0353789 | A1 | 12/2017 | Kim et al. | |
| 2017/0358313 | A1 | 12/2017 | Shih | |
| 2017/0365247 | A1 | 12/2017 | Ushakov | |
| 2017/0374482 | A1 | 12/2017 | McPherson et al. | |
| 2018/0033428 | A1 | 2/2018 | Kim et al. | |
| 2018/0033429 | A1 | 2/2018 | Makke et al. | |
| 2018/0039530 | A1 | 2/2018 | Ciabarra, Jr. et al. | |
| 2018/0040324 | A1 | 2/2018 | Wilberding | |
| 2018/0061409 | A1 | 3/2018 | Valentine et al. | |
| 2018/0084367 | A1 | 3/2018 | Greff et al. | |
| 2018/0091898 | A1 | 3/2018 | Yoon et al. | |
| 2018/0096460 | A1 | 4/2018 | Tripp | |
| 2018/0096678 | A1 | 4/2018 | Zhou et al. | |
| 2018/0108351 | A1 | 4/2018 | Beckhardt et al. | |
| 2018/0122378 | A1 | 5/2018 | Mixter et al. | |
| 2018/0132298 | A1 | 5/2018 | Birnam et al. | |
| 2018/0137857 | A1 | 5/2018 | Zhou et al. | |
| 2018/0165055 | A1 | 6/2018 | Yu et al. | |
| 2018/0167981 | A1 | 6/2018 | Jonna et al. | |
| 2018/0182390 | A1 | 6/2018 | Hughes et al. | |
| 2018/0182410 | A1 | 6/2018 | Kaskari et al. | |
| 2018/0197533 | A1 | 7/2018 | Lyon et al. | |
| 2018/0233137 | A1 | 8/2018 | Torok et al. | |
| 2018/0277107 | A1 | 9/2018 | Kim | |
| 2018/0277113 | A1 | 9/2018 | Hartung et al. | |
| 2018/0336892 | A1 | 11/2018 | Kim et al. | |
| 2018/0350356 | A1 | 12/2018 | Garcia | |
| 2018/0350379 | A1 | 12/2018 | Wung et al. | |
| 2018/0352334 | A1 | 12/2018 | Family et al. | |
| 2018/0358019 | A1 | 12/2018 | Mont-Reynaud | |
| 2018/0367944 | A1 | 12/2018 | Heo et al. | |
| 2018/0376268 | A1 | 12/2018 | Kerdranvat et al. | |
| 2019/0013019 | A1 | 1/2019 | Lawrence | |
| 2019/0035404 | A1 | 1/2019 | Gabel et al. | |
| 2019/0037328 | A1 | 1/2019 | McPerson et al. | |
| 2019/0058942 | A1 | 2/2019 | Garner et al. | |
| 2019/0066710 | A1 | 2/2019 | Bryan et al. | |
| 2019/0073999 | A1 | 3/2019 | Prémont et al. | |
| 2019/0081507 | A1 | 3/2019 | Ide | |
| 2019/0104373 | A1 | 4/2019 | Wodrich et al. | |
| 2019/0122662 | A1 | 4/2019 | Chang et al. | |
| 2019/0156847 | A1 | 5/2019 | Bryan et al. | |
| 2019/0172476 | A1 | 6/2019 | Wung et al. | |
| 2019/0237069 | A1 | 8/2019 | Zhao et al. | |
| 2019/0237089 | A1 | 8/2019 | Shin | |
| 2019/0251960 | A1 | 8/2019 | Maker et al. | |
| 2019/0259408 | A1 | 8/2019 | Freeman et al. | |
| 2019/0287536 | A1 | 9/2019 | Sharifi et al. | |
| 2019/0295563 | A1 | 9/2019 | Kamdar et al. | |
| 2019/0311715 | A1 | 10/2019 | Pfeffinger et al. | |
| 2019/0311718 | A1 | 10/2019 | Huber et al. | |
| 2019/0311722 | A1 | 10/2019 | Caldwell | |
| 2019/0318729 | A1 | 10/2019 | Chao et al. | |
| 2019/0320278 | A1 | 10/2019 | McPherson et al. | |
| 2019/0325870 | A1 | 10/2019 | Mitic | |
| 2019/0325888 | A1 | 10/2019 | Geng | |
| 2019/0341037 | A1 | 11/2019 | Bromand et al. | |
| 2019/0341038 | A1 | 11/2019 | Bromand et al. | |
| 2019/0371324 | A1 | 12/2019 | Powell et al. | |
| 2019/0392832 | A1 | 12/2019 | Mitsui et al. | |
| 2020/0005830 | A1 | 1/2020 | Wasada et al. | |
| 2020/0090644 | A1 | 3/2020 | Klingler et al. | |
| 2020/0090646 | A1 | 3/2020 | Smith et al. | |
| 2020/0098354 | A1 | 3/2020 | Lin et al. | |
| 2020/0135194 | A1 | 4/2020 | Jeong | |
| 2020/0249346 | A1 | 8/2020 | Lim et al. | |
| 2020/0382888 | A1 | 12/2020 | McPherson et al. | |
| 2021/0118429 | A1 | 4/2021 | Shan | |
| 2021/0141050 | A1 | 5/2021 | Janssen et al. | |
| 2021/0287670 | A1 | 9/2021 | Regan et al. | |
| 2021/0295833 | A1 | 9/2021 | Rastrow et al. | |
| 2022/0036882 | A1 | 2/2022 | Ahn et al. | |
| 2022/0083136 | A1 | 3/2022 | DeLeeuw | |
| 2023/0362566 | A1 | 11/2023 | Bush | |

FOREIGN PATENT DOCUMENTS

| | | | |
|---|---|---|---|
| CN | 1622694 | A | 6/2005 |
| CN | 1984507 | A | 6/2007 |
| CN | 101032187 | A | 9/2007 |
| CN | 101047777 | A | 10/2007 |
| CN | 101366177 | A | 2/2009 |
| CN | 101478296 | A | 7/2009 |
| CN | 101491116 | A | 7/2009 |
| CN | 101681219 | A | 3/2010 |
| CN | 101754087 | A | 6/2010 |
| CN | 101800051 | A | 8/2010 |
| CN | 102004823 | A | 4/2011 |
| CN | 102318325 | A | 1/2012 |
| CN | 102823277 | A | 12/2012 |
| CN | 102893633 | A | 1/2013 |
| CN | 103491397 | A | 1/2014 |
| CN | 103811010 | A | 5/2014 |
| CN | 103988523 | A | 8/2014 |
| CN | 104219604 | A | 12/2014 |
| CN | 104247461 | A | 12/2014 |
| CN | 104284291 | A | 1/2015 |
| CN | 104584061 | A | 4/2015 |
| CN | 104967953 | A | 10/2015 |
| CN | 105163221 | A | 12/2015 |
| CN | 107465974 | A | 12/2017 |
| DE | 102007032281 | A1 | 1/2009 |
| EP | 0505949 | A1 | 9/1992 |
| EP | 0772374 | A2 | 5/1997 |
| EP | 1133896 | B1 | 8/2002 |
| EP | 1349427 | A2 | 10/2003 |
| EP | 1389853 | A1 | 2/2004 |
| EP | 2043381 | A2 | 4/2009 |
| EP | 1349427 | B1 | 12/2009 |
| EP | 2161950 | A2 | 3/2010 |
| EP | 2194471 | A1 | 6/2010 |
| EP | 2197220 | A2 | 6/2010 |
| EP | 2288178 | A1 | 2/2011 |
| EP | 2429155 | A1 | 3/2012 |
| EP | 1825713 | B1 | 10/2012 |
| EP | 2613573 | A1 | 7/2013 |
| EP | 2591617 | B1 | 6/2014 |

(56) References Cited

FOREIGN PATENT DOCUMENTS

| | | | |
|---|---|---|---|
| EP | 2747081 | A1 | 6/2014 |
| EP | 2835989 | A2 | 2/2015 |
| EP | 2860992 | A1 | 4/2015 |
| EP | 2874413 | A1 | 5/2015 |
| EP | 3128767 | A2 | 2/2017 |
| EP | 3142107 | A1 | 3/2017 |
| EP | 2974382 | B1 | 4/2017 |
| EP | 2986034 | B1 | 5/2017 |
| EP | 3285502 | A1 | 2/2018 |
| JP | H02280199 | A | 11/1990 |
| JP | H05199593 | A | 8/1993 |
| JP | H05211700 | A | 8/1993 |
| JP | H06327089 | A | 11/1994 |
| JP | H0723490 | A | 1/1995 |
| JP | H1069280 | A | 3/1998 |
| JP | H10307592 | A | 11/1998 |
| JP | 2001286000 | A | 10/2001 |
| JP | 2002502193 | A | 1/2002 |
| JP | 2002067815 | A | 3/2002 |
| JP | 2002101500 | A | 4/2002 |
| JP | 2003143252 | A | 5/2003 |
| JP | 2003223188 | A | 8/2003 |
| JP | 2003304590 | A | 10/2003 |
| JP | 2004163590 | A | 6/2004 |
| JP | 2005086686 | A | 3/2005 |
| JP | 2005538633 | A | 12/2005 |
| JP | 2006017893 | A | 1/2006 |
| JP | 2006086380 | A | 3/2006 |
| JP | 2006180039 | A | 7/2006 |
| JP | 2006191562 | A | 7/2006 |
| JP | 2006340285 | A | 12/2006 |
| JP | 2007068125 | A | 3/2007 |
| JP | 2007271802 | A | 10/2007 |
| JP | 2007325073 | A | 12/2007 |
| JP | 2008035254 | A | 2/2008 |
| JP | 2008217444 | A | 9/2008 |
| JP | 2008228133 | A | 9/2008 |
| JP | 2009188474 | A | 8/2009 |
| JP | 2009288260 | A | 12/2009 |
| JP | 2010056970 | A | 3/2010 |
| JP | 2010081124 | A | 4/2010 |
| JP | 2010141892 | A | 6/2010 |
| JP | 2011123376 | A | 6/2011 |
| JP | 2011130212 | A | 6/2011 |
| JP | 2011164166 | A | 8/2011 |
| JP | 2011215378 | A | 10/2011 |
| JP | 2011217068 | A | 10/2011 |
| JP | 2013247456 | A | 12/2013 |
| JP | 2013253884 | A | 12/2013 |
| JP | 2014519274 | A | 8/2014 |
| JP | 2014523165 | A | 9/2014 |
| JP | 2015022268 | A | 2/2015 |
| JP | 2016009193 | A | 1/2016 |
| JP | 2016024652 | A | 2/2016 |
| JP | 2016095383 | A | 5/2016 |
| JP | 2016524193 | A | 8/2016 |
| JP | 2016212312 | A | 12/2016 |
| JP | 2018500529 | A | 1/2018 |
| JP | 6356331 | B2 | 7/2018 |
| JP | 6567735 | B2 | 8/2019 |
| JP | 2020048867 | A | 4/2020 |
| JP | 2022001030 | A | 1/2022 |
| JP | 2022046752 | A | 3/2022 |
| KR | 1020060116383 | | 11/2006 |
| KR | 1020080011831 | | 2/2008 |
| KR | 100966415 | B1 | 6/2010 |
| KR | 20120111130 | A | 10/2012 |
| KR | 20130050987 | A | 5/2013 |
| KR | 20140111859 | A | 9/2014 |
| KR | 20160005045 | A | 1/2016 |
| KR | 20160007527 | A | 1/2016 |
| KR | 20160101198 | A | 8/2016 |
| KR | 20160145634 | A | 12/2016 |
| WO | 200153994 | | 7/2001 |
| WO | 0182650 | A2 | 11/2001 |
| WO | 200182650 | | 11/2001 |
| WO | 2003093950 | A2 | 11/2003 |
| WO | 2004066673 | A1 | 8/2004 |
| WO | 2007016465 | A2 | 2/2007 |
| WO | 2011139502 | A1 | 11/2011 |
| WO | 2013006323 | A2 | 1/2013 |
| WO | 2013016500 | A1 | 1/2013 |
| WO | 2013126603 | A1 | 8/2013 |
| WO | 2014032709 | | 3/2014 |
| WO | 2014032709 | A1 | 3/2014 |
| WO | 2014036121 | A1 | 3/2014 |
| WO | 2014040667 | A1 | 3/2014 |
| WO | 2015024881 | A1 | 2/2015 |
| WO | 2015108794 | A1 | 7/2015 |
| WO | 2015178950 | A1 | 11/2015 |
| WO | 2016003509 | A1 | 1/2016 |
| WO | 2016014686 | A1 | 1/2016 |
| WO | 2016040324 | A1 | 3/2016 |
| WO | 2016054090 | A1 | 4/2016 |
| WO | 2016085775 | A2 | 6/2016 |
| WO | 2016118327 | A1 | 7/2016 |
| WO | 2016171956 | A1 | 10/2016 |
| WO | 2016189285 | A1 | 12/2016 |
| WO | 2017049169 | A1 | 3/2017 |
| WO | 2017058654 | A1 | 4/2017 |
| WO | 2017147081 | A1 | 8/2017 |
| WO | 2020006410 | A1 | 1/2020 |
| WO | 2020252163 | A1 | 12/2020 |
| WO | 2021030334 | A1 | 2/2021 |

OTHER PUBLICATIONS

Final Office Action mailed on Jul. 1, 2022, issued in connection with U.S. Appl. No. 17/033,818, filed Sep. 27, 2020, 13 pages.

Final Office Action mailed on Dec. 2, 2019, issued in connection with U.S. Appl. No. 15/005,496, filed Jan. 25, 2016, 19 pages.

Final Office Action mailed on Apr. 3, 2017, issued in connection with U.S. Appl. No. 14/678,248, filed Apr. 3, 2015, 22 pages.

Final Office Action mailed on Jul. 13, 2017, issued in connection with U.S. Appl. No. 14/726,921, filed Jun. 1, 2015, 10 pages.

Final Office Action mailed on Jun. 13, 2017, issued in connection with U.S. Appl. No. 14/481,505, filed Sep. 9, 2014, 22 pages.

Final Office Action mailed on Dec. 14, 2020, issued in connection with U.S. Appl. No. 16/812,618, filed Mar. 9, 2020, 17 pages.

Final Office Action mailed on Feb. 14, 2019, issued in connection with U.S. Appl. No. 15/005,496, filed Jan. 25, 2016, 16 pages.

Final Office Action mailed on Feb. 14, 2019, issued in connection with U.S. Appl. No. 15/217,399, filed Jul. 22, 2016, 37 pages.

Final Office Action mailed on Oct. 14, 2016, issued in connection with U.S. Appl. No. 14/682,182, filed Apr. 9, 2015, 16 pages.

Final Office Action mailed on Oct. 17, 2016, issued in connection with U.S. Appl. No. 14/678,248, filed Apr. 3, 2015, 22 pages.

Final Office Action mailed on Sep. 17, 2021, issued in connection with U.S. Appl. No. 16/564,766, filed Sep. 9, 2019, 8 pages.

Final Office Action mailed on Apr. 18, 2017, issued in connection with U.S. Appl. No. 14/678,263, filed Apr. 3, 2015, 16 pages.

Final Office Action mailed on Apr. 18, 2018, issued in connection with U.S. Appl. No. 15/056,553, filed Feb. 29, 2016, 8 pages.

Final Office Action mailed on Dec. 18, 2014, issued in connection with U.S. Appl. No. 13/340,126, filed Dec. 29, 2011, 12 pages.

Final Office Action mailed on Jan. 19, 2017, issued in connection with U.S. Appl. No. 14/940,779, filed Nov. 13, 2015, 15 pages.

Final Office Action mailed on Apr. 2, 2018, issued in connection with U.S. Appl. No. 15/166,241, filed May 26, 2016, 14 pages.

Final Office Action mailed on Aug. 20, 2021, issued in connection with U.S. Appl. No. 16/919,467, filed Jul. 2, 2020, 22 pages.

Final Office Action mailed on Sep. 20, 2023, issued in connection with U.S. Appl. No. 17/810,549, filed Jul. 1, 2022, 18 pages.

Final Office Action mailed on Oct. 21, 2016, issued in connection with U.S. Appl. No. 14/696,014, filed Apr. 24, 2015, 13 pages.

Final Office Action mailed on Sep. 22, 2020, issued in connection with U.S. Appl. No. 15/005,496, filed Jan. 25, 2016, 17 pages.

Final Office Action mailed on Jan. 25, 2018, issued in connection with U.S. Appl. No. 15/005,496, filed Jan. 25, 2016, 17 pages.

(56) References Cited

OTHER PUBLICATIONS

Final Office Action mailed on Mar. 25, 2019, issued in connection with U.S. Appl. No. 15/856,791, filed Dec. 28, 2017, 11 pages.
Final Office Action mailed on Oct. 28, 2019, issued in connection with U.S. Appl. No. 16/181,865, filed Nov. 6, 2018, 17 pages.
Final Office Action mailed on Apr. 3, 2018, issued in connection with U.S. Appl. No. 15/235,598, filed Aug. 12, 2016, 12 pages.
Final Office Action mailed on Mar. 3, 2020, issued in connection with U.S. Appl. No. 16/115,525, filed Aug. 28, 2018, 13 pages.
Final Office Action mailed on Aug. 30, 2022, issued in connection with U.S. Appl. No. 17/107,157, filed Nov. 30, 2020, 32 pages.
Final Office Action mailed on Oct. 30, 2023, issued in connection with U.S. Appl. No. 17/458,673, filed Aug. 27, 2021, 20 pages.
Final Office Action mailed on Feb. 5, 2018, issued in connection with U.S. Appl. No. 15/229,693, filed Aug. 5, 2016, 21 pages.
Final Office Action mailed on Mar. 5, 2019, issued in connection with U.S. Appl. No. 15/056,553, filed Feb. 29, 2016, 9 pages.
Final Office Action mailed on Dec. 6, 2018, issued in connection with U.S. Appl. No. 15/806,126, filed Nov. 7, 2017, 18 pages.
Final Office Action mailed on May 8, 2024, issued in connection with U.S. Appl. No. 18/189,863, filed Mar. 24, 2023, 28 pages.
Final Office Action mailed on Apr. 9, 2019, issued in connection with U.S. Appl. No. 15/229,693, filed Aug. 5, 2016, 33 pages.
First Action Interview Office Action mailed on Mar. 3, 2017, issued in connection with U.S. Appl. No. 14/726,921, filed Jun. 1, 2015, 9 pages.
First Action Interview Office Action mailed on Jul. 12, 2016, issued in connection with U.S. Appl. No. 14/481,514, filed Sep. 9, 2014, 10 pages.
First Action Interview Office Action mailed on Jun. 30, 2016, issued in connection with U.S. Appl. No. 14/481,505, filed Sep. 9, 2014, 9 pages.
First Action Interview Pilot Program Pre-Interview Communication mailed on Apr. 5, 2017, issued in connection with U.S. Appl. No. 14/793,190, filed Jul. 7, 2015, 4 pages.
First Action Interview Pilot Program Pre-Interview Communication mailed on Oct. 7, 2015, issued in connection with U.S. Appl. No. 14/216,306, filed Mar. 17, 2014, 5 pages.
First Action Interview Pilot Program Pre-Interview Communication mailed on Feb. 16, 2016, issued in connection with U.S. Appl. No. 14/681,465, filed Apr. 8, 2015, 5 pages.
Gonzalez et al., "Simultaneous Measurement of Multichannel Acoustic Systems," J. Audio Eng. Soc., 2004, pp. 26-42, vol. 52, No. 1/2.
*Google LLC* v. *Sonos, Inc.*, Declaration of Jeffery S. Vipperman, PHD. In Support of Petition for Inter Partes Review of U.S. Pat. No. 9,219,460, IPR2021-00475, Feb. 2, 2021, 92 pages.
*Google LLC* v. *Sonos, Inc.*, Declaration of Michael T. Johnson, Ph.D. Exhibit 2016 in Patent Owner Response to Petition for Inter Partes Review of U.S. Pat. No. 9,219,460, IPR2021-00475, Jun. 13, 2022, 117 pages.
*Google LLC* v. *Sonos, Inc.*, Deposition of Jeffrey S. Vipperman, Ph.D. Exhibit 2017 in Patent Owner Response to Petition for Inter Partes Review of U.S. Pat. No. 9,219,460, IPR2021-00475, Jun. 13, 2022, 183 pages.
*Google LLC* v. *Sonos, Inc.*, File History of U.S. Appl. No. 61/601,529 Maher. Exhibit 2018 in Patent Owner Response to Petition for Inter Partes Review of U.S. Pat. No. 9,219,460, IPR2021-00475, Jun. 13, 2022, 14 pages.
*Google LLC* v. *Sonos, Inc.*, Judgment. Final Written Decision Determining All Challenged Claims Unpatentable for IPR of U.S. Pat. No. 9,219,460, IPR2021-00475, Feb. 15, 2023, 45 pages.
*Google LLC* v. *Sonos, Inc.*, Patent Owner Response to Petition for Inter Partes Review of U.S. Pat. No. 9,219,460, IPR2021-00475, Jun. 13, 2022, 49 pages.
*Google LLC* v. *Sonos, Inc.*, Patent Owner Sur-Reply to Petitioner's Reply for Inter Partes Review of U.S. Pat. No. 9,219,460, IPR2021-00475, Oct. 12, 2022, 32 pages.
*Google LLC* v. *Sonos, Inc.*, Petition for IPR of U.S. Pat. No. 9,219,460, IPR2021-00475, Feb. 5, 2021, 88 pages.
*Google LLC* v. *Sonos, Inc.*, Petitioner's Reply for Inter Partes Review of U.S. Pat. No. 9,219,460, IPR2021-00475, Sep. 6, 2022, 30 pages.
*Google LLC* v. *Sonos, Inc.*, Record of Oral Hearing for IPR of U.S. Pat. No. 9,219,460, IPR2021-00475, Dec. 14, 2022, 60 pages.
Notice of Allowance mailed on Apr. 25, 2017, issued in connection with U.S. Appl. No. 14/696,014, filed Apr. 24, 2015, 7 pages.
Notice of Allowance mailed on Apr. 25, 2017, issued in connection with U.S. Appl. No. 15/207,682, filed Jul. 12, 2016, 7 pages.
Notice of Allowance mailed on Apr. 25, 2019, issued in connection with U.S. Appl. No. 15/806,126, filed Nov. 7, 2017, 8 pages.
Notice of Allowance mailed on Jan. 25, 2021, issued in connection with U.S. Appl. No. 17/129,670, filed Dec. 21, 2020, 10 pages.
Notice of Allowance mailed on Oct. 25, 2016, issued in connection with U.S. Appl. No. 14/826,873, filed Aug. 14, 2015, 5 pages.
Notice of Allowance mailed on Apr. 26, 2023, issued in connection with U.S. Appl. No. 18/058,667, filed Nov. 23, 2022, 8 pages.
Notice of Allowance mailed on Dec. 26, 2023, issued in connection with U.S. Appl. No. 18/066,077, filed Dec. 14, 2022, 6 pages.
Notice of Allowance mailed on Feb. 26, 2016, issued in connection with U.S. Appl. No. 14/921,762, filed Oct. 23, 2015, 7 pages.
Notice of Allowance mailed on Jul. 26, 2016, issued in connection with U.S. Appl. No. 14/481,511, filed Sep. 9, 2014, 12 pages.
Notice of Allowance mailed on Oct. 26, 2016, issued in connection with U.S. Appl. No. 14/811,587, filed Jul. 28, 2015, 11 pages.
Notice of Allowance mailed on Feb. 27, 2017, issued in connection with U.S. Appl. No. 14/805,340, filed Jul. 21, 2015, 9 pages.
Notice of Allowance mailed on Feb. 27, 2023, issued in connection with U.S. Appl. No. 17/107,157, filed Nov. 30, 2020, 13 pages.
Notice of Allowance mailed on Jul. 27, 2017, issued in connection with U.S. Appl. No. 15/005,853, filed Jan. 25, 2016, 5 pages.
Notice of Allowance mailed on Jun. 27, 2017, issued in connection with U.S. Appl. No. 15/344,069, filed Nov. 4, 2016, 8 pages.
Notice of Allowance mailed on Oct. 27, 2020, issued in connection with U.S. Appl. No. 16/555,832, filed Aug. 29, 2019, 5 pages.
Notice of Allowance mailed on Oct. 27, 2021, issued in connection with U.S. Appl. No. 17/135,293, filed Dec. 28, 2020, 11 pages.
Notice of Allowance mailed on Aug. 28, 2017, issued in connection with U.S. Appl. No. 15/089,004, filed Apr. 1, 2016, 5 pages.
Notice of Allowance mailed on Jul. 28, 2017, issued in connection with U.S. Appl. No. 14/678,263, filed Apr. 3, 2015, 10 pages.
Notice of Allowance mailed on Jul. 28, 2017, issued in connection with U.S. Appl. No. 15/211,822, filed Jul. 15, 2016, 9 pages.
Notice of Allowance mailed on Jun. 28, 2023, issued in connection with U.S. Appl. No. 18/189,876, filed Mar. 24, 2023, 20 pages.
Notice of Allowance mailed on Mar. 28, 2018, issued in connection with U.S. Appl. No. 15/673,170, filed Aug. 9, 2017, 5 pages.
Notice of Allowance mailed on Mar. 28, 2023, issued in connection with U.S. Appl. No. 18/058,659, filed Nov. 23, 2022, 10 pages.
Notice of Allowance mailed on Aug. 29, 2018, issued in connection with U.S. Appl. No. 15/357,520, filed Nov. 21, 2016, 11 pages.
Notice of Allowance mailed on Aug. 29, 2018, issued in connection with U.S. Appl. No. 15/718,556, filed Sep. 28, 2017, 8 pages.
Notice of Allowance mailed on Aug. 29, 2019, issued in connection with U.S. Appl. No. 16/185,906, filed Nov. 9, 2018, 8 pages.
Notice of Allowance mailed on Aug. 29, 2023, issued in connection with U.S. Appl. No. 17/804,372, filed May 27, 2022, 9 pages.
Notice of Allowance mailed on Dec. 29, 2017, issued in connection with U.S. Appl. No. 14/793,205, filed Jul. 7, 2015, 5 pages.
Notice of Allowance mailed on Jul. 29, 2016, issued in connection with U.S. Appl. No. 14/481,522, filed Sep. 9, 2014, 11 pages.
Notice of Allowance mailed on Mar. 29, 2023, issued in connection with U.S. Appl. No. 17/807,595, filed Jun. 17, 2022, 6 pages.
Notice of Allowance mailed on Oct. 29, 2015, issued in connection with U.S. Appl. No. 14/216,306, filed Mar. 17, 2014, 9 pages.
Notice of Allowance mailed on Sep. 29, 2021, issued in connection with U.S. Appl. No. 17/207,640, filed Mar. 20, 2021, 13 pages.
Notice of Allowance mailed on Mar. 3, 2021, issued in connection with U.S. Appl. No. 16/403,077, filed May 3, 2019, 6 pages.
Notice of Allowance mailed on Mar. 3, 2021, issued in connection with U.S. Appl. No. 17/078,382, filed Oct. 23, 2020, 9 pages.
Notice of Allowance mailed on Mar. 3, 2022, issued in connection with U.S. Appl. No. 17/135,308, filed Dec. 28, 2020, 7 pages.

(56) References Cited

OTHER PUBLICATIONS

Notice of Allowance mailed on May 3, 2019, issued in connection with U.S. Appl. No. 15/217,399, filed Jul. 22, 2016, 7 pages.
Notice of Allowance mailed on May 3, 2019, issued in connection with U.S. Appl. No. 16/181,583, filed Nov. 6, 2018, 7 pages.
Notice of Allowance mailed on Aug. 30, 2017, issued in connection with U.S. Appl. No. 15/088,994, filed Apr. 1, 2016, 10 pages.
Notice of Allowance mailed on Dec. 30, 2016, issued in connection with U.S. Appl. No. 14/696,014, filed Apr. 24, 2015, 13 pages.
Notice of Allowance mailed on Jan. 30, 2017, issued in connection with U.S. Appl. No. 15/339,260, filed Oct. 31, 2016, 8 pages.
Notice of Allowance mailed on Aug. 31, 2018, issued in connection with U.S. Appl. No. 15/872,979, filed Jan. 16, 2018, 7 pages.
Notice of Allowance mailed on Aug. 31, 2018, issued in connection with U.S. Appl. No. 16/055,884, filed Aug. 6, 2018, 8 pages.
Notice of Allowance mailed on Aug. 31, 2021, issued in connection with U.S. Appl. No. 16/944,884, filed Jul. 31, 2020, 8 pages.
Notice of Allowance mailed on Mar. 31, 2020, issued in connection with U.S. Appl. No. 16/538,629, filed Aug. 12, 2019, 9 pages.
Notice of Allowance mailed on Apr. 4, 2017, issued in connection with U.S. Appl. No. 14/682,182, filed Apr. 9, 2015, 8 pages.
Notice of Allowance mailed on Feb. 4, 2019, issued in connection with U.S. Appl. No. 15/166,241, filed Aug. 26, 2016, 8 pages.
Notice of Allowance mailed on Feb. 4, 2019, issued in connection with U.S. Appl. No. 16/181,583, filed Nov. 6, 2018, 9 pages.
Notice of Allowance mailed on Feb. 4, 2020, issued in connection with U.S. Appl. No. 16/416,619, filed May 20, 2019, 7 pages.
Notice of Allowance mailed on Oct. 4, 2018, issued in connection with U.S. Appl. No. 15/166,241, filed May 26, 2016, 7 pages.
Notice of Allowance mailed on Apr. 5, 2018, issued in connection with U.S. Appl. No. 15/681,640, filed Aug. 21, 2017, 8 pages.
Notice of Allowance mailed on Apr. 5, 2023, issued in connection with U.S. Appl. No. 17/562,465, filed Dec. 27, 2021, 10 pages.
Non-Final Office Action mailed on May 24, 2023, issued in connection with U.S. Appl. No. 18/175,283, filed Feb. 27, 2023, 13 pages.
Non-Final Office Action mailed on Feb. 25, 2022, issued in connection with U.S. Appl. No. 17/107,157, filed Nov. 30, 2020, 30 pages.
Non-Final Office Action mailed on Jan. 25, 2023, issued in connection with U.S. Appl. No. 17/816,238, filed Jul. 29, 2022, 10 pages.
Non-Final Office Action mailed on Oct. 25, 2016, issued in connection with U.S. Appl. No. 14/864,506, filed Sep. 24, 2015, 9 pages.
Non-Final Office Action mailed on Oct. 25, 2023, issued in connection with U.S. Appl. No. 18/308,065, filed Apr. 27, 2023, 15 pages.
Non-Final Office Action mailed on Jun. 26, 2023, issued in connection with U.S. Appl. No. 17/543,014, filed Dec. 6, 2021, 17 pages.
Non-Final Office Action mailed on Sep. 26, 2018, issued in connection with U.S. Appl. No. 15/229,693, filed Aug. 5, 2016, 25 pages.
Non-Final Office Action mailed on Dec. 27, 2017, issued in connection with U.S. Appl. No. 15/357,520, filed Nov. 21, 2016, 28 pages.
Non-Final Office Action mailed on Feb. 27, 2018, issued in connection with U.S. Appl. No. 14/864,393, filed Sep. 24, 2015, 19 pages.
Non-Final Office Action mailed on Feb. 27, 2018, issued in connection with U.S. Appl. No. 15/718,556, filed Sep. 28, 2017, 19 pages.
Non-Final Office Action mailed on Feb. 27, 2024, issued in connection with U.S. Appl. No. 18/343,487, filed Jun. 28, 2023, 42 pages.
Non-Final Office Action mailed on Jul. 27, 2016, issued in connection with U.S. Appl. No. 14/696,014, filed Apr. 24, 2015, 11 pages.
Non-Final Office Action mailed on Mar. 27, 2017, issued in connection with U.S. Appl. No. 15/211,835, filed Jul. 15, 2016, 30 pages.
Non-Final Office Action mailed on Mar. 27, 2018, issued in connection with U.S. Appl. No. 15/785,088, filed Oct. 16, 2017, 11 pages.
Non-Final Office Action mailed on Jul. 28, 2016, issued in connection with U.S. Appl. No. 14/884,001, filed Oct. 15, 2015, 8 pages.
Non-Final Office Action mailed on May 28, 2021, issued in connection with U.S. Appl. No. 17/098,134, filed Nov. 13, 2020, 14 pages.
Non-Final Office Action mailed on Nov. 28, 2017, issued in connection with U.S. Appl. No. 15/673,170, filed Aug. 9, 2017, 7 pages.
Non-Final Office Action mailed on Sep. 28, 2018, issued in connection with U.S. Appl. No. 15/588,186, filed May 5, 2017, 12 pages.
Non-Final Office Action mailed on Sep. 28, 2018, issued in connection with U.S. Appl. No. 15/595,519, filed May 15, 2017, 12 pages.
Non-Final Office Action mailed on Mar. 29, 2018, issued in connection with U.S. Appl. No. 15/716,313, filed Sep. 26, 2017, 16 pages.
Non-Final Office Action mailed on Sep. 29, 2022, issued in connection with U.S. Appl. No. 17/340,353, filed Jun. 7, 2021, 8 pages.
Non-Final Office Action mailed on May 3, 2021, issued in connection with U.S. Appl. No. 16/564,766, filed Sep. 9, 2019, 16 pages.
Non-Final Office Action mailed on Aug. 30, 2019, issued in connection with U.S. Appl. No. 16/115,525, filed Aug. 28, 2018, 13 pages.
Non-Final Office Action mailed on May 30, 2017, issued in connection with U.S. Appl. No. 15/478,770, filed Apr. 4, 2017, 9 pages.
Non-Final Office Action mailed on Sep. 30, 2022, issued in connection with U.S. Appl. No. 17/113,799, filed Dec. 7, 2020, 79 pages.
Non-Final Office Action mailed on Mar. 31, 2021, issued in connection with U.S. Appl. No. 16/919,467, filed Jul. 2, 2020, 10 pages.
Non-Final Office Action mailed on May 31, 2019, issued in connection with U.S. Appl. No. 16/185,906, filed Nov. 9, 2018, 7 pages.
Non-Final Office Action mailed on May 31, 2023, issued in connection with U.S. Appl. No. 17/810,549, filed Jul. 1, 2022, 19 pages.
Non-Final Office Action mailed on Mar. 4, 2020, issued in connection with U.S. Appl. No. 15/966,534, filed Apr. 30, 2018, 11 pages.
Non-Final Office Action mailed on Jan. 5, 2021, issued in connection with U.S. Appl. No. 17/078,382, filed Oct. 23, 2020, 11 pages.
Non-Final Office Action mailed on Jul. 6, 2020, issued in connection with U.S. Appl. No. 16/812,618, filed Mar. 9, 2020, 15 pages.
Non-Final Office Action mailed on Nov. 6, 2018, issued in connection with U.S. Appl. No. 15/235,598, filed Aug. 12, 2016, 13 pages.
Non-Final Office Action mailed on Aug. 7, 2023, issued in connection with U.S. Appl. No. 17/807,270, filed Jun. 16, 2022, 20 pages.
Non-Final Office Action mailed on Feb. 7, 2019, issued in connection with U.S. Appl. No. 15/859,311, filed Dec. 29, 2017, 9 pages.
Non-Final Office Action mailed on Feb. 7, 2019, issued in connection with U.S. Appl. No. 15/865,221, filed Jan. 8, 2018, 10 pages.
Non-Final Office Action mailed on Mar. 7, 2024, issued in connection with U.S. Appl. No. 17/458,673, filed Aug. 27, 2021, 26 pages.
Non-Final Office Action mailed on Mar. 7, 2024, issued in connection with U.S. Appl. No. 18/338,841, filed Jun. 21, 2023, 15 pages.
Non-Final Office Action mailed on Jun. 8, 2021, issued in connection with U.S. Appl. No. 17/207,640, filed Mar. 20, 2021, 17 pages.
Non-Final Office Action mailed on Dec. 9, 2022, issued in connection with U.S. Appl. No. 17/662,282, filed May 6, 2022, 12 pages.
Non-Final Office Action mailed on Jan. 9, 2018, issued in connection with U.S. Appl. No. 15/698,283, filed Sep. 7, 2017, 18 pages.
Non-Final Office Action mailed on Jan. 9, 2018, issued in connection with U.S. Appl. No. 15/727,913, filed Oct. 9, 2017, 8 pages.
Notice of Allowance mailed Jul. 21, 2021, issued in connection with U.S. Appl. No. 16/944,884, filed Jul. 31, 2020, 8 pages.
Notice of Allowance mailed Aug. 4, 2021, issued in connection with U.S. Appl. No. 17/104,466, filed Nov. 25, 2020, 9 pages.
Notice of Allowance mailed on May 1, 2017, issued in connection with U.S. Appl. No. 14/805,140, filed Jul. 21, 2015, 13 pages.

(56) References Cited

OTHER PUBLICATIONS

Notice of Allowance mailed on Nov. 2, 2016, issued in connection with U.S. Appl. No. 14/884,001, filed Oct. 15, 2015, 8 pages.
Notice of Allowance mailed on Jun. 3, 2016, issued in connection with U.S. Appl. No. 14/921,799, filed Oct. 23, 2015, 8 pages.
Notice of Allowance mailed on Nov. 4, 2016, issued in connection with U.S. Appl. No. 14/481,514, filed Sep. 9, 2014, 10 pages.
Notice of Allowance mailed on Jun. 6, 2018, issued in connection with U.S. Appl. No. 15/727,913, filed Oct. 9, 2017, 5 pages.
Notice of Allowance mailed on Oct. 6, 2022, issued in connection with U.S. Appl. No. 17/582,317, filed Jan. 24, 2022, 9 pages.
Notice of Allowance mailed on Dec. 7, 2015, issued in connection with U.S. Appl. No. 14/216,325, filed Mar. 17, 2014, 7 pages.
Advisory Action mailed on Jul. 1, 2019, issued in connection with U.S. Appl. No. 15/229,693, filed Aug. 5, 2016, 2 pages.
Advisory Action mailed on Jul. 10, 2018, issued in connection with U.S. Appl. No. 15/056,553, filed Feb. 29, 2016, 3 pages.
Advisory Action mailed on Dec. 11, 2020, issued in connection with U.S. Appl. No. 15/005,496, filed Jan. 25, 2016, 3 pages.
Advisory Action mailed on Jul. 12, 2018, issued in connection with U.S. Appl. No. 15/166,241, filed May 26, 2016, 3 pages.
Advisory Action mailed on Jul. 12, 2018, issued in connection with U.S. Appl. No. 15/235,598, filed Aug. 12, 2016, 3 pages.
Advisory Action mailed on Aug. 16, 2017, issued in connection with U.S. Appl. No. 14/481,505, filed Sep. 9, 2014, 3 pages.
Advisory Action mailed on Jun. 19, 2018, issued in connection with U.S. Appl. No. 15/229,693, filed Aug. 5, 2016, 3 pages.
Advisory Action mailed on Sep. 19, 2017, issued in connection with U.S. Appl. No. 14/726,921, filed Jun. 1, 2015, 3 pages.
Advisory Action mailed on Nov. 22, 2021, issued in connection with U.S. Appl. No. 16/919,467, filed Jul. 2, 2020, 4 pages.
Advisory Action mailed on Apr. 24, 2024, issued in connection with U.S. Appl. No. 17/807,270, filed Jun. 16, 2022, 3 pages.
Advisory Action mailed on Jun. 3, 2020, issued in connection with U.S. Appl. No. 16/115,525, filed Aug. 28, 2018, 3 pages.
Advisory Action mailed on Apr. 30, 2019, issued in connection with U.S. Appl. No. 15/005,496, filed Jan. 25, 2016, 3 pages.
Advisory Action mailed on Feb. 7, 2019, issued in connection with U.S. Appl. No. 15/806,126, filed Nov. 7, 2017, 3 pages.
An Overview of IEEE 1451.4 Transducer Electronic Data Sheets (TEDS) National Instruments, 19 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
"AuEQ for the iPhone," Mar. 25, 2015, retrieved from the internet: URL:https://web.archive.org/web20150325152629/http://www.hotto.de/mobileapps/iphoneaueq.html [retrieved on Jun. 24, 2016], 6 pages.
"AV Amplifier DSP-Z7"," Yamaha, 2008 [retrieved on Jan. 3, 2022]. Retrieved from the Internet: URL: https://de.yamaha.com/files/download/other_assets/6/318616/DSP-Z7_en.pdf, pp. 1-154.
BeoLab5 User Manual. Bang Olufsen. Version 1.0, 20 pages [produced by Google in WDTX Case No. 6:20-cv-00881 Answer on Jan. 8, 2021].
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Burger, Dennis, "Automated Room Correction Explained," hometheaterreview.com, Nov. 18, 2013, http://hometheaterreview.com/automated-room-correction-explained/ Retrieved Oct. 10, 2014, 3 pages.
Canadian Patent Office, Canadian Examination Report mailed on Oct. 13, 2023, issued in connection with Canadian Application No. 3148021, 8 pages.
Chen, Trista P. et al. VRAPS: Visual Rhythm-Based Audio Playback System. IEEE, Gracenote, Inc., 2010, pp. 721-722.
Chinese Patent Office, Chinese Office Action and Translation mailed on Apr. 1, 2021, issued in connection with Chinese Application No. 201910395715.4, 8 pages.
Chinese Patent Office, First Office Action and Translation mailed on Nov. 3, 2021, issued in connection with Chinese Application No. 202011278502.2, 10 pages.
Chinese Patent Office, First Office Action and Translation mailed on Jun. 19, 2019, issued in connection with Chinese Application No. 201680054189.X, 11 pages.
Chinese Patent Office, First Office Action and Translation mailed on Feb. 22, 2021, issued in connection with Chinese Application No. 202010187024.8, 11 pages.
Chinese Patent Office, First Office Action and Translation mailed on Dec. 24, 2020, issued in connection with Chinese Application No. 201910978233.1, 15 pages.
Chinese Patent Office, First Office Action and Translation mailed on Jan. 28, 2021, issued in connection with Chinese Application No. 201680054164.X, 19 pages.
Chinese Patent Office, First Office Action and Translation mailed on Jun. 29, 2020, issued in connection with Chinese Application No. 201780057093.3, 11 pages.
Chinese Patent Office, First Office Action and Translation mailed on Feb. 3, 2021, issued in connection with Chinese Application No. 202010095178.4, 15 pages.
Chinese Patent Office, First Office Action and Translation mailed on Aug. 4, 2020, issued in connection with Chinese Application No. 201910395715.4, 22 pages.
Chinese Patent Office, First Office Action mailed on Aug. 11, 2017, issued in connection with Chinese Patent Application No. 201580013837.2, 8 pages.
Chinese Patent Office, First Office Action mailed on Nov. 20, 2018, issued in connection with Chinese Application No. 201580047998.3, 21 pages.
Chinese Patent Office, First Office Action mailed on Sep. 25, 2017, issued in connection with Chinese Patent Application No. 201580013894.0, 9 pages.
Chinese Patent Office, First Office Action mailed on Nov. 5, 2018, issued in connection with Chinese Application No. 201680044080.8, 5 pages.
Chinese Patent Office, Office Action mailed on Nov. 14, 2019, issued in connection with Chinese Application No. 201680040086.8, 9 pages.
Chinese Patent Office, Second Office Action and Translation mailed on Aug. 26, 2019, issued in connection with Chinese Application No. 201580047998.3, 25 pages.
Chinese Patent Office, Second Office Action mailed on Jan. 11, 2019, issued in connection with Chinese Application No. 201680044080.8, 4 pages.
Chinese Patent Office, Second Office Action mailed on Feb. 3, 2019, issued in connection with Chinese Application No. 201580048594.6, 11 pages.
Chinese Patent Office, Second Office Action mailed on May 6, 2020, issued in connection with Chinese Application No. 201680040086.8, 3 pages.
Chinese Patent Office, Second Office Action with Translation mailed on Jan. 9, 2018, issued in connection with Chinese Patent Application No. 201580013837.2, 10 pages.
Chinese Patent Office, Third Office Action mailed on Apr. 11, 2019, issued in connection with Chinese Application No. 201580048594.6, 4 pages.
"Constellation Acoustic System: a revolutionary breakthrough in acoustical design," Meyer Sound Laboratories, Inc. 2012, 32 pages.
"Constellation Microphones," Meyer Sound Laboratories, Inc. 2013, 2 pages.
Corrected Notice of Allowability mailed on Jan. 19, 2017, issued in connection with U.S. Appl. No. 14/826,873, filed Aug. 14, 2015, 11 pages.
Daddy, B., "Calibrating Your Audio with a Sound Pressure Level (SPL) Meter," Blue-ray.com, Feb. 22, 2008 Retrieved Oct. 10, 2014, 15 pages.
Dell, Inc. "Dell Digital Audio Receiver: Reference Guide," Jun. 2000, 70 pages.
802.15 Wikipedia page available 2011 (Year: 2011).
Australian Patent Office, Australian Examination Report Action mailed on Aug. 16, 2024, issued in connection with Australian Application No. 2023248160, 2 pages.

(56) References Cited

OTHER PUBLICATIONS

Australian Patent Office, Australian Examination Report Action mailed on Sep. 18, 2024, issued in connection with Australian Application No. 2020218258, 3 pages.
Australian Patent Office, Australian Examination Report Action mailed on Aug. 19, 2024, issued in connection with Australian Application No. 2023237094, 2 pages.
Australian Patent Office, Australian Examination Report Action mailed on Jan. 23, 2025, issued in connection with Australian Application No. 2020329905, 3 pages.
Australian Patent Office, Australian Examination Report Action mailed on Jul. 29, 2024, issued in connection with Australian Application No. 2023237192, 3 pages.
Bluetooth Wikipedia page available 2011 (Year: 2011).
Bohn, Dieter. The Verge. "Amazon Creates a Huge Alliance to Demand Voice Assistant Compatibility." Sep. 24, 2019, 15 pages. Retrieved from the Internet: URL: https://www.theverge.com/2019/9/24/20881321/amazon-voice-interoperability-initiative-alexa-microsoft-baidu-intel-qualcommspotify-assistants.
Canadian Patent Office, Canadian Examination Report mailed on Oct. 1, 2024, issued in connection with Canadian Application No. 3123601, 4 pages.
Canadian Patent Office, Canadian Examination Report mailed on Aug. 12, 2024, issued in connection with Canadian Application No. 3067776, 3 pages.
Canadian Patent Office, Canadian Examination Report mailed on May 17, 2024, issued in connection with Canadian Application No. 3148021, 5 pages.
Canadian Patent Office, Canadian Examination Report mailed on Jun. 18, 2024, issued in connection with Canadian Application No. 3084279, 4 pages.
European Patent Office, European EPC Article 94.3 mailed on Dec. 19, 2024, issued in connection with European Application No. 22153523, 4 pages.
European Patent Office, European EPC Article 94.3 mailed on Jul. 22, 2024, issued in connection with European Application No. 23188226.7, 9 pages.
European Patent Office, European EPC Article 94.3 mailed on Jun. 4, 2024, issued in connection with European Application No. 21180778.9, 5 pages.
European Patent Office, European Extended Search Report mailed on Dec. 6, 2024, issued in connection with European Application No. 24174559.5, 12 pages.
European Patent Office, European Extended Search Report mailed on Feb. 24, 2025, issued in connection with European Application No. 24192454.7, 11 pages.
European Patent Office, European Extended Search Report mailed on Jul. 9, 2024, issued in connection with European Application No. 24162741.3, 12 pages.
European Patent Office, Summons to Attend Oral Proceedings mailed on Jun. 26, 2024, issued in connection with European Application No. 19740292.8, 10 pages.
European Patent Office, Summons to Attend Oral Proceedings mailed on Nov. 29, 2024, issued in connection with European Application No. 21193616.6, 9 pages.
European Patent Office, Summons to Attend Oral Proceedings mailed on Aug. 5, 2025, issued in connection with European Application No. 20761443.9, 12 pages.
European Patent Office, Summons to Attend Oral Proceedings mailed on Aug. 6, 2024, issued in connection with European Application No. 18789515.6, 8 pages.
Final Office Action mailed on Aug. 1, 2025, issued in connection with U.S. Appl. No. 19/029,744 , filed on Jan. 17, 2025, 27 pages.
Final Office Action mailed on Sep. 5, 2024, issued in connection with U.S. Appl. No. 18/343,487, filed Jun. 28, 2023, 12 pages.
Final Office Action mailed on Jun. 10, 2025, issued in connection with U.S. Appl. No. 18/308,065, filed Apr. 27, 2023, 18 pages.
Final Office Action mailed on Nov. 13, 2024, issued in connection with U.S. Appl. No. 18/487,290, filed Oct. 16, 2023, 13 pages.
Final Office Action mailed on Mar. 14, 2025, issued in connection with U.S. Appl. No. 18/440,111, filed Feb. 13, 2024, 30 pages.
Final Office Action mailed on Mar. 17, 2025, issued in connection with U.S. Appl. No. 18/356,477, filed Jul. 21, 2023, 25 pages.
Final Office Action mailed on Jul. 18, 2024, issued in connection with U.S. Appl. No. 17/450,925, filed Oct. 14, 2021, 11 pages.
Final Office Action mailed on Aug. 2, 2024, issued in connection with U.S. Appl. No. 18/048,034, filed Oct. 20, 2022, 7 pages.
Final Office Action mailed on Jul. 2, 2024, issued in connection with U.S. Appl. No. 18/308,065, filed Apr. 27, 2023, 17 pages.
Final Office Action mailed on May 20, 2024, issued in connection with U.S. Appl. No. 18/308,087, filed Apr. 27, 2023, 29 pages.
Final Office Action mailed on Oct. 22, 2024, issued in connection with U.S. Appl. No. 17/458,673, filed Aug. 27, 2021, 27 pages.
Final Office Action mailed on Jan. 3, 2024, issued in connection with U.S. Appl. No. 17/807,270, filed Jun. 16, 2022, 22 pages.
Final Office Action mailed on Jul. 8, 2024, issued in connection with U.S. Appl. No. 17/222,950, filed Apr. 5, 2021, 10 pages.
International Bureau, International Preliminary Report on Patentability, mailed on Apr. 11, 2024, issued in connection with International Application No. PCT/US2022/077107, filed on Sep. 27, 2022, 9 pages.
International Bureau, International Preliminary Report on Patentability, mailed on Aug. 22, 2024, issued in connection with International Application No. PCT/US2023/062179, filed on Feb. 8, 2023, 8 pages.
International Bureau, International Preliminary Report on Patentability, mailed on Apr. 4, 2024, issued in connection with International Application No. PCT/US2022/076972, filed on Sep. 23, 2022, 14 pages.
International Bureau, International Search Report and Written Opinion mailed on Mar. 23, 2023, issued in connection with International Application No. PCT/US2022/076972, filed on Sep. 23, 2022, 20 pages.
Japanese Patent Office, Decision to Grant a Patent and Translation mailed on Dec. 10, 2024, issued in connection with Japanese Patent Application No. 2022-115789, 5 pages.
Japanese Patent Office, Notice of Reasons for Refusal and Translation mailed on Jul. 1, 2025, issued in connection with Japanese Patent Application No. 2023-164165, 10 pages.
Japanese Patent Office, Notice of Reasons for Refusal and Translation mailed on Dec. 10, 2024, issued in connection with Japanese Patent Application No. 2023-149069, 8 pages.
Japanese Patent Office, Notice of Reasons for Refusal and Translation mailed on Dec. 17, 2024, issued in connection with Japanese Patent Application No. 2023-164165, 9 pages.
Japanese Patent Office, Notice of Reasons for Refusal and Translation mailed on Dec. 3, 2024, issued in connection with Japanese Patent Application No. 2023-144379, 12 pages.
Japanese Patent Office, Notice of Reasons for Refusal and Translation mailed on Dec. 3, 2024, issued in connection with Japanese Patent Application No. 2023-144387, 8 pages.
Japanese Patent Office, Office Action and Translation mailed on Jul. 11, 2024, issued in connection with Japanese Application No. 2022-115789, 10 pages.
Japanese Patent Office, Office Action and Translation mailed on Oct. 8, 2024, issued in connection with Japanese Patent Application No. 2023-118922, 9 pages.
Korean Patent Office, Korean Examination Report and Translation mailed on Jul. 17, 2024, issued in connection with Korean Application No. 10-2022-7024007, 10 pages.
Korean Patent Office, Korean Examination Report and Translation mailed on Aug. 5, 2024, issued in connection with Korean Application No. 10-2023-7031855, 10 pages.
Korean Patent Office, Korean Examination Report and Translation mailed on Nov. 6, 2024, issued in connection with Korean Application No. 10-2023-7032988, 13 pages.
Notice of Allowance mailed on Sep. 16, 2016, issued in connection with U.S. Appl. No. 15/066,049, filed Mar. 10, 2016, 7 pages.
Notice of Allowance mailed on Aug. 17, 2022, issued in connection with U.S. Appl. No. 17/316,371, filed May 10, 2021, 9 pages.
Notice of Allowance mailed on Dec. 17, 2018, issued in connection with U.S. Appl. No. 16/055,884, filed Aug. 6, 2018, 5 pages.

(56) References Cited

OTHER PUBLICATIONS

Notice of Allowance mailed on May 17, 2017, issued in connection with U.S. Appl. No. 15/339,260, filed Oct. 31, 2016, 7 pages.
Notice of Allowance mailed on Oct. 17, 2019, issued in connection with U.S. Appl. No. 16/542,433, filed Aug. 16, 2019, 9 pages.
Notice of Allowance mailed on Aug. 18, 2022, issued in connection with U.S. Appl. No. 17/660,185, filed Apr. 21, 2022, 11 pages.
Notice of Allowance mailed on Jan. 18, 2024, issued in connection with U.S. Appl. No. 18/352,394, filed Jul. 14, 2023, 7 pages.
Notice of Allowance mailed on Mar. 18, 2019, issued in connection with U.S. Appl. No. 16/056,862, filed Aug. 7, 2018, 12 pages.
Notice of Allowance mailed on Mar. 18, 2021, issued in connection with U.S. Appl. No. 15/005,496, filed Jan. 25, 2016, 8 pages.
Notice of Allowance mailed on Oct. 18, 2021, issued in connection with U.S. Appl. No. 16/570,679, filed Sep. 13, 2019, 9 pages.
Notice of Allowance mailed on Apr. 19, 2023, issued in connection with U.S. Appl. No. 17/113,799, filed Dec. 7, 2020, 7 pages.
Notice of Allowance mailed on Aug. 19, 2016, issued in connection with U.S. Appl. No. 14/644,136, filed Mar. 10, 2015, 12 pages.
Notice of Allowance mailed on Jan. 19, 2022, issued in connection with U.S. Appl. No. 17/399,294, filed Aug. 11, 2021, 11 pages.
Notice of Allowance mailed on Jun. 19, 2017, issued in connection with U.S. Appl. No. 14/793,190, filed Jul. 7, 2015, 5 pages.
Notice of Allowance mailed on Sep. 19, 2017, issued in connection with U.S. Appl. No. 14/793,205, filed Jul. 7, 2015, 16 pages.
Notice of Allowance mailed on Sep. 19, 2018, issued in connection with U.S. Appl. No. 14/864,393, filed Sep. 24, 2015, 10 pages.
Notice of Allowance mailed on Feb. 2, 2022, issued in connection with U.S. Appl. No. 16/949,951, filed Nov. 20, 2020, 8 pages.
Notice of Allowance mailed on Mar. 2, 2020, issued in connection with U.S. Appl. No. 16/213,552, filed Dec. 7, 2018, 9 pages.
Notice of Allowance mailed on Oct. 2, 2023, issued in connection with U.S. Appl. No. 18/189,869, filed Mar. 24, 2023, 8 pages.
Notice of Allowance mailed on Sep. 2, 2021, issued in connection with U.S. Appl. No. 17/357,302, filed Jun. 24, 2021, 10 pages.
Notice of Allowance mailed on Apr. 20, 2017, issued in connection with U.S. Appl. No. 14/940,779, filed Nov. 13, 2015, 11 pages.
Notice of Allowance mailed on Apr. 20, 2022, issued in connection with U.S. Appl. No. 17/098,134, filed Nov. 13, 2020, 5 pages.
Notice of Allowance mailed on Nov. 20, 2017, issued in connection with U.S. Appl. No. 15/298,115, filed Oct. 19, 2016, 10 pages.
Notice of Allowance mailed on Sep. 20, 2017, issued in connection with U.S. Appl. No. 14/481,514, filed Sep. 9, 2014, 10 pages.
Notice of Allowance mailed on Dec. 21, 2016, issued in connection with U.S. Appl. No. 14/682,182, filed Apr. 9, 2015, 8 pages.
Notice of Allowance mailed on Feb. 21, 2018, issued in connection with U.S. Appl. No. 15/005,853, filed Jan. 25, 2016, 5 pages.
Notice of Allowance mailed on Jul. 21, 2017, issued in connection with U.S. Appl. No. 15/211,835, filed Jul. 15, 2016, 10 pages.
Notice of Allowance mailed on Jun. 21, 2019, issued in connection with U.S. Appl. No. 15/235,598, filed Aug. 12, 2016, 11 pages.
Notice of Allowance mailed on Oct. 21, 2019, issued in connection with U.S. Appl. No. 16/182,886, filed Nov. 7, 2018, 10 pages.
Notice of Allowance mailed on Sep. 21, 2023, issued in connection with U.S. Appl. No. 17/567,311, filed Jan. 3, 2022, 8 pages.
Notice of Allowance mailed on Apr. 22, 2021, issued in connection with U.S. Appl. No. 16/812,618, filed Mar. 9, 2020, 12 pages.
Notice of Allowance mailed on Feb. 22, 2021, issued in connection with U.S. Appl. No. 16/944,884, filed Jul. 31, 2020, 9 pages.
Notice of Allowance mailed on Jun. 22, 2017, issued in connection with U.S. Appl. No. 14/644,136, filed Mar. 10, 2015, 12 pages.
Notice of Allowance mailed on Jun. 22, 2023, issued in connection with U.S. Appl. No. 17/407,793, filed Aug. 20, 2021, 10 pages.
Notice of Allowance mailed on Mar. 22, 2023, issued in connection with U.S. Appl. No. 17/662,282, filed May 6, 2022, 5 pages.
Notice of Allowance mailed on Aug. 23, 2018, issued in connection with U.S. Appl. No. 15/909,529, filed Mar. 1, 2018, 8 pages.
Notice of Allowance mailed on Aug. 23, 2023, issued in connection with U.S. Appl. No. 18/308,016, filed Apr. 27, 2023, 13 pages.
Notice of Allowance mailed on Feb. 23, 2021, issued in connection with U.S. Appl. No. 16/115,525, filed Aug. 28, 2018, 8 pages.
Notice of Allowance mailed on Jun. 23, 2016, issued in connection with U.S. Appl. No. 14/921,781, filed Oct. 23, 2015, 8 pages.
Notice of Allowance mailed on Mar. 23, 2020, issued in connection with U.S. Appl. No. 16/542,418, filed Aug. 16, 2019, 5 pages.
Notice of Allowance mailed on May 23, 2018, issued in connection with U.S. Appl. No. 15/698,283, filed Sep. 7, 2017, 8 pages.
Notice of Allowance mailed on Nov. 23, 2020, issued in connection with U.S. Appl. No. 16/403,077, filed May 3, 2019, 6 pages.
Notice of Allowance mailed on Oct. 23, 2017, issued in connection with U.S. Appl. No. 14/481,522, filed Sep. 9, 2014, 16 pages.
Notice of Allowance mailed on Oct. 23, 2020, issued in connection with U.S. Appl. No. 16/555,846, filed Aug. 29, 2019, 5 pages.
Notice of Allowance mailed on Sep. 23, 2016, issued in connection with U.S. Appl. No. 15/070,160, filed Mar. 15, 2016, 7 pages.
Notice of Allowance mailed on Sep. 23, 2022, issued in connection with U.S. Appl. No. 17/373,179, filed Jul. 12, 2021, 5 pages.
Notice of Allowance mailed on Jul. 24, 2019, issued in connection with U.S. Appl. No. 15/229,693, filed Aug. 5, 2016, 13 pages.
Notice of Allowance mailed on Jul. 24, 2020, issued in connection with U.S. Appl. No. 16/665,415, filed Oct. 28, 2019, 12 pages.
Notice of Allowance mailed on May 24, 2017, issued in connection with U.S. Appl. No. 14/997,868, filed Jan. 18, 2016, 5 pages.
Notice of Allowance mailed on Nov. 24, 2017, issued in connection with U.S. Appl. No. 15/681,640, filed Aug. 21, 2017, 8 pages.
Korean Patent Office, Korean Office Action and Translation mailed on Oct. 20, 2024, issued in connection with Korean Application No. 10-2023-7036702, 22 pages.
Non-Final Office Action mailed on Mar. 3, 2025, issued in connection with U.S. Appl. No. 18/308,087, filed Apr. 27, 2023, 25 pages.
Non-Final Office Action mailed on Jul. 11, 2024, issued in connection with U.S. Appl. No. 18/313,013, filed May 5, 2023, 18 pages.
Non-Final Office Action mailed on Feb. 12, 2025, issued in connection with U.S. Appl. No. 18/189,863, filed Mar. 24, 2023, 28 pages.
Non-Final Office Action mailed on Aug. 15, 2024, issued in connection with U.S. Appl. No. 18/323,039, filed May 24, 2023, 09 pages.
Non-Final Office Action mailed on Aug. 15, 2024, issued in connection with U.S. Appl. No. 18/487,290, filed Oct. 16, 2023, 13 pages.
Non-Final Office Action mailed on Sep. 17, 2024, issued in connection with U.S. Appl. No. 18/449,388, filed Aug. 14, 2023, 22 pages.
Non-Final Office Action mailed on Feb. 18, 2025, issued in connection with U.S. Appl. No. 18/600,044, filed Mar. 8, 2024, 28 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on Mar. 20, 2025, issued in connection with U.S. Appl. No. 19/028,592, filed Jun. 21, 2023, 33 pages.
Non-Final Office Action mailed on May 20, 2024, issued in connection with U.S. Appl. No. 18/600,044, filed Mar. 8, 2024, 24 pages.
Non-Final Office Action mailed on Mar. 21, 2025, issued in connection with U.S. Appl. No. 19/029,744, filed Jan. 17, 2025, 26 pages.
Non-Final Office Action mailed on Nov. 22, 2024, issued in connection with U.S. Appl. No. 18/308,065, filed Apr. 27, 2023, 15 pages.
Non-Final Office Action mailed on Feb. 26, 2025, issued in connection with U.S. Appl. No. 18/657,019, filed May 7, 2024, 27 pages.
Non-Final Office Action mailed on Nov. 26, 2024, issued in connection with U.S. Appl. No. 18/424,041, filed Jan. 26, 2024, 07 pages.

(56) References Cited

OTHER PUBLICATIONS

Non-Final Office Action mailed on Feb. 27, 2025, issued in connection with U.S. Appl. No. 18/487,290, filed Oct. 16, 2023, 14 pages.
Non-Final Office Action mailed on Sep. 29, 2024, issued in connection with U.S. Appl. No. 18/356,477, filed Jul. 21, 2023, 26 pages.
Non-Final Office Action mailed on Sep. 29, 2024, issued in connection with U.S. Appl. No. 18/440,111, filed Feb. 13, 2024, 25 pages.
Non-Final Office Action mailed on Jul. 30, 2024, issued in connection with U.S. Appl. No. 17/994,577, filed Nov. 28, 2022, 13 pages.
Non-Final Office Action mailed on Aug. 6, 2024, issued in connection with U.S. Appl. No. 18/313,859, filed May 8, 2023, 20 pages.
Non-Final Office Action mailed on Aug. 7, 2024, issued in connection with U.S. Appl. No. 18/502,644, filed Nov. 6, 2023, 31 pages.
Non-Final Office Action mailed on Aug. 8, 2024, issued in connection with U.S. Appl. No. 18/463,827, filed Sep. 8, 2023, 7 pages.
Non-Final Office Action mailed on Jul. 8, 2024, issued in connection with U.S. Appl. No. 18/520,531, filed Nov. 27, 2023, 63 pages.
Notice of Allowance mailed on Aug. 1, 2025, issued in connection with U.S. Appl. No. 18/487,290, filed Oct. 16, 2023, 07 pages.
Notice of Allowance mailed on Dec. 5, 2024, issued in connection with U.S. Appl. No. 18/463,827, filed Sep. 8, 2023, 9 pages.
Notice of Allowance mailed on Aug. 7, 2024, issued in connection with U.S. Appl. No. 18/338,841, filed Jun. 21, 2023, 05 pages.
Notice of Allowance mailed on Jul. 1, 2024, issued in connection with U.S. Appl. No. 18/511,775, filed Nov. 16, 2023, 11 pages.
Notice of Allowance mailed on Jul. 10, 2024, issued in connection with U.S. Appl. No. 18/309,939, filed May 1, 2023, 5 pages.
Notice of Allowance mailed on Oct. 11, 2024, issued in connection with U.S. Appl. No. 18/351,033, filed Jul. 12, 2023, 09 pages.
Notice of Allowance mailed on Jun. 12, 2024, issued in connection with U.S. Appl. No. 17/807,270, filed Jun. 16, 2022, 10 pages.
Notice of Allowance mailed on Sep. 12, 2024, issued in connection with U.S. Appl. No. 18/432,265, filed Feb. 5, 2024, 8 pages.
Notice of Allowance mailed on Nov. 14, 2024, issued in connection with U.S. Appl. No. 18/343,487, filed Jun. 28, 2023, 12 pages.
Notice of Allowance mailed on Jan. 15, 2025, issued in connection with U.S. Appl. No. 18/449,388, filed Aug. 14, 2023, 8 pages.
Notice of Allowance mailed on Jul. 17, 2024, issued in connection with U.S. Appl. No. 18/310,025, filed May 1, 2023, 7 pages.
Notice of Allowance mailed on Jun. 18, 2024, issued in connection with U.S. Appl. No. 18/297,214, filed Apr. 7, 2023, 10 pages.
Notice of Allowance mailed on Aug. 19, 2024, issued in connection with U.S. Appl. No. 18/345,588, filed Jun. 30, 2023, 20 pages.
Notice of Allowance mailed on Jul. 19, 2024, issued in connection with U.S. Appl. No. 18/328,932, filed Jun. 5, 2023, 9 pages.
Notice of Allowance mailed on Jun. 20, 2025, issued in connection with U.S. Appl. No. 18/424,041, filed Jan. 26, 2024, 8 pages.
Notice of Allowance mailed on Nov. 21, 2024, issued in connection with U.S. Appl. No. 18/323,039, filed May 24, 2023, 07 pages.
Notice of Allowance mailed on Jul. 24, 2024, issued in connection with U.S. Appl. No. 18/456,941, filed Aug. 28, 2023, 11 pages.
Notice of Allowance mailed on Jun. 24, 2024, issued in connection with U.S. Appl. No. 18/447,075, filed Aug. 9, 2023, 11 pages.
Notice of Allowance mailed on Jul. 26, 2024, issued in connection with U.S. Appl. No. 18/408,865, filed Jan. 10, 2024, 9 pages.
Notice of Allowance mailed on Jun. 27, 2025, issued in connection with U.S. Appl. No. 18/657,019, filed May 7, 2024, 5 pages.
Notice of Allowance mailed on Aug. 28, 2024, issued in connection with U.S. Appl. No. 18/432,733, filed Feb. 5, 2024, 10 pages.
Notice of Allowance mailed on Jul. 29, 2024, issued in connection with U.S. Appl. No. 18/459,982, filed Sep. 1, 2023, 08 pages.
Notice of Allowance mailed on Jul. 3, 2024, issued in connection with U.S. Appl. No. 18/507,713, filed Nov. 13, 2023, 11 pages.
Notice of Allowance mailed on Jul. 31, 2024, issued in connection with U.S. Appl. No. 18/192,452, filed Mar. 29, 2023, 8 pages.
Notice of Allowance mailed on Jul. 31, 2024, issued in connection with U.S. Appl. No. 18/453,052, filed Aug. 21, 2023, 9 pages.
Notice of Allowance mailed on Aug. 7, 2024, issued in connection with U.S. Appl. No. 18/478,241, filed Sep. 29, 2023, 10 pages.
Notice of Allowance mailed on Dec. 8, 2022, issued in connection with U.S. Appl. No. 17/340,353, filed Jun. 7, 2021, 9 pages.
Notice of Allowance mailed on Nov. 9, 2016, issued in connection with U.S. Appl. No. 14/805,340, filed Jul. 21, 2015, 13 pages.
Notice of Allowance mailed on Feb. 1, 2018, issued in connection with U.S. Appl. No. 15/480,265, filed Apr. 5, 2017, 8 pages.
Notice of Allowance mailed on Nov. 1, 2021, issued in connection with U.S. Appl. No. 17/103,556, filed Nov. 24, 2020, 5 pages.
Notice of Allowance mailed on Apr. 10, 2015, issued in connection with U.S. Appl. No. 13/536,493, filed Jun. 28, 2012, 8 pages.
Notice of Allowance mailed on Aug. 10, 2018, issued in connection with U.S. Appl. No. 15/785,088, filed Oct. 16, 2017, 6 pages.
Notice of Allowance mailed on Jan. 10, 2024, issued in connection with U.S. Appl. No. 18/069,042, filed Dec. 20, 2022, 18 pages.
Notice of Allowance mailed on Jul. 10, 2018, issued in connection with U.S. Appl. No. 15/673,170, filed Aug. 9, 2017, 2 pages.
Notice of Allowance mailed on Jun. 10, 2020, issued in connection with U.S. Appl. No. 16/713,858, filed Dec. 13, 2019, 8 pages.
Notice of Allowance mailed on Dec. 11, 2018, issued in connection with U.S. Appl. No. 15/909,327, filed Mar. 1, 2018, 10 pages.
Notice of Allowance mailed on Feb. 11, 2019, issued in connection with U.S. Appl. No. 15/588,186, filed May 5, 2017, 5 pages.
Notice of Allowance mailed on Jul. 11, 2017, issued in connection with U.S. Appl. No. 14/678,248, filed Apr. 3, 2015, 11 pages.
Notice of Allowance mailed on Mar. 11, 2015, issued in connection with U.S. Appl. No. 13/340,126, filed Dec. 29, 2011, 7 pages.
Notice of Allowance mailed on May 11, 2023, issued in connection with U.S. Appl. No. 17/804,372, filed May 27, 2022, 8 pages.
Notice of Allowance mailed on Apr. 12, 2016, issued in connection with U.S. Appl. No. 14/681,465, filed Apr. 8, 2015, 13 pages.
Notice of Allowance mailed on Apr. 12, 2024, issued in connection with U.S. Appl. No. 18/358,710, filed Jul. 25, 2023, 9 pages.
Notice of Allowance mailed on Aug. 12, 2019, issued in connection with U.S. Appl. No. 16/416,648, filed May 20, 2019, 7 pages.
Notice of Allowance mailed on Dec. 12, 2016, issued in connection with U.S. Appl. No. 14/805,140, filed Jul. 21, 2015, 24 pages.
Notice of Allowance mailed on Dec. 12, 2017, issued in connection with U.S. Appl. No. 14/481,505, filed Sep. 9, 2014, 9 pages.
Notice of Allowance mailed on Jan. 12, 2022, issued in connection with U.S. Appl. No. 16/994,627, filed Aug. 16, 2020, 7 pages.
Notice of Allowance mailed on Nov. 12, 2019, issued in connection with U.S. Appl. No. 15/955,545, filed Apr. 17, 2018, 9 pages.
Notice of Allowance mailed on Sep. 12, 2016, issued in connection with U.S. Appl. No. 15/066,072, filed Mar. 10, 2016, 7 pages.
Notice of Allowance mailed on Sep. 12, 2017, issued in connection with U.S. Appl. No. 15/207,682, filed Jul. 12, 2016, 8 pages.
Notice of Allowance mailed on Apr. 13, 2020, issued in connection with U.S. Appl. No. 16/181,865, filed Nov. 6, 2018, 10 pages.
Notice of Allowance mailed on Apr. 13, 2023, issued in connection with U.S. Appl. No. 18/058,639, filed Nov. 23, 2022, 15 pages.
Notice of Allowance mailed on Feb. 13, 2017, issued in connection with U.S. Appl. No. 14/864,506, filed Sep. 24, 2015, 8 pages.
Notice of Allowance mailed on Feb. 13, 2023, issued in connection with U.S. Appl. No. 17/543,430, filed Dec. 6, 2021, 10 pages.
Notice of Allowance mailed on Jul. 13, 2022, issued in connection with U.S. Appl. No. 17/033,821, filed Sep. 27, 2020, 8 pages.
Notice of Allowance mailed on Nov. 13, 2017, issued in connection with U.S. Appl. No. 14/726,921, filed Jun. 1, 2015, 8 pages.
Notice of Allowance mailed on Sep. 13, 2023, issued in connection with U.S. Appl. No. 17/543,014, filed Dec. 6, 2021, 9 pages.
Notice of Allowance mailed on Jul. 14, 2020, issued in connection with U.S. Appl. No. 16/556,297, filed Aug. 30, 2019, 11 pages.
Notice of Allowance mailed on Jun. 14, 2023, issued in connection with U.S. Appl. No. 17/816,238, filed Jul. 29, 2022, 11 pages.
Notice of Allowance mailed on Mar. 14, 2019, issued in connection with U.S. Appl. No. 15/343,996, filed Nov. 4, 2016, 8 pages.
Notice of Allowance mailed on Oct. 14, 2021, issued in connection with U.S. Appl. No. 16/115,525, filed Aug. 28, 2018, 5 pages.
Notice of Allowance mailed on Jan. 15, 2019, issued in connection with U.S. Appl. No. 16/115,524, filed Aug. 28, 2018, 8 pages.

(56) References Cited

OTHER PUBLICATIONS

Notice of Allowance mailed on Jun. 15, 2017, issued in connection with U.S. Appl. No. 15/096,827, filed Apr. 12, 2016, 5 pages.
Notice of Allowance mailed on Mar. 15, 2017, issued in connection with U.S. Appl. No. 14/826,856, filed Aug. 14, 2015, 7 pages.
Notice of Allowance mailed on May 15, 2019, issued in connection with U.S. Appl. No. 16/113,032, filed Aug. 27, 2018, 9 pages.
Notice of Allowance mailed on Nov. 15, 2021, issued in connection with U.S. Appl. No. 16/994,874, filed Aug. 17, 2020, 9 pages.
Notice of Allowance mailed on Oct. 15, 2018, issued in connection with U.S. Appl. No. 15/716,313, filed Sep. 26, 2017, 10 pages.
Notice of Allowance mailed on Sep. 15, 2022, issued in connection with U.S. Appl. No. 17/033,818, filed Sep. 27, 2020, 7 pages.
Notice of Allowance mailed on Feb. 16, 2022, issued in connection with U.S. Appl. No. 16/919,467, filed Jul. 2, 2020, 9 pages.
Notice of Allowance mailed on Jan. 16, 2024, issued in connection with U.S. Appl. No. 17/810,549, filed Jul. 1, 2022, 7 pages.
Notice of Allowance mailed on Jul. 16, 2020, issued in connection with U.S. Appl. No. 16/530,324, filed Aug. 2, 2019, 9 pages.
Notice of Allowance mailed on Jun. 16, 2017, issued in connection with U.S. Appl. No. 14/884,001, filed Oct. 15, 2015, 8 pages.
Notice of Allowance mailed on May 16, 2019, issued in connection with U.S. Appl. No. 16/181,213, filed Nov. 5, 2018, 10 pages.
Notice of Allowance mailed on Oct. 16, 2017, issued in connection with U.S. Appl. No. 15/478,770, filed Apr. 4, 2017, 10 pages.
Notice of Allowance mailed on Oct. 16, 2019, issued in connection with U.S. Appl. No. 16/401,981, filed May 2, 2019, 8 pages.
Dell, Inc. "Start Here," Jun. 2000, 2 pages.
"Denon 2003-2004 Product Catalog," Denon, 2003-2004, 44 pages.
European Patent Office, European EPC Article 94.3 and Rule 164(2)(b) mailed on Nov. 23, 2023, issued in connection with European Application No. 20761443.9, 15 pages.
European Patent Office, European EPC Article 94.3 mailed on Aug. 16, 2021, issued in connection with European Application No. 19765920.4, 5 pages.
European Patent Office, European EPC Article 94.3 mailed on Feb. 2, 2024, issued in connection with European Application No. 21171959.6, 9 pages.
European Patent Office, European EPC Article 94.3 mailed on Oct. 29, 2021, issued in connection with European Application No. 20196286.7, 5 pages.
European Patent Office, European EPC Article 94.3 mailed on Feb. 3, 2023, issued in connection with European Application No. 19765920.4, 5 pages.
European Patent Office, European EPC Article 94.3 mailed on Apr. 30, 2021, issued in connection with European Application No. 20196286.7, 5 pages.
European Patent Office, European EPC Article 94.3 mailed on Jan. 30, 2024, issued in connection with European Application No. 22155834.9, 4 pages.
European Patent Office, European Examination Report mailed on May 11, 2018, issued in connection with European Application No. 16748186.0, 6 pages.
European Patent Office, European Extended Search Report mailed on Jun. 10, 2022, issued in connection with European Application No. 22155834.9, 8 pages.
European Patent Office, European Extended Search Report mailed on Dec. 11, 2020, issued in connection with European Application No. 20196286.7, 6 pages.
European Patent Office, European Extended Search Report mailed on Jan. 14, 2022, issued in connection with European Application No. 21171959.6, 12 pages.
European Patent Office, European Extended Search Report mailed on Apr. 15, 2024, issued in connection with European Application No. 23212793.6, 9 pages.
European Patent Office, European Extended Search Report mailed on Mar. 16, 2020, issued in connection with European Application No. 19209551.1, 7 pages.
European Patent Office, European Extended Search Report mailed on Oct. 16, 2018, issued in connection with European Application No. 17185193.4, 6 pages.
European Patent Office, European Extended Search Report mailed on Jul. 17, 2019, issued in connection with European Application No. 19167365.6, 7 pages.
European Patent Office, European Extended Search Report mailed on Mar. 25, 2020, issued in connection with European Application No. 19215348.4, 10 pages.
European Patent Office, European Extended Search Report mailed on Jun. 26, 2018, issued in connection with European Application No. 18171206.8, 9 pages.
European Patent Office, European Extended Search Report mailed on Sep. 8, 2017, issued in connection with European Application No. 17000460.0, 8 pages.
European Patent Office, European Office Action mailed on Nov. 10, 2020, issued in connection with European Application No. 19168800.1, 5 pages.
European Patent Office, European Office Action mailed on Dec. 11, 2018, issued in connection with European Application No. 15778787.0, 6 pages.
European Patent Office, European Office Action mailed on Jul. 11, 2019, issued in connection with European Application No. 15778787.0, 10 pages.
European Patent Office, European Office Action mailed on Sep. 16, 2020, issued in connection with European Application No. 15778787.0, 7 pages.
European Patent Office, European Office Action mailed on Aug. 19, 2020, issued in connection with European Application No. 17754501.9, 6 pages.
European Patent Office, European Office Action mailed on Nov. 2, 2018, issued in connection with European Application No. 18171206.8, 6 pages.
European Patent Office, European Office Action mailed on Jan. 3, 2020, issued in connection with European Application No. 17703876.7, 8 pages.
European Patent Office, European Office Action mailed on Feb. 4, 2019, issued in connection with European Application No. 17703876.7, 9 pages.
European Patent Office, European Office Action mailed on Sep. 7, 2020, issued in connection with European Application No. 19161826.3, 6 pages.
European Patent Office, European Office Action mailed on Jul. 9, 2020, issued in connection with European Application No. 19167365.6, 4 pages.
European Patent Office, European Office Action mailed on May 9, 2019, issued in connection with European Application No. 18171206.8, 7 pages.
European Patent Office, European Partial Search Report mailed on Jun. 7, 2019, issued in connection with European Application No. 19161826.3, 17 pages.
European Patent Office, European Search Report mailed on Jun. 13, 2019, issued in connection with European Application No. 18204450.3, 11 pages.
European Patent Office, European Search Report mailed on Sep. 13, 2019, issued in connection with European Application No. 19161826.3, 13 pages.
European Patent Office, European Search Report mailed on Oct. 17, 2023, issued in connection with European Application No. 23178432.3, 8 pages.
European Patent Office, European Search Report mailed on Jan. 18, 2018, issued in connection with European Patent Application No. 17185193.4, 9 pages.
European Patent Office, European Search Report mailed on Jul. 9, 2019, issued in connection with European Application No. 19168800.1, 12 pages.
European Patent Office, Examination Report mailed on Jul. 12, 2021, issued in connection with European Patent Application No. 17754501.9 6 pages.
European Patent Office, Extended European Search Report mailed on Jan. 5, 2017, issued in connection with European Patent Application No. 15765555.6, 8 pages.

(56) References Cited

OTHER PUBLICATIONS

European Patent Office, Extended Search Report mailed on Jan. 25, 2017, issued in connection with European Application No. 15765548.1, 7 pages.
European Patent Office, Extended Search Report mailed on Apr. 26, 2017, issued in connection with European Application No. 15765548.1, 10 pages.
European Patent Office, Office Action mailed on Nov. 12, 2018, issued in connection with European Application No. 17000460.0, 6 pages.
European Patent Office, Office Action mailed on Jun. 13, 2017, issued in connection with European patent application No. 17000484.0, 10 pages.
European Patent Office, Office Action mailed on Dec. 15, 2016, issued in connection with European Application No. 15766998.7, 7 pages.
European Patent Office, Summons to Attend Oral Proceedings mailed on Nov. 15, 2018, issued in connection with European Application No. 16748186.0, 57 pages.
European Patent Office, Summons to Attend Oral Proceedings mailed on Apr. 22, 2022, issued in connection with European Application No. 15778787.0, 6 pages.
European Patent Office, Summons to Attend Oral Proceedings mailed on Sep. 24, 2019, issued in connection with European Application No. 17000460.0, 5 pages.
Ex Parte Quayle Office Action mailed on Apr. 15, 2019, issued in connection with U.S. Appl. No. 15/235,598, filed Aug. 12, 2016, 7 pages.
Ex Parte Quayle Office Action mailed on Dec. 26, 2019, issued in connection with U.S. Appl. No. 16/542,418, filed Aug. 16, 2019, 7 pages.
Excerpts from Andrew Tanenbaum, Computer Networks. 4th Edition. Copyright 2003, 87 pages [produced by Google in IPR of U.S. Pat. No. 9,219,460, IPR2021-00475 on Feb. 5, 2021].
Japanese Patent Office, Office Action mailed on Jul. 24, 2018, issued in connection with Japanese Application No. 2018-514419, 5 pages.
Japanese Patent Office, Office Action mailed on Feb. 4, 2020, issued in connection with Japanese Patent Application No. 2018-500529, 6 pages.
Japanese Patent Office, Office Action mailed on Jun. 4, 2019, issued in connection with Japanese Patent Application No. 2018-112810, 4 pages.
Japanese Patent Office, Office Action mailed on May 8, 2018, issued in connection with Japanese Application No. 2017-513241, 8 pages.
Japanese Patent Office, Office Action with English Summary mailed on Jul. 18, 2017, issued in connection with Japanese Patent Application No. 2017-513171, 4 pages.
Japanese Patent Office, Translation of Office Action mailed on May 14, 2019, issued in connection with Japanese Patent Application No. 2018-500529, 5 pages.
Jo et al., "Synchronized One-to-many Media Streaming with Adaptive Playout Control," Proceedings of SPIE, 2002, pp. 71-82, vol. 4861.
John Mark and Paul Hufnagel "What is 1451.4, what are its uses and how does it work?" IEEE Standards Association, The IEEE 1451.4 Standard for Smart Transducers, 14pages.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Lei et al. An Audio Frequency Acquision and Release System Based on TMS320VC5509, Instrumentation Technology, Editorial Department Email, Issue 02, 2007, 4 pages.
Louderback, Jim, "Affordable Audio Receiver Furnishes Homes With MP3," TechTV Vault. Jun. 28, 2000 retrieved Jul. 10, 2014, 2 pages.
Microsoft Corporation, "Using Microsoft Outlook 2003," Cambridge College, 2003.
Motorola, "Simplefi, Wireless Digital Audio Receiver, Installation and User Guide," Dec. 31, 2001, 111 pages.
Mulcahy, John, "Room EQ Wizard: Room Acoustics Software," REW, 2014, retrieved Oct. 10, 2014, 4 pages.
Non-Final Action mailed on Jan. 29, 2016, issued in connection with U.S. Appl. No. 14/481,511, filed Sep. 9, 2014, 10 pages.
Non-Final Office Action mailed Sep. 16, 2021, issued in connection with U.S. Appl. No. 17/098,134, filed Nov. 13, 2020, 10 pages.
Non-Final Office Action mailed Jul. 21, 2021, issued in connection with U.S. Appl. No. 16/570,679, filed Sep. 13, 2019, 18 pages.
Non-Final Office Action mailed Sep. 7, 2021, issued in connection with U.S. Appl. No. 16/994,627, filed Aug. 16, 2020, 11 pages.
Non-Final Office Action mailed on Mar. 1, 2017, issued in connection with U.S. Appl. No. 15/344,069, filed Nov. 4, 2016, 20 pages.
Non-Final Office Action mailed on Nov. 1, 2017, issued in connection with U.S. Appl. No. 15/235,598, filed Aug. 12, 2016, 15 pages.
Non-Final Office Action mailed on Jun. 2, 2014, issued in connection with U.S. Appl. No. 13/340,126, filed Dec. 29, 2011, 14 pages.
Non-Final Office Action mailed on Jun. 2, 2017, issued in connection with U.S. Appl. No. 15/229,693, filed Aug. 5, 2016, 18 pages.
Non-Final Office Action mailed on Nov. 2, 2017, issued in connection with U.S. Appl. No. 15/166,241, filed May 26, 2016, 12 pages.
Non-Final Office Action mailed on Oct. 2, 2017, issued in connection with U.S. Appl. No. 15/005,853, filed Jan. 25, 2016, 8 pages.
Non-Final Office Action mailed on Feb. 3, 2016, issued in connection with U.S. Appl. No. 14/481,522, filed Sep. 9, 2014, 12 pages.
Non-Final Office Action mailed on Jul. 3, 2018, issued in connection with U.S. Appl. No. 15/909,327, filed Mar. 1, 2018, 30 pages.
Non-Final Office Action mailed on Jan. 4, 2017, issued in connection with U.S. Appl. No. 15/207,682, filed Jul. 12, 2016, 6 pages.
Non-Final Office Action mailed on Nov. 4, 2016, issued in connection with U.S. Appl. No. 14/826,856, filed Aug. 14, 2015, 10 pages.
Non-Final Office Action mailed on Sep. 4, 2019, issued in connection with U.S. Appl. No. 16/213,552, filed Dec. 7, 2018, 16 pages.
Non-Final Office Action mailed on Jul. 5, 2017, issued in connection with U.S. Appl. No. 14/481,522, filed Sep. 9, 2014, 8 pages.
Non-Final Office Action mailed on Jul. 6, 2016, issued in connection with U.S. Appl. No. 15/070,160, filed Mar. 15, 2016, 6 pages.
Non-Final Office Action mailed on Jun. 6, 2018, issued in connection with U.S. Appl. No. 15/005,496, filed Jan. 25, 2016, 16 pages.
Non-Final Office Action mailed on Oct. 6, 2016, issued in connection with U.S. Appl. No. 14/678,263, filed Apr. 3, 2015, 30 pages.
Non-Final Office Action mailed on Dec. 7, 2015, issued in connection with U.S. Appl. No. 14/921,762, filed Oct. 23, 2015, 5 pages.
Non-Final Office Action mailed on Jul. 7, 2016, issued in connection with U.S. Appl. No. 15/066,049, filed Mar. 10, 2016, 6 pages.
Non-Final Office Action mailed on Mar. 7, 2017, issued in connection with U.S. Appl. No. 14/481,514, filed Sep. 9, 2014, 24 pages.
Non-Final Office Action mailed on Sep. 7, 2016, issued in connection with U.S. Appl. No. 14/826,873, filed Aug. 14, 2015, 12 pages.
Non-Final Office Action mailed on Jul. 8, 2016, issued in connection with U.S. Appl. No. 15/066,072, filed Mar. 10, 2016, 6 pages.
Non-Final Office Action mailed on Dec. 9, 2016, issued in connection with U.S. Appl. No. 14/678,248, filed Apr. 3, 2015, 22 pages.
Non-Final Office Action mailed on Apr. 10, 2018, issued in connection with U.S. Appl. No. 15/909,529, filed Mar. 1, 2018, 8 pages.
Non-Final Office Action mailed on Mar. 10, 2017, issued in connection with U.S. Appl. No. 14/997,868, filed Jan. 18, 2016, 10 pages.
Non-Final Office Action mailed on Sep. 10, 2018, issued in connection with U.S. Appl. No. 15/056,553, filed Feb. 29, 2016, 8 pages.
Non-Final Office Action mailed on Apr. 11, 2017, issued in connection with U.S. Appl. No. 15/088,994, filed Apr. 1, 2016, 13 pages.
Non-Final Office Action mailed on Apr. 11, 2017, issued in connection with U.S. Appl. No. 15/089,004, filed Apr. 1, 2016, 9 pages.
Non-Final Office Action mailed on Dec. 11, 2019, issued in connection with U.S. Appl. No. 16/556,297, filed Aug. 30, 2019, 9 pages.
Non-Final Office Action mailed on Dec. 11, 2019, issued in connection with U.S. Appl. No. 16/658,896, filed Oct. 21, 2019, 14 pages.

(56) References Cited

OTHER PUBLICATIONS

Non-Final Office Action mailed on Feb. 11, 2021, issued in connection with U.S. Appl. No. 17/104,466, filed Nov. 25, 2020, 39 pages.
Non-Final Office Action mailed on May 11, 2023, issued in connection with U.S. Appl. No. 17/458,673, filed Aug. 27, 2021, 18 pages.
Non-Final Office Action mailed on Oct. 11, 2017, issued in connection with U.S. Appl. No. 15/480,265, filed Apr. 5, 2017, 8 pages.
Notice of Allowance mailed on Feb. 5, 2021, issued in connection with U.S. Appl. No. 16/827,143, filed Mar. 23, 2020, 9 pages.
Notice of Allowance mailed on Jun. 5, 2019, issued in connection with U.S. Appl. No. 15/859,311, filed Dec. 29, 2017, 8 pages.
Notice of Allowance mailed on Jun. 5, 2019, issued in connection with U.S. Appl. No. 15/865,221, filed Jan. 8, 2018, 8 pages.
Notice of Allowance mailed on Mar. 5, 2019, issued in connection with U.S. Appl. No. 16/102,499, filed Aug. 13, 2018, 8 pages.
Notice of Allowance mailed on May 5, 2017, issued in connection with U.S. Appl. No. 14/826,873, filed Aug. 14, 2015, 5 pages.
Notice of Allowance mailed on May 5, 2022, issued in connection with U.S. Appl. No. 17/316,371, filed May 10, 2021, 10 pages.
Notice of Allowance mailed on Oct. 5, 2018, issued in connection with U.S. Appl. No. 16/115,524, filed Aug. 28, 2018, 10 pages.
Notice of Allowance mailed on Aug. 6, 2020, issued in connection with U.S. Appl. No. 16/564,684, filed Sep. 9, 2019, 8 pages.
Notice of Allowance mailed on Feb. 6, 2019, issued in connection with U.S. Appl. No. 15/996,878, filed Jun. 4, 2018, 8 pages.
Notice of Allowance mailed on Apr. 8, 2019, issued in connection with U.S. Appl. No. 16/011,402, filed Jun. 18, 2018, 8 pages.
Notice of Allowance mailed on Jul. 8, 2019, issued in connection with U.S. Appl. No. 15/856,791, filed Dec. 28, 2017, 5 pages.
Notice of Allowance mailed on Jun. 8, 2020, issued in connection with U.S. Appl. No. 16/658,896, filed Oct. 21, 2019, 8 pages.
Notice of Allowance mailed on Jun. 8, 2021, issued in connection with U.S. Appl. No. 17/104,466, filed Nov. 25, 2020, 8 pages.
Notice of Allowance mailed on May 8, 2018, issued in connection with U.S. Appl. No. 15/650,386, filed Jul. 14, 2017, 13 pages.
Notice of Allowance mailed on Apr. 9, 2020, issued in connection with U.S. Appl. No. 16/416,593, filed May 20, 2019, 9 pages.
Notice of Allowance mailed on Jun. 9, 2020, issued in connection with U.S. Appl. No. 15/966,534, filed Apr. 30, 2018, 16 pages.
Notice of Allowance mailed on May 9, 2019, issued in connection with U.S. Appl. No. 15/996,878, filed Jun. 4, 2018, 7 pages.
Notice of Allowance mailed on Apr. 19, 2017, issued in connection with U.S. Appl. No. 14/481,511, filed Sep. 9, 2014, 10 pages.
Palm, Inc., "Handbook for the Palm VII Handheld," May 2000, 311 pages.
Papp Istvan et al. "Adaptive Microphone Array for Unknown Desired Speaker's Transfer Function", The Journal of the Acoustical Society of America, American Institute of Physics for the Acoustical Society of America, New York, NY vol. 122, No. 2, Jul. 19, 2007, pp. 44-49.
Pre-Brief Appeal Conference Decision mailed on Mar. 19, 2019, issued in connection with U.S. Appl. No. 15/806,126, filed Nov. 7, 2017, 2 pages.
Preinterview First Office Action mailed on Oct. 6, 2016, issued in connection with U.S. Appl. No. 14/726,921, filed Jun. 1, 2015, 6 pages.
Preinterview First Office Action mailed on Jul. 12, 2017, issued in connection with U.S. Appl. No. 14/793,205, filed Jul. 7, 2015, 5 pages.
Preinterview First Office Action mailed on May 17, 2016, issued in connection with U.S. Appl. No. 14/481,505, filed Sep. 9, 2014, 7 pages.
Preinterview First Office Action mailed on May 25, 2016, issued in connection with U.S. Appl. No. 14/481,514, filed Sep. 9, 2014, 7 pages.
Presentations at WinHEC 2000, May 2000, 138 pages.
Prismiq, Inc., "PRISMIQ Media Player User Guide," 2003, 44 pages.
Rosenblatt, Jonathan et al. On the Optimality of Averaging in Distributed Statistical Learning. Information and Inference, Department of Computer Science and Applied Mathematics, Weizmann Institute of Science, vol. 5, No. 4, Jun. 16, 2015, 30 pages. Retrieved from the Internet: URL:https://arxiv.org/pdf/1407.2724.pdf.
Ross, Alex, "Wizards of Sound: Retouching acoustics, from the restaurant to the concert hall," The New Yorker, Feb. 23, 2015. Web. Feb. 26, 2015, 9 pages.
*Sonos, Inc.* v. *Google LLC*, Wdtx Case No. 6:20-cv-00881, Google's Answer and Counterclaims; dated Jan. 8, 2021, 39 pages.
Supplemental Notice of Allowability mailed on Oct. 27, 2016, issued in connection with U.S. Appl. No. 14/481,511, filed Sep. 9, 2014, 6 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Wikipedia, Server(Computing) https://web.archive.org/web/20160703173710/https://en.wikipedia.org/wiki/Server_(computing), published Jul. 3, 2016, 7 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Notice of Allowance mailed on Jun. 7, 2024, issued in connection with U.S. Appl. No. 18/316,434, filed May 12, 2023, 9 pages.
PaulStamatiou., "Review: Sonos ZonePlayer S5 All-In-One Wireless Music System," PaulStamatiou.com, 2009, pp. 1-11. acquired at https://web.archive.org/web/20101127024648/https://paulstamatiou.com/review-sonos-zoneplayer-s5-all-in-one-wireless-music-system.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
The Absolute Sound., "Sonos Multi-Room Music System," 2009, pp. 1-8. Review: https://www.theabsolutesound.com/articles/sonos-multi-room-music-system/.
International Bureau, International Preliminary Report on Patentability and Written Opinion, mailed on Jan. 15, 2019, issued in connection with International Application No. PCT/US2017/042191, filed on Jul. 14, 2017, 10 pages.
International Bureau, International Preliminary Report on Patentability and Written Opinion, mailed on Mar. 20, 2018, issued in connection with International Application No. PCT/US2016/052264, filed on Sep. 16, 2016, 10 pages.
International Bureau, International Preliminary Report on Patentability and Written Opinion, mailed on Mar. 20, 2018, issued in connection with International Application No. PCT/US2016/052266, filed on Sep. 16, 2016, 7 pages.
International Bureau, International Preliminary Report on Patentability and Written Opinion, mailed on Jan. 23, 2018, issued in connection with International Application No. PCT/US2016/043109, filed on Jul. 20, 2016, 7 pages.
International Bureau, International Preliminary Report on Patentability and Written Opinion, mailed on Jan. 23, 2018, issued in connection with International Application No. PCT/US2016/043116, filed on Jul. 20, 2016, 8 pages.
International Bureau, International Preliminary Report on Patentability and Written Opinion, mailed on Oct. 24, 2017, issued in connection with International Application No. PCT/US2016/028997, filed on Apr. 22, 2016, 7 pages.
International Bureau, International Preliminary Report on Patentability and Written Opinion, mailed on Jan. 9, 2018, issued in connection with International Application No. PCT/US2016/041179, filed on Jul. 6, 2016, 6 pages.

(56) References Cited

OTHER PUBLICATIONS

International Bureau, International Preliminary Report on Patentability, mailed on Mar. 2, 2021, issued in connection with International Application No. PCT/US2019/048366, filed on Aug. 27, 2019, 7 pages.
International Bureau, International Preliminary Report on Patentability, mailed on Mar. 2, 2021, issued in connection with International Application No. PCT/US2019/048569, filed on Aug. 28, 2019, 11 pages.
International Bureau, International Preliminary Report on Patentability, mailed on Sep. 24, 2015, issued in connection with International Application No. PCT/US2014/030560, filed on Mar. 17, 2014, 7 pages.
International Bureau, International Preliminary Report on Patentability mailed on Sep. 29, 2016, issued in connection with International Application No. PCT/US2015/020993, filed on Mar. 17, 2015, 8 pages.
International Bureau, International Preliminary Report on Patentability mailed on Sep. 29, 2016, issued in connection with International Application No. PCT/US2015/021000, filed on Mar. 17, 2015, 9 pages.
International Bureau, International Preliminary Report on Patentability, mailed on Aug. 9, 2018, issued in connection with International Application No. PCT/US2017/014596, filed on Jan. 23, 2017, 11 pages.
International Bureau, International Search Report and Written Opinion mailed on Dec. 15, 2020, issued in connection with International Application No. PCT/US2020/045746, filed on Aug. 11, 2020, 23 pages.
International Bureau, International Search Report and Written Opinion mailed on Nov. 25, 2019, issued in connection with International Application No. PCT/US2019/048569, filed on Aug. 28, 2019, 13 pages.
International Bureau, International Search Report and Written Opinion mailed on Nov. 7, 2019, issued in connection with International Application No. PCT/US2019/048366, filed on Aug. 27, 2019, 9 pages.
International Searching Authority, International Preliminary Report on Patentability mailed on Mar. 23, 2017, issued in connection with International Patent Application No. PCT/US2015/048944, filed on Sep. 8, 2015, 8 pages.
International Searching Authority, International Preliminary Report on Patentability mailed on Oct. 24, 2017, issued in connection with International Application No. PCT/US2016/028994 filed on Apr. 22, 2016, 7 pages.
International Searching Authority, International Search Report and Written Opinion mailed on Jul. 4, 2016, issued in connection with International Application No. PCT/US2016/028994, filed on Apr. 22, 2016, 12 pages.
International Searching Authority, International Search Report and Written Opinion mailed on Jul. 5, 2016, issued in connection with International Application No. PCT/US2016/028997, filed on Apr. 22, 2016, 13 pages.
International Searching Authority, International Search Report and Written Opinion mailed on Jun. 5, 2015, issued in connection with International Application No. PCT/US2015/021000, filed on Mar. 17, 2015, 12 pages.
International Searching Authority, International Search Report and Written Opinion mailed on Oct. 12, 2016, issued in connection with International Application No. PCT/US2016/041179 filed on Jul. 6, 2016, 9 pages.
International Searching Authority, International Search Report and Written Opinion mailed on Jun. 16, 2015, issued in connection with International Application No. PCT/US2015/020993, filed on Mar. 17, 2015, 11 pages.
International Searching Authority, International Search Report and Written Opinion mailed on Nov. 18, 2015, issued in connection with International Application No. PCT/US2015/048954, filed on Sep. 8, 2015, 11 pages.
International Searching Authority, International Search Report and Written Opinion mailed on Oct. 18, 2016, issued in connection with International Application No. PCT/US2016/043116, filed on Jul. 20, 2016, 14 pages.
International Searching Authority, International Search Report and Written Opinion mailed on Oct. 18, 2016, issued in connection with International Application No. PCT/US2016/043840, filed on Jul. 25, 2016, 14 pages.
International Searching Authority, International Search Report and Written Opinion mailed on Nov. 23, 2015, issued in connection with International Application No. PCT/US2015/048942, filed on Sep. 8, 2015, 14 pages.
International Searching Authority, International Search Report and Written Opinion mailed on Nov. 23, 2015, issued in connection with International Application No. PCT/US2015/048944, filed on Sep. 8, 2015, 12 pages.
International Searching Authority, International Search Report and Written Opinion mailed on Nov. 23, 2016, issued in connection with International Patent Application No. PCT/US2016/052266, filed on Sep. 16, 2016, 11 pages.
International Searching Authority, International Search Report and Written Opinion mailed on Jan. 24, 2017, issued in connection with International Application No. PCT/US2016/052264, filed on Sep. 16, 2016, 17 pages.
International Searching Authority, International Search Report and Written Opinion mailed on Oct. 25, 2016, issued in connection with International Application No. PCT/US2016/043109, filed on Jul. 20, 2016, 12 pages.
International Searching Authority, International Search Report and Written Opinion mailed on Sep. 25, 2017, issued in connection with International Application No. PCT/US2017/042191, filed on Jul. 14, 2017, 16 pages.
International Searching Authority, International Search Report and Written Opinion mailed on Aug. 3, 2017, in connection with International Application No. PCT/US2017014596, 20 pages.
Japanese Patent Office, English Translation of Office Action mailed on Apr. 2, 2024, issued in connection with Japanese Application No. 2022-115789, 6 pages.
Japanese Patent Office, English Translation of Office Action mailed on May 8, 2018, issued in connection with Japanese Application No. 2017-513241, 4 pages.
Japanese Patent Office, Examination Report and Translation mailed on Dec. 7, 2021, issued in connection with Japanese Patent Application No. 2020-185230, 10 pages.
Japanese Patent Office, Japanese Office Action mailed on Oct. 3, 2017, issued in connection with Japanese Application No. 2017-501082, 7 pages.
Japanese Patent Office, Non-Final Office Action and Translation mailed on Dec. 10, 2019, issued in connection with Japanese Patent Application No. 2018-213477, 8 pages.
Japanese Patent Office, Non-Final Office Action with Translation mailed on Apr. 25, 2017, issued in connection with Japanese Patent Application No. 2016-568888, 7 pages.
Japanese Patent Office, Non-Final Office Action with Translation mailed on Oct. 3, 2017, issued in connection with Japanese Patent Application No. 2017-501082, 3 pages.
Japanese Patent Office, Notice of Reasons for Refusal and Translation mailed on Oct. 5, 2021, issued in connection with Japanese Patent Application No. 2020-134012, 10 pages.
Japanese Patent Office, Office Action and Translation mailed on Jun. 12, 2020, issued in connection with Japanese Patent Application No. 2019-056360, 6 pages.
Japanese Patent Office, Office Action and Translation mailed on Apr. 13, 2021, issued in connection with Japanese Patent Application No. 2020-048867, 4 pages.
Japanese Patent Office, Office Action and Translation mailed on Nov. 4, 2020, issued in connection with Japanese Patent Application No. 2019-141349, 6 pages.
Japanese Patent Office, Office Action and Translation mailed on Sep. 5, 2023, issued in connection with Japanese Application No. 2022-115789, 6 pages.

(56) References Cited

OTHER PUBLICATIONS

Japanese Patent Office, Office Action and Translation mailed on Mar. 7, 2023, issued in connection with Japanese Application No. 2022-001030, 11 pages.
Japanese Patent Office, Office Action mailed on Dec. 7, 2021, issued in connection with Japanese Patent Application No. 2020-185230, 8 pages.
Japanese Patent Office, Office Action mailed on Jun. 12, 2018, issued in connection with Japanese Application No. 2018-502729, 4 pages.
Japanese Patent Office, Office Action mailed on May 14, 2019, issued in connection with Japanese Patent Application No. 2018-500529, 8 pages.
Japanese Patent Office, Office Action mailed on Aug. 21, 2018, issued in connection with Japanese Application No. 2018-514418, 7 pages.
Non-Final Office Action mailed on Oct. 11, 2018, issued in connection with U.S. Appl. No. 15/856,791, filed Dec. 28, 2017, 13 pages.
Non-Final Office Action mailed on Mar. 12, 2020, issued in connection with U.S. Appl. No. 16/796,496, filed Feb. 20, 2020, 13 pages.
Non-Final Office Action mailed on Sep. 12, 2016, issued in connection with U.S. Appl. No. 14/811,587, filed Jul. 28, 2015, 24 pages.
Non-Final Office Action mailed on Aug. 13, 2021, issued in connection with U.S. Appl. No. 16/994,874, filed Aug. 17, 2020, 10 pages.
Non-Final Office Action mailed on Jul. 13, 2016, issued in connection with U.S. Appl. No. 14/940,779, filed Nov. 13, 2015, 16 pages.
Non-Final Office Action mailed on Mar. 13, 2020, issued in connection with U.S. Appl. No. 15/005,496, filed Jan. 25, 2016, 20 pages.
Non-Final Office Action mailed on Dec. 14, 2016, issued in connection with U.S. Appl. No. 14/481,505, filed Sep. 9, 2014, 19 pages.
Non-Final Office Action mailed on Mar. 14, 2017, issued in connection with U.S. Appl. No. 15/096,827, filed Apr. 12, 2016, 12 pages.
Non-Final Office Action mailed on May 14, 2019, issued in connection with U.S. Appl. No. 15/955,545, filed Apr. 17, 2018, 15 pages.
Non-Final Office Action mailed on Oct. 14, 2015, issued in connection with U.S. Appl. No. 14/216,325, filed Mar. 17, 2014, 7 pages.
Non-Final Office Action mailed on Dec. 15, 2022, issued in connection with U.S. Appl. No. 17/807,595, filed Jun. 17, 2022, 16 pages.
Non-Final Office Action mailed on May 15, 2018, issued in connection with U.S. Appl. No. 15/806,126, filed Nov. 7, 2017, 17 pages.
Non-Final Office Action mailed on May 15, 2023, issued in connection with U.S. Appl. No. 17/567,311, filed Jan. 3, 2022, 12 pages.
Non-Final Office Action mailed on Nov. 15, 2021, issued in connection with U.S. Appl. No. 17/135,308, filed Dec. 28, 2020, 19 pages.
Non-Final Office Action mailed on Jun. 16, 2017, issued in connection with U.S. Appl. No. 15/005,496, filed Jan. 25, 2016, 15 pages.
Non-Final Office Action mailed on Nov. 16, 2018, issued in connection with U.S. Appl. No. 15/996,878, filed Jun. 4, 2018, 8 pages.
Non-Final Office Action mailed on Sep. 16, 2020, issued in connection with U.S. Appl. No. 16/115,525, filed Aug. 28, 2018, 11 pages.
Non-Final Office Action mailed on Jan. 17, 2023, issued in connection with U.S. Appl. No. 17/407,793, filed Aug. 20, 2021, 9 pages.
Non-Final Office Action mailed on Aug. 18, 2020, issued in connection with U.S. Appl. No. 16/827,143, filed Mar. 23, 2020, 8 pages.
Non-Final Office Action mailed on Dec. 18, 2018, issued in connection with U.S. Appl. No. 16/011,402, filed Jun. 18, 2018, 10 pages.
Non-Final Office Action mailed on Feb. 18, 2016, issued in connection with U.S. Appl. No. 14/644,136, filed Mar. 10, 2015, 10 pages.
Non-Final Office Action mailed on Jun. 18, 2019, issued in connection with U.S. Appl. No. 15/005,496, filed Jan. 25, 2016, 15 pages.
Non-Final Office Action mailed on Mar. 18, 2022, issued in connection with U.S. Appl. No. 17/033,818, filed Sep. 27, 2020, 12 pages.
Non-Final Office Action mailed on Apr. 19, 2023, issued in connection with U.S. Appl. No. 17/807,270, filed Jun. 16, 2022, 19 pages.
Non-Final Office Action mailed on Aug. 19, 2021, issued in connection with U.S. Appl. No. 17/357,302, filed Jun. 24, 2021, 16 pages.
Non-Final Office Action mailed on Feb. 19, 2020, issued in connection with U.S. Appl. No. 16/665,415, filed Oct. 28, 2019, 53 pages.
Non-Final Office Action mailed on Jan. 19, 2024, issued in connection with U.S. Appl. No. 18/308,087, filed Apr. 27, 2023, 22 pages.
Non-Final Office Action mailed on Jul. 19, 2023, issued in connection with U.S. Appl. No. 18/066,077, filed Dec. 14, 2022, 36 pages.
Non-Final Office Action mailed on Jun. 19, 2020, issued in connection with U.S. Appl. No. 16/403,077, filed May 3, 2019, 6 pages.
Non-Final Office Action mailed on Sep. 19, 2017, issued in connection with U.S. Appl. No. 15/056,553, filed Feb. 29, 2016, 7 pages.
Non-Final Office Action mailed on Apr. 2, 2018, issued in connection with U.S. Appl. No. 15/872,979, filed Jan. 16, 2018, 6 pages.
Non-Final Office Action mailed on Aug. 2, 2017, issued in connection with U.S. Appl. No. 15/298,115, filed Oct. 19, 2016, 22 pages.
Non-Final Office Action mailed on Feb. 2, 2024, issued in connection with U.S. Appl. No. 18/297,214, filed Apr. 7, 2023, 13 pages.
Non-Final Office Action mailed on Apr. 20, 2017, issued in connection with U.S. Appl. No. 15/005,853, filed Jan. 25, 2016, 8 pages.
Non-Final Office Action mailed on Jul. 20, 2016, issued in connection with U.S. Appl. No. 14/682,182, filed Apr. 9, 2015, 13 pages.
Non-Final Office Action mailed on Jun. 20, 2017, issued in connection with U.S. Appl. No. 15/207,682, filed Jul. 12, 2016, 17 pages.
Non-Final Office Action mailed on Dec. 21, 2018, issued in connection with U.S. Appl. No. 16/181,213, filed Nov. 5, 2018, 13 pages.
Non-Final Office Action mailed on Jun. 21, 2016, issued in connection with U.S. Appl. No. 14/678,248, filed Apr. 3, 2015, 10 pages.
Non-Final Office Action mailed on Jun. 21, 2019, issued in connection with U.S. Appl. No. 16/181,865, filed Nov. 6, 2018, 12 pages.
Non-Final Office Action mailed on Nov. 21, 2014, issued in connection with U.S. Appl. No. 13/536,493, filed Jun. 28, 2012, 20 pages.
Non-Final Office Action mailed on Sep. 21, 2023, issued in connection with U.S. Appl. No. 18/352,394, filed Jul. 14, 2023, 6 pages.
Non-Final Office Action mailed on Jun. 22, 2018, issued in connection with U.S. Appl. No. 15/217,399, filed Jul. 22, 2016, 33 pages.
Non-Final Office Action mailed on Jun. 22, 2020, issued in connection with U.S. Appl. No. 16/555,832, filed Aug. 29, 2019, 15 pages.
Non-Final Office Action mailed on Oct. 22, 2019, issued in connection with U.S. Appl. No. 16/416,619, filed May 20, 2019, 12 pages.

(56) References Cited

OTHER PUBLICATIONS

Non-Final Office Action mailed on Oct. 22, 2021, issued in connection with U.S. Appl. No. 16/949,951, filed Nov. 20, 2020, 10 pages.
Non-Final Office Action mailed on Jan. 23, 2019, issued in connection with U.S. Appl. No. 16/113,032, filed Aug. 27, 2018, 8 pages.
Non-Final Office Action mailed on Jun. 23, 2023, issued in connection with U.S. Appl. No. 18/189,869, filed Mar. 24, 2023, 13 pages.
Non-Final Office Action mailed on Jan. 24, 2024, issued in connection with U.S. Appl. No. 18/189,863, filed Mar. 24, 2023, 28 pages.
Non-Final Office Action mailed on Jun. 24, 2022, issued in connection with U.S. Appl. No. 17/373,179, filed Jul. 12, 2021, 8 pages.
Non-Final Office Action mailed on May 24, 2019, issued in connection with U.S. Appl. No. 16/401,981, filed May 2, 2019, 14 pages.
Bahl P., et al., "RADAR: An In-Building RF-based User Location and Tracking System," IEEE c2000, 2000, pp. 775-784.
Corrected Notice of Allowance mailed on Aug. 15, 2025, issued in connection with U.S. Appl. No. 18/487,290, filed Oct. 16, 2023, 04 pages.
European Patent Office, European Extended Search Report mailed on Aug. 2, 2025, issued in connection with European Application No. 24219860.4, 11 pages.
European Patent Office, Summons to Attend Oral Proceedings mailed on Sep. 1, 2025, issued in connection with European Application No. 21171959.6, 9 pages.
Final Office Action mailed on Oct. 2, 2025, issued in connection with U.S. Appl. No. 18/189,863, filed Mar. 24, 2023, 33 pages.
Final Office Action mailed on Aug. 6, 2025, issued in connection with U.S. Appl. No. 19/028,592, filed Jan. 17, 2025, 35 pages.
Final Office Action mailed on Oct. 7, 2025, issued in connection with U.S. Appl. No. 18/308,087, filed Apr. 27, 2023, 25 pages.
Non-Final Office Action mailed on Sep. 10, 2025, issued in connection with U.S. Appl. No. 18/356,477, filed Jul. 21, 2023, 20 pages.
Non-Final Office Action mailed on Oct. 16, 2025, issued in connection with U.S. Appl. No. 18/440,111, filed Feb. 13, 2024, 28 pages.
Non-Final Office Action mailed on Aug. 28, 2025, issued in connection with U.S. Appl. No. 18/463,762, filed Sep. 8, 2023, 14 pages.
Notice of Allowance mailed on Aug. 15, 2025, issued in connection with U.S. Appl. No. 18/600,044, filed Mar. 8, 2024, 07 pages.
Supplemental Notice of Allowance mailed on Oct. 8, 2025, issued in connection with U.S. Appl. No. 18/424,041, filed Jan. 26, 2024, 03 pages.

* cited by examiner

CALIBRATION BASED ON AUDIO CONTENT

CROSS REFERENCE TO RELATED APPLICATIONS

This application is a continuation of U.S. patent application Ser. No. 18/058,659, filed on Nov. 23, 2022, and issued as U.S. Pat. No. 11,818,553 on Nov. 14, 2023, which is a continuation of U.S. patent application Ser. No. 17/316,371, filed on May 10, 2021, and issued as U.S. Pat. No. 11,516,612 on Nov. 29, 2022, which is a continuation of U.S. patent application Ser. No. 17/129,670, filed on Dec. 21, 2020, and issued as U.S. Pat. No. 11,006,232 on May 11, 2021, which is a continuation of U.S. patent application Ser. No. 16/944,884, filed on Jul. 31, 2020, and issued as U.S. Pat. No. 11,184,726 on Nov. 23, 2021, which is a continuation of U.S. patent application Ser. No. 16/542,418, filed on Aug. 16, 2019, and issued as U.S. Pat. No. 10,735,879 on Aug. 4, 2020, which is a continuation of U.S. patent application Ser. No. 16/011,402, filed on Jun. 18, 2018, and issued as U.S. Pat. No. 10,390,161 on Aug. 20, 2019, which is a continuation of U.S. patent application Ser. No. 15/005,853, filed on Jan. 25, 2016, and issued as U.S. Pat. No. 10,003,899 on Jun. 19, 2018, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
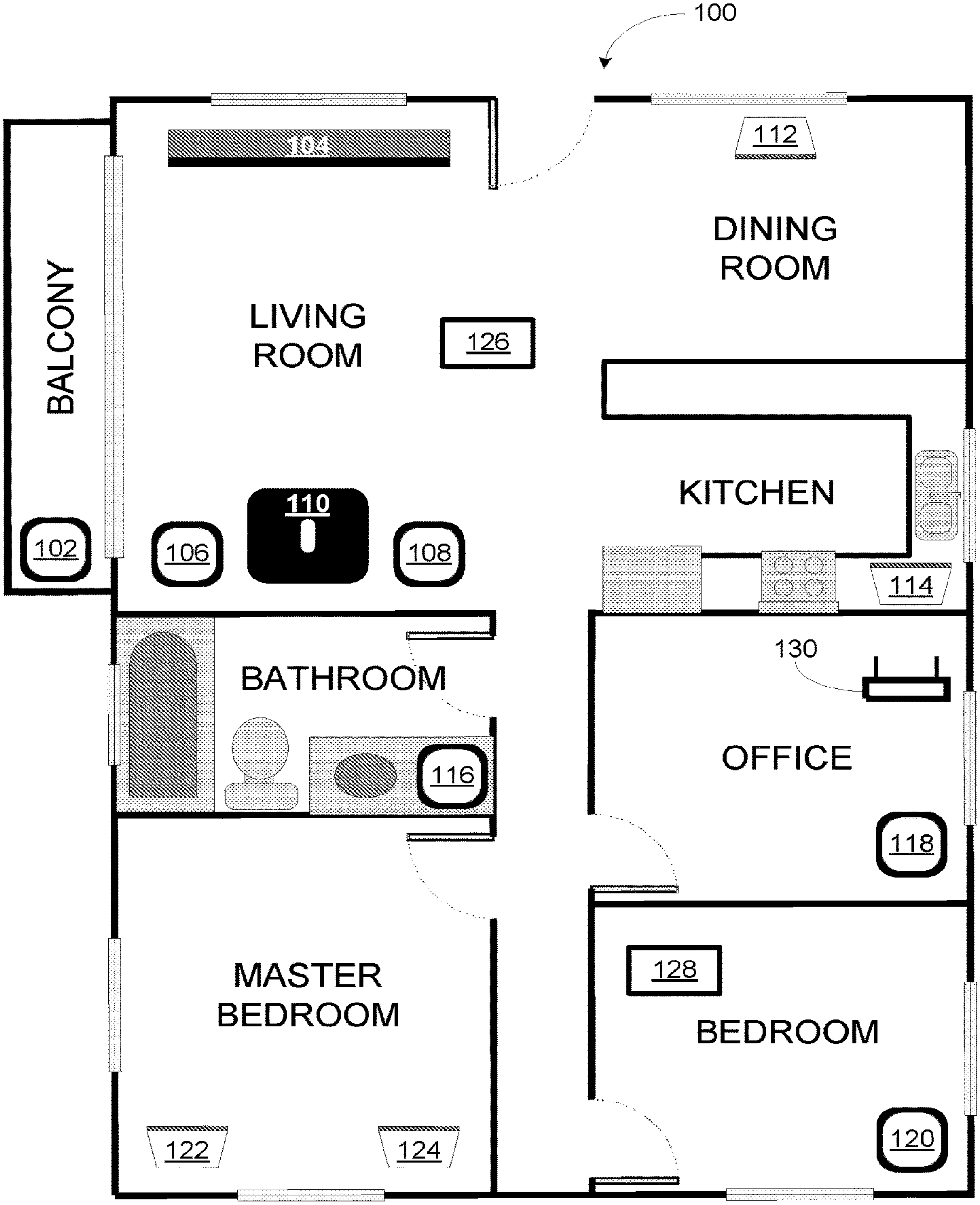
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, inter alia, techniques to facilitate calibration of a media playback system. Some calibration procedures contemplated herein involve a recording devices (e.g., a control devices) of a media playback system detecting sound waves (e.g., one or more calibration sounds) that were emitted by one or more playback devices of the media playback system. A processing device, such as one of the two or more recording devices or another device that is communicatively coupled to the media playback system, may analyze the detected sound waves to determine one or more calibrations for the one or more playback devices of the media playback system. Such calibrations may configure the one or more playback devices to a given listening area (i.e., the environment in which the playback device(s) were positioned while emitting the sound waves).

In some embodiments contemplated herein, the processing device may determine two or more calibrations for the one or more playback devices. Such calibrations may configure the one or more playback devices in different ways. In operation, one of the two or more calibrations may be applied to playback by the one or more playback devices, perhaps for different use cases. Example uses cases might include music playback or surround sound (i.e., home theater), among others.

Within examples, the calibration may include spectral and/or spatial calibration. For instance, the processing device may determine a first calibration that configures the one or more playback devices to a given listening area spectrally. Such a calibration may generally help offset acoustic characteristics of the environment and be applied during certain use cases, such as music playback. The processing device may also determine a second calibration that configures the one or more playback devices to a given listening area spatially (and perhaps also spectrally). Such a calibration may configure the one or more playback devices to one or more particular locations within the environment (e.g., one or more preferred listening positions, such as favorite seating location), perhaps by adjusting time-delay and/or loudness for those particular locations. This second calibration may be applied during other use cases, such as home theater.

In some examples, the one or more playback devices may switch among the two or more calibrations based on certain conditions, which may indicate various use cases. For instance, a playback device may apply a certain calibration based on the particular audio content being played back by the playback device. To illustrate, a playback device that is playing back an audio-only track might apply a first calibration (e.g., a calibration that includes spectral calibration) while a playback device that is playing back audio associated with video might apply a second calibration (e.g., a calibration that includes spatial calibration). If the audio content changes, the playback device might apply a different calibration. Alternatively, a certain calibration may be selected via input on a control device.

Other playback conditions might also cause the playback device to apply a certain calibration. For instance a playback device may apply a particular calibration based on the content source (e.g., a physical input or streaming audio). As another example, a playback device may apply a particular calibration based on the presence of listeners (and perhaps that those listeners are in or not in certain locations). Yet further, a playback device may apply a particular calibration based on a grouping that playback device is a member of (or perhaps based on the playback device being not a member of the grouping). Other examples are possible as well.

Acoustics of an environment may vary from location to location within the environment. Because of this variation, some calibration procedures may be improved by positioning the playback device to be calibrated within the environment in the same way that the playback device will later be operated. In that position, the environment may affect the calibration sound emitted by a playback device in a similar manner as playback will be affected by the environment during operation.

Further, some example calibration procedures may involve one or more recording devices detecting the calibration sound at multiple physical locations within the environment, which may further assist in capturing acoustic variability within the environment. To facilitate detecting the calibration sound at multiple points within an environment, some calibration procedures involve a moving microphone. For example, a microphone that is detecting the calibration sound may be moved through the environment while the calibration sound is emitted. Such movement may facilitate detecting the calibration sounds at multiple physical locations within the environment, which may provide a better understanding of the environment as a whole.

As indicated above, example calibration procedures may involve a playback device emitting a calibration sound, which may be detected by multiple recording devices. In some embodiments, the detected calibration sounds may be analyzed across a range of frequencies over which the playback device is to be calibrated (i.e., a calibration range). Accordingly, the particular calibration sound that is emitted by a playback device covers the calibratfion frequency range. The calibration frequency range may include a range of frequencies that the playback device is capable of emitting (e.g., 15-30,000 Hz) and may be inclusive of frequencies that are considered to be in the range of human hearing (e.g., 20-20,000 Hz). By emitting and subsequently detecting a calibration sound covering such a range of frequencies, a frequency response that is inclusive of that range may be determined for the playback device. Such a frequency response may be representative of the environment in which the playback device emitted the calibration sound.

In some embodiments, a playback device may repeatedly emit the calibration sound during the calibration procedure such that the calibration sound covers the calibration frequency range during each repetition. With a moving microphone, repetitions of the calibration sound are continuously detected at different physical locations within the environment. For instance, the playback device might emit a periodic calibration sound. Each period of the calibration sound may be detected by the recording device at a different physical location within the environment thereby providing a sample (i.e., a frame representing a repetition) at that location. Such a calibration sound may therefore facilitate a space-averaged calibration of the environment. When multiple microphones are utilized, each microphone may cover a respective portion of the environment (perhaps with some overlap).

Yet further, the recording devices may measure both moving and stationary samples. For instance, while the one or more playback devices output a calibration sound, a recording device may move within the environment. During such movement, the recording device may pause at one or more locations to measure stationary samples. Such locations may correspond to preferred listening locations. In another example, a first recording device and a second recording device may include a first microphone and a second microphone respectively. While the playback device emits a calibration sound, the first microphone may move and the second microphone may remain stationary, perhaps at a particular listening location within the environment (e.g., a favorite chair).

Example techniques may involve determining two or more calibrations and/or applying a given calibration to playback by one or more playback devices. A first implementation may include detecting, via one or more microphones, at least a portion of one or more calibration sounds as emitted by one or more playback devices of a zone during a calibration sequence. Such detecting may include recording first samples of the one or more calibrations sounds while the one or more microphones are in motion through a given environment and recording second samples of the one or more calibrations sounds while the one or more microphones are stationary at one or more particular locations within the given environment. The implementation may also include determining a first calibration for the one or more playback devices based on at least the first samples of the one or more calibrations sounds and determining a second calibration for the one or more playback devices based on at least the second samples of the one or more calibrations sounds. The implementation may further include applying at least one of (a) the first calibration or (b) the second calibration to playback by the one or more playback devices.

A second implementation may include displaying, via a graphical interface one or more prompts to move the control device within a given environment during a calibration sequence of a given zone that comprises one or more playback devices and detecting, via one or more microphones, at least a portion of one or more calibration sounds as emitted by the one or more playback devices during the calibration sequence. Such detecting may include recording first samples of the one or more calibrations sounds while the one or more microphones are in motion through the given environment and recording second samples of the one or more calibrations sounds while the one or more microphones are stationary at one or more particular locations within the given environment. The implementation may also include determining a first calibration for the one or more playback devices based on at least the first samples of the one or more calibrations sounds and determining a second calibration for the one or more playback devices based on at least the second samples of the one or more calibrations sounds. The implementation may further include sending at least one of the first calibration and the second calibration to the zone.

A third implementation includes a playback device receiving (i) a first calibration and (ii) a second calibration, detecting that the playback device is playing back media content in a given playback state, and applying the one of (a) the first calibration or (b) the second calibration to playback by the playback device based on the detected given playback state.

Each of the these example implementations may be embodied as a method, a device configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
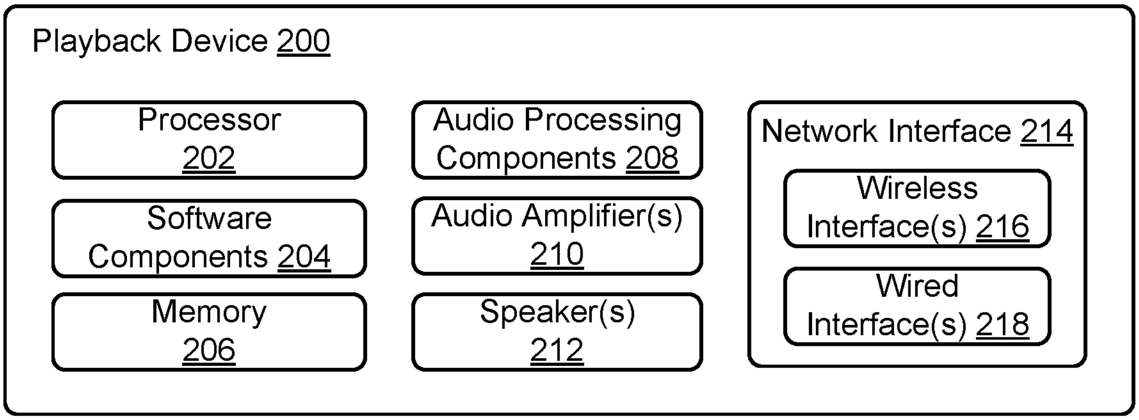
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface (s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
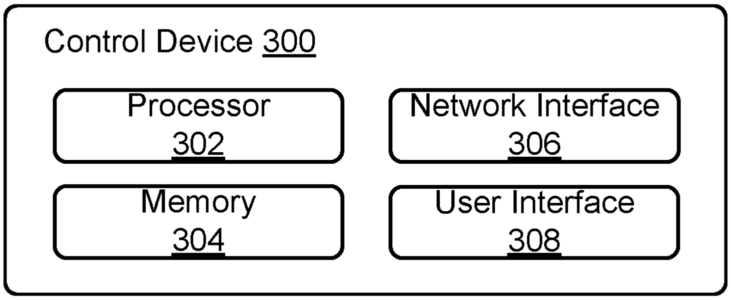
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
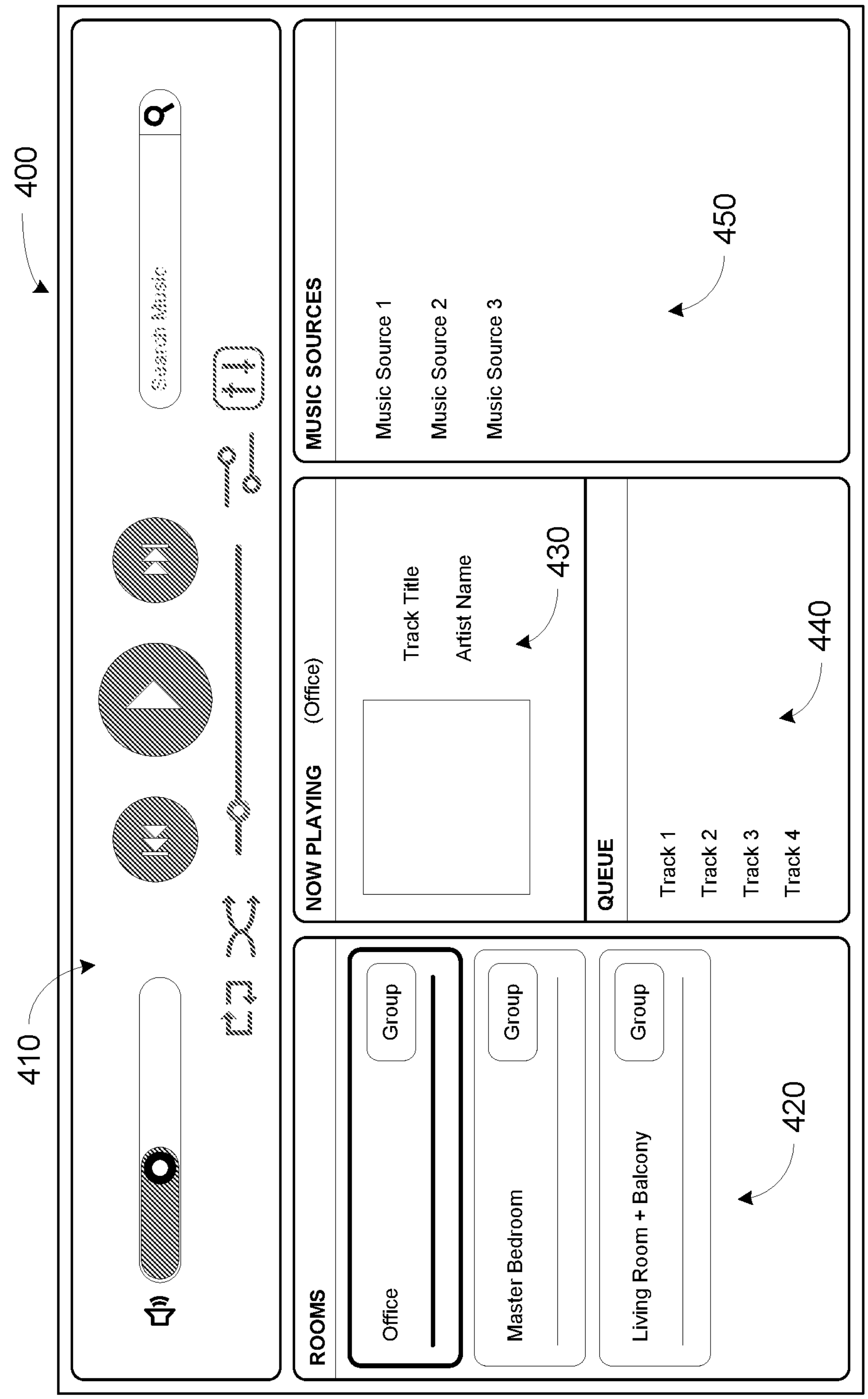
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

Figure 5:
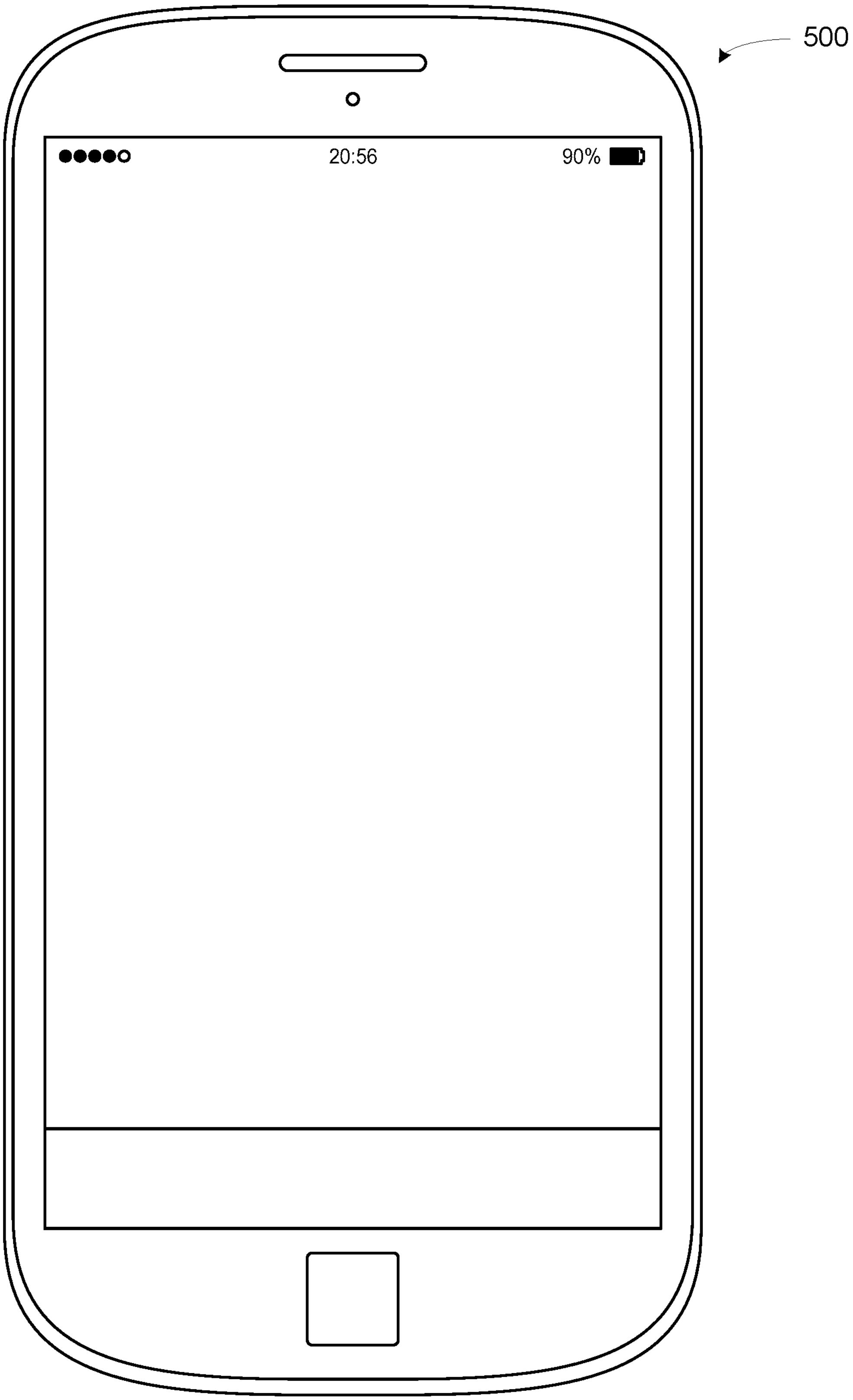
FIG. 5 shows an example control device.

FIG. 5 depicts a smartphone 500 that includes one or more processors, a tangible computer-readable memory, a network interface, and a display. Smartphone 500 might be an example implementation of control device 126 or 128 of FIG. 1, or control device 300 of FIG. 3, or other control devices described herein. By way of example, reference will be made to smartphone 500 and certain control interfaces, prompts, and other graphical elements that smartphone 500 may display when operating as a control device of a media playback system (e.g., of media playback system 100). Within examples, such interfaces and elements may be displayed by any suitable control device, such as a smartphone, tablet computer, laptop or desktop computer, personal media player, or a remote control device.

While operating as a control device of a media playback system, smartphone 500 may display one or more controller interface, such as controller interface 400. Similar to playback control region 410, playback zone region 420, playback status region 430, playback queue region 440, and/or audio content sources region 450 of FIG. 4, smartphone 500 might display one or more respective interfaces, such as a playback control interface, a playback zone interface, a playback status interface, a playback queue interface, and/or an audio content sources interface. Example control devices might display separate interfaces (rather than regions) where screen size is relatively limited, such as with smartphones or other handheld devices.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Calibration Sequence

One or more playback devices of a media playback system may output one or more calibration sounds as part of a calibration sequence or procedure. Such a calibration sequence may calibration the one or more playback devices to particular locations within a listening area. In some cases, the one or more playback devices may be joining into a grouping, such as a bonded zone or zone group. In such cases, the calibration procedure may calibrate the one or more playback devices as a group.

The one or more playback devices may initiate the calibration procedure based on a trigger condition. For instance, a recording device, such as control device 126 of media playback system 100, may detect a trigger condition that causes the recording device to initiate calibration of one or more playback devices (e.g., one or more of playback devices 102-124). Alternatively, a playback device of a media playback system may detect such a trigger condition (and then perhaps relay an indication of that trigger condition to the recording device).

In some embodiments, detecting the trigger condition may involve detecting input data indicating a selection of a selectable control. For instance, a recording device, such as control device 126, may display an interface (e.g., control interface 400 of FIG. 4), which includes one or more controls that, when selected, initiate calibration of a playback device, or a group of playback devices (e.g., a zone).

Figure 6:
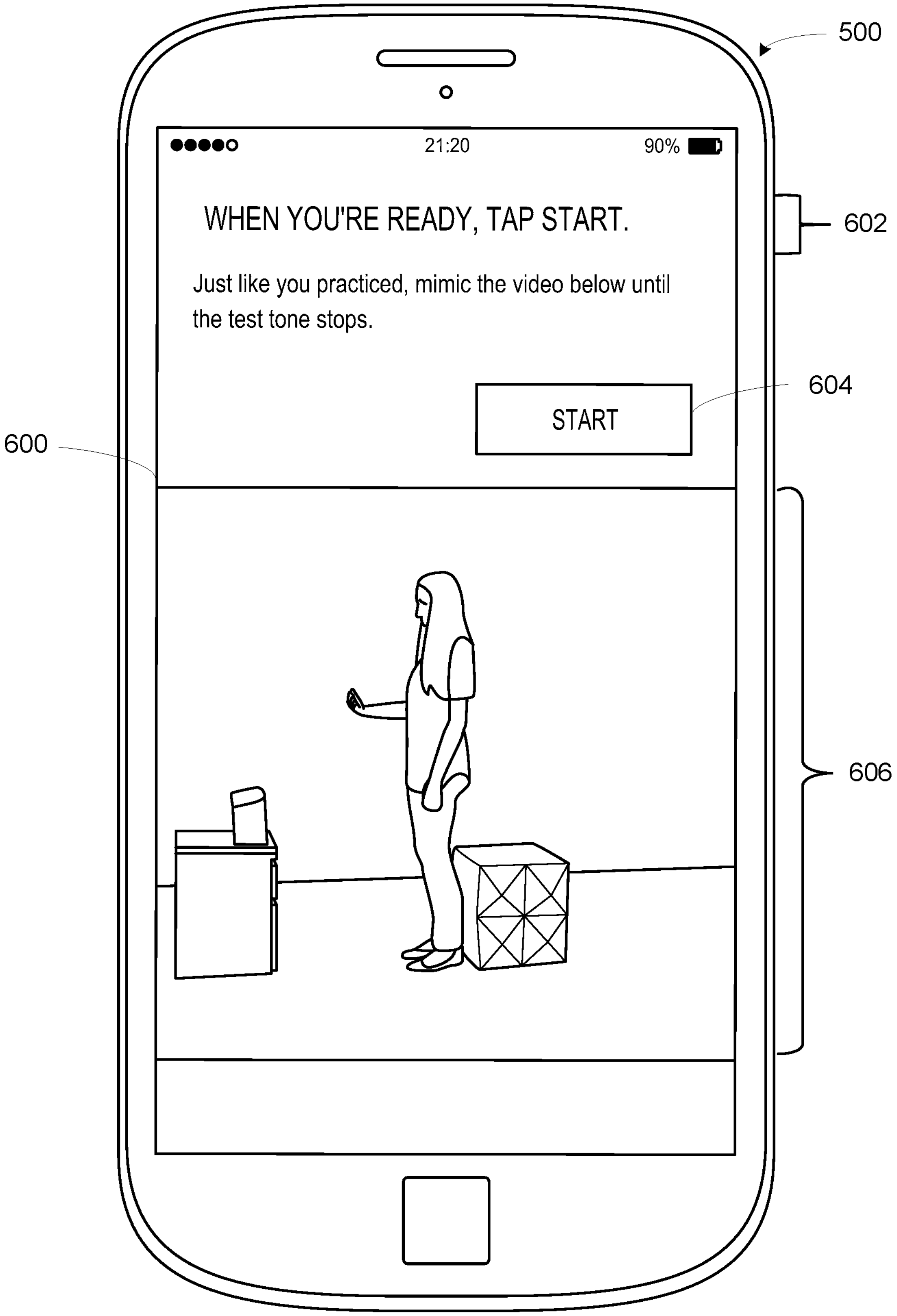
FIG. 6 shows a smartphone that is displaying an example control interface, according to an example implementation.

To illustrate such a control, FIG. 6 shows smartphone 500 which is displaying an example control interface 600. Control interface 600 includes a graphical region 602 that prompts to tap selectable control 604 (Start) when ready. When selected, selectable control 604 may initiate the calibration procedure. As shown, selectable control 604 is a button control. While a button control is shown by way of example, other types of controls are contemplated as well.

Control interface 600 further includes a graphical region 606 that includes a video depicting how to assist in the calibration procedure. Some calibration procedures may involve moving a microphone through an environment in order to obtain samples of the calibration sound at multiple physical locations. In order to prompt a user to move the microphone, the control device may display a video or animation depicting the step or steps to be performed during the calibration.

Figure 7:
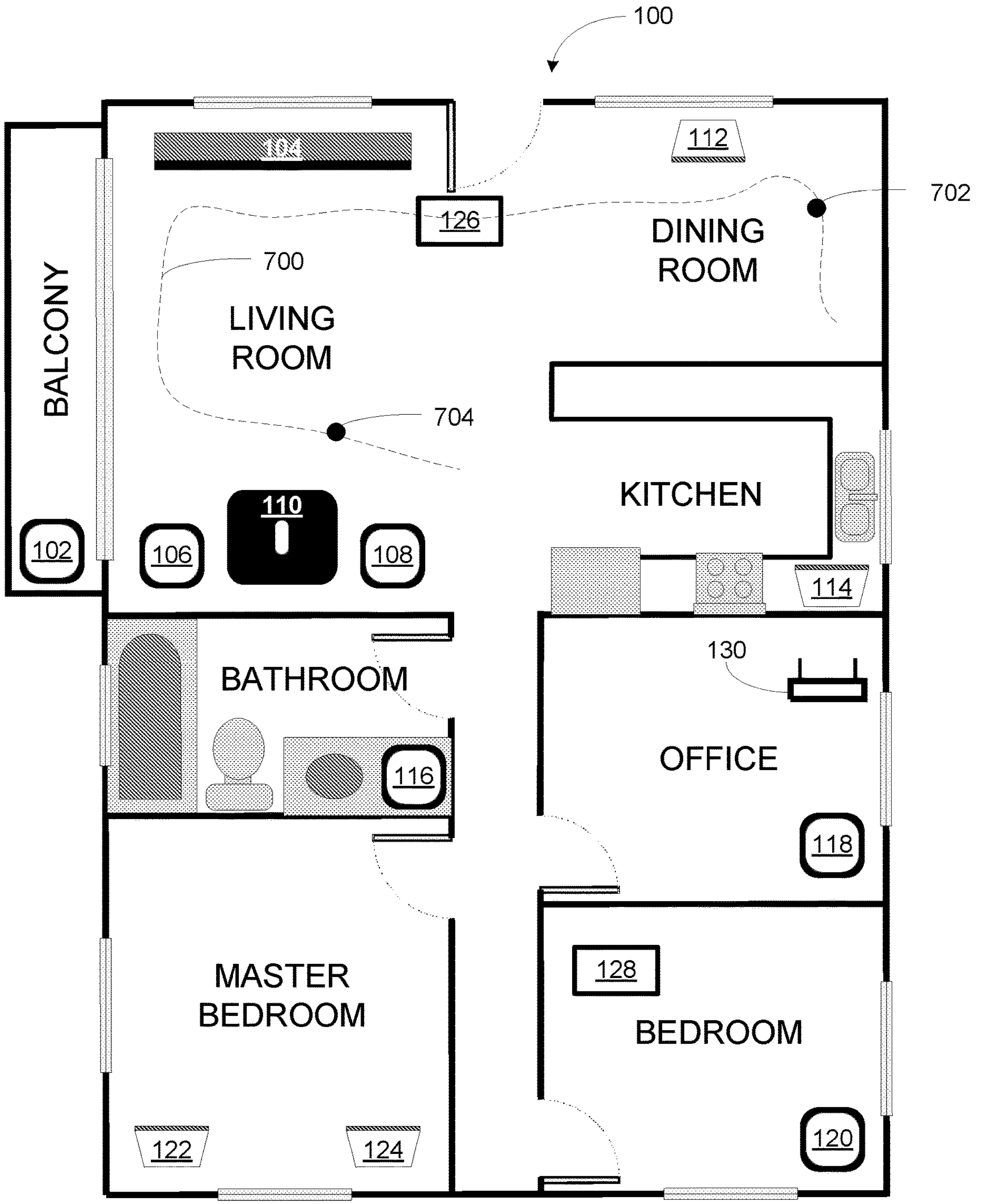
FIG. 7 illustrates an example movement through an example environment in which an example media playback system is positioned.

To illustrate movement of the control device during calibration, FIG. 7 shows media playback system 100 of FIG. 1. FIG. 7 shows a path 700 along which a recording device (e.g., control device 126) might be moved during calibration. As noted above, the recording device may indicate how to perform such a movement in various ways, such as by way of a video or animation, among other examples. A recording device might detect iterations of a calibration sound emitted by one or more playback devices of media playback system 100 at different points along the path 700, which may facilitate a space-averaged calibration of those playback devices.

In other examples, detecting the trigger condition may involve a playback device detecting that the playback device has become uncalibrated, which might be caused by moving the playback device to a different position. For example, the playback device may detect physical movement via one or more sensors that are sensitive to movement (e.g., an accelerometer). As another example, the playback device may detect that it has been moved to a different zone (e.g., from a “Kitchen” zone to a “Living Room” zone), perhaps by receiving an instruction from a control device that causes the playback device to leave a first zone and join a second zone.

In further examples, detecting the trigger condition may involve a recording device (e.g., a control device or playback device) detecting a new playback device in the system. Such a playback device may have not yet been calibrated for the environment. For instance, a recording device may detect a new playback device as part of a set-up procedure for a media playback system (e.g., a procedure to configure one or more playback devices into a media playback system). In other cases, the recording device may detect a new playback device by detecting input data indicating a request to configure the media playback system (e.g., a request to configure a media playback system with an additional playback device).

In some cases, the first recording device (or another device) may instruct the one or more playback devices to emit the calibration sound. For instance, a recording device, such as control device 126 of media playback system 100, may send a command that causes a playback device (e.g., one of playback devices 102-124) to emit a calibration sound. The control device may send the command via a network interface (e.g., a wired or wireless network interface). A playback device may receive such a command, perhaps via a network interface, and responsively emit the calibration sound.

In some embodiments, the one or more playback devices may repeatedly emit the calibration sound during the calibration procedure such that the calibration sound covers the calibration frequency range during each repetition. With a moving microphone, repetitions of the calibration sound are detected at different physical locations within the environment, thereby providing samples that are spaced throughout the environment. In some cases, the calibration sound may be periodic calibration signal in which each period covers the calibration frequency range.

To facilitate determining a frequency response, the calibration sound should be emitted with sufficient energy at each frequency to overcome background noise. To increase the energy at a given frequency, a tone at that frequency may be emitted for a longer duration. However, by lengthening the period of the calibration sound, the spatial resolution of the calibration procedure is decreased, as the moving microphone moves further during each period (assuming a relatively constant velocity). As another technique to increase the energy at a given frequency, a playback device may increase the intensity of the tone. However, in some cases, attempting to emit sufficient energy in a short amount of time may damage speaker drivers of the playback device.

Some implementations may balance these considerations by instructing the playback device to emit a calibration sound having a period that is approximately ⅜th of a second in duration (e.g., in the range of ¼ to 1 second in duration). In other words, the calibration sound may repeat at a frequency of 2-4 Hz. Such a duration may be long enough to provide a tone of sufficient energy at each frequency to overcome background noise in a typical environment (e.g., a quiet room) but also be short enough that spatial resolution is kept in an acceptable range (e.g., less than a few feet assuming normal walking speed).

In some embodiments, the one or more playback devices may emit a hybrid calibration sound that combines a first component and a second component having respective waveforms. For instance, an example hybrid calibration sound might include a first component that includes noises at certain frequencies and a second component that sweeps through other frequencies (e.g., a swept-sine). A noise component may cover relatively low frequencies of the calibration frequency range (e.g., 10-50 Hz) while the swept signal component covers higher frequencies of that range (e.g., above 50 Hz). Such a hybrid calibration sound may combine the advantages of its component signals.

Figure 8:
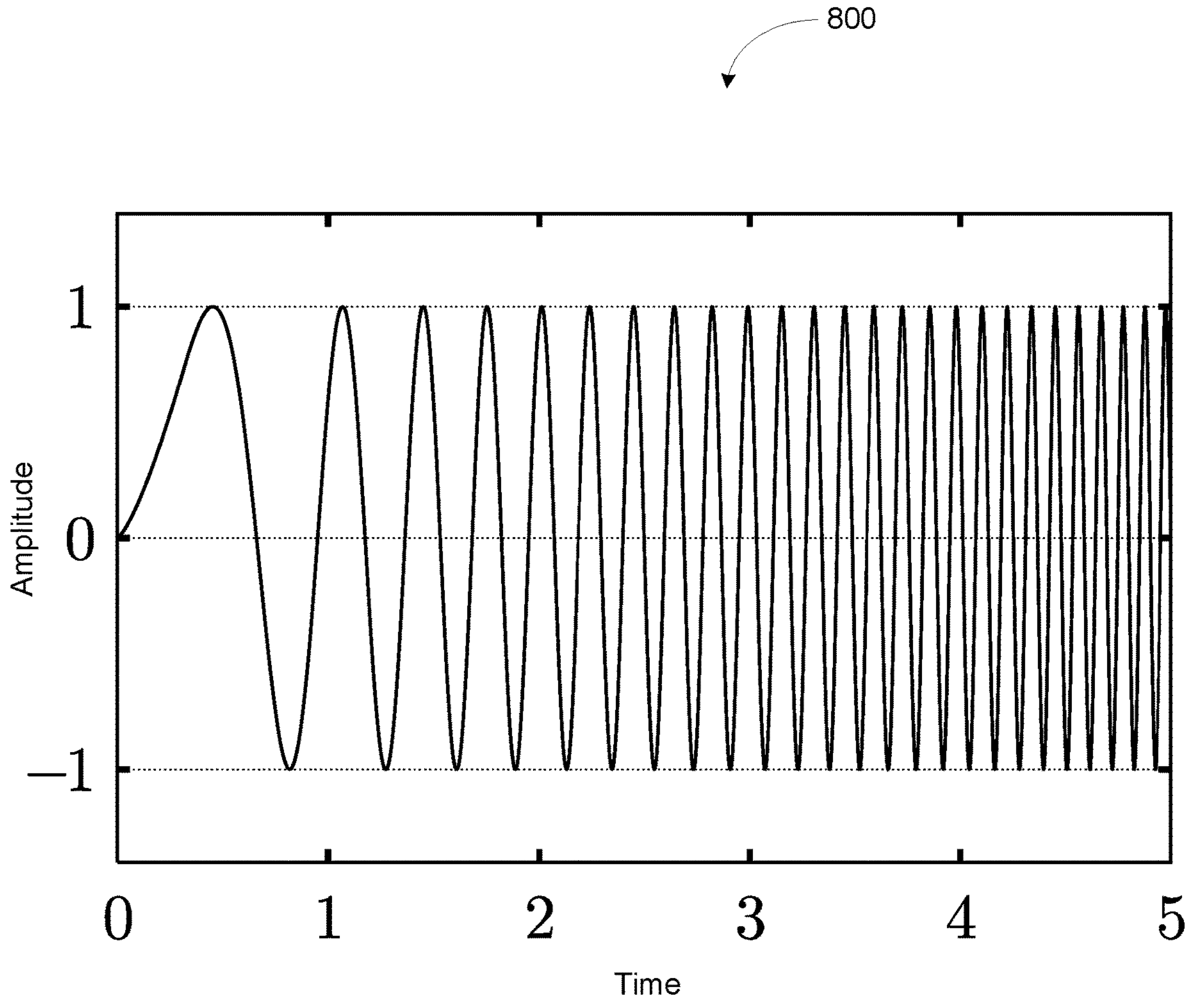
FIG. 8 illustrates an example chirp that increases in frequency over time.

A swept signal (e.g., a chirp or swept sine) is a waveform in which the frequency increases or decreases with time. Including such a waveform as a component of a hybrid calibration sound may facilitate covering a calibration frequency range, as a swept signal can be chosen that increases or decreases through the calibration frequency range (or a portion thereof). For example, a chirp emits each frequency within the chirp for a relatively short time period such that a chirp can more efficiently cover a calibration range relative to some other waveforms. FIG. 8 shows a graph 800 that illustrates an example chirp. As shown in FIG. 8, the frequency of the waveform increases over time (plotted on the X-axis) and a tone is emitted at each frequency for a relatively short period of time.

However, because each frequency within the chirp is emitted for a relatively short duration of time, the amplitude (or sound intensity) of the chirp must be relatively high at low frequencies to overcome typical background noise. Some speakers might not be capable of outputting such high intensity tones without risking damage. Further, such high intensity tones might be unpleasant to humans within audible range of the playback device, as might be expected during a calibration procedure that involves a moving microphone. Accordingly, some embodiments of the calibration sound might not include a chirp that extends to relatively low frequencies (e.g., below 50 Hz). Instead, the chirp or swept signal may cover frequencies between a relatively low threshold frequency (e.g., a frequency around 50-100 Hz) and a maximum of the calibration frequency range. The maximum of the calibration range may correspond to the physical capabilities of the channel(s) emitting the calibration sound, which might be 20,000 Hz or above.

A swept signal might also facilitate the reversal of phase distortion caused by the moving microphone. As noted above, a moving microphone causes phase distortion, which may interfere with determining a frequency response from a detected calibration sound. However, with a swept signal, the phase of each frequency is predictable (as Doppler shift). This predictability facilitates reversing the phase distortion so that a detected calibration sound can be correlated to an emitted calibration sound during analysis. Such a correlation can be used to determine the effect of the environment on the calibration sound.

As noted above, a swept signal may increase or decrease frequency over time. In some embodiments, the recording device may instruct the one or more playback devices to emit a chirp that descends from the maximum of the calibration range (or above) to the threshold frequency (or below). A descending chirp may be more pleasant to hear to some listeners than an ascending chirp, due to the physical shape of the human ear canal. While some implementations may use a descending swept signal, an ascending swept signal may also be effective for calibration.

As noted above, example calibration sounds may include a noise component in addition to a swept signal component. Noise refers to a random signal, which is in some cases filtered to have equal energy per octave. In embodiments where the noise component is periodic, the noise component of a hybrid calibration sound might be considered to be pseudorandom. The noise component of the calibration sound may be emitted for substantially the entire period or repetition of the calibration sound. This causes each frequency covered by the noise component to be emitted for a longer duration, which decreases the signal intensity typically required to overcome background noise.

Moreover, the noise component may cover a smaller frequency range than the chirp component, which may increase the sound energy at each frequency within the range. As noted above, a noise component might cover frequencies between a minimum of the frequency range and a threshold frequency, which might be, for example around a frequency around 50-100 Hz. As with the maximum of the calibration range, the minimum of the calibration range may correspond to the physical capabilities of the channel(s) emitting the calibration sound, which might be 20 Hz or below.

Figure 9:
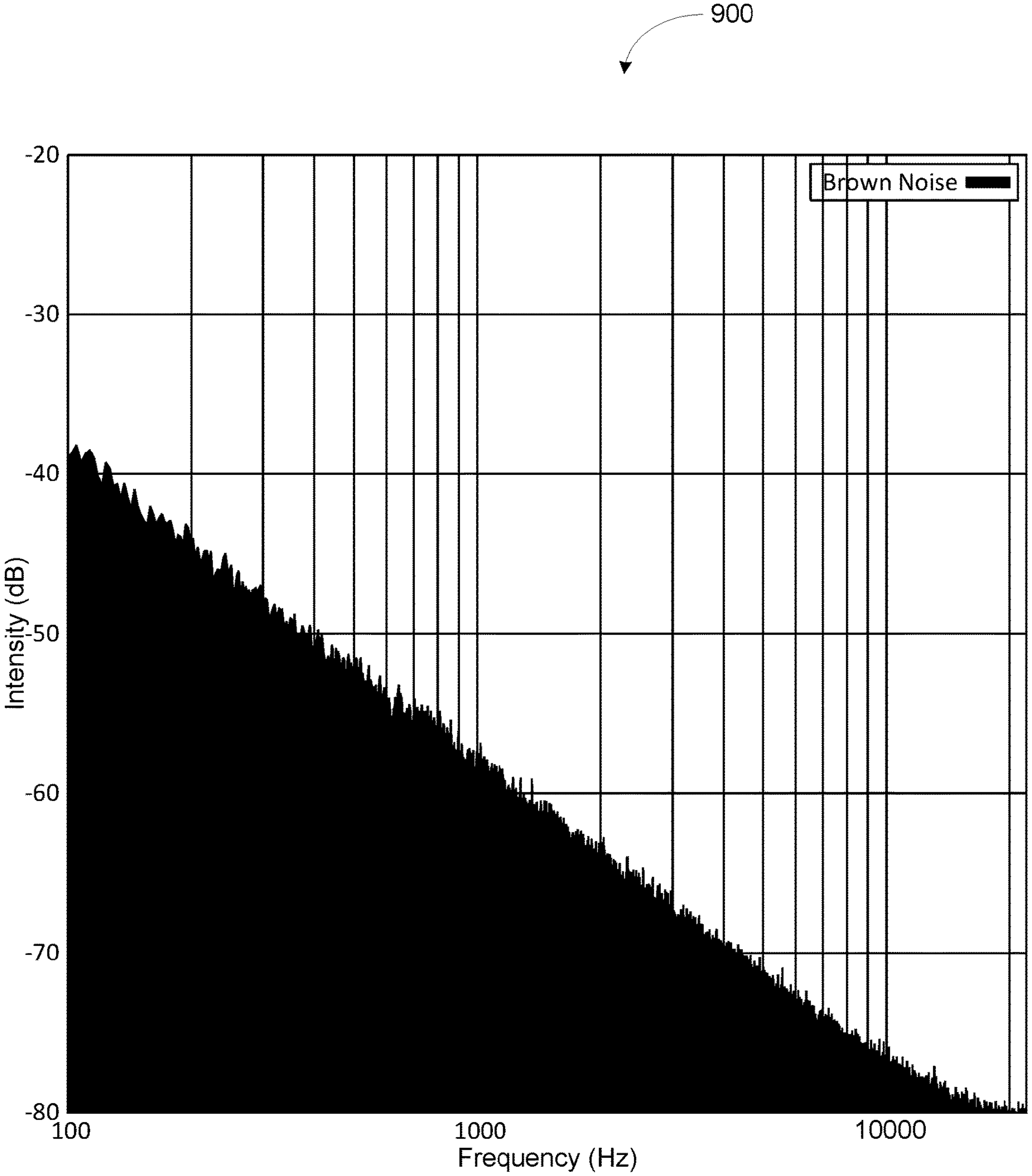
FIG. 9 shows an example brown noise spectrum.

FIG. 9 shows a graph 900 that illustrates an example brown noise. Brown noise is a type of noise that is based on Brownian motion. In some cases, the playback device may emit a calibration sound that includes a brown noise in its noise component. Brown noise has a "soft" quality, similar to a waterfall or heavy rainfall, which may be considered pleasant to some listeners. While some embodiments may implement a noise component using brown noise, other embodiments may implement the noise component using other types of noise, such as pink noise or white noise. As shown in FIG. 9, the intensity of the example brown noise decreases by 6 dB per octave (20 dB per decade).

Some implementations of a hybrid calibration sound may include a transition frequency range in which the noise component and the swept component overlap. As indicated above, in some examples, the control device may instruct the playback device to emit a calibration sound that includes a first component (e.g., a noise component) and a second component (e.g., a sweep signal component). The first component may include noise at frequencies between a minimum of the calibration frequency range and a first threshold frequency, and the second component may sweep through frequencies between a second threshold frequency and a maximum of the calibration frequency range.

To overlap these signals, the second threshold frequency may a lower frequency than the first threshold frequency. In such a configuration, the transition frequency range includes frequencies between the second threshold frequency and the first threshold frequency, which might be, for example, 50-100 Hz. By overlapping these components, the playback device may avoid emitting a possibly unpleasant sound associated with a harsh transition between the two types of sounds.

Figure 10A:
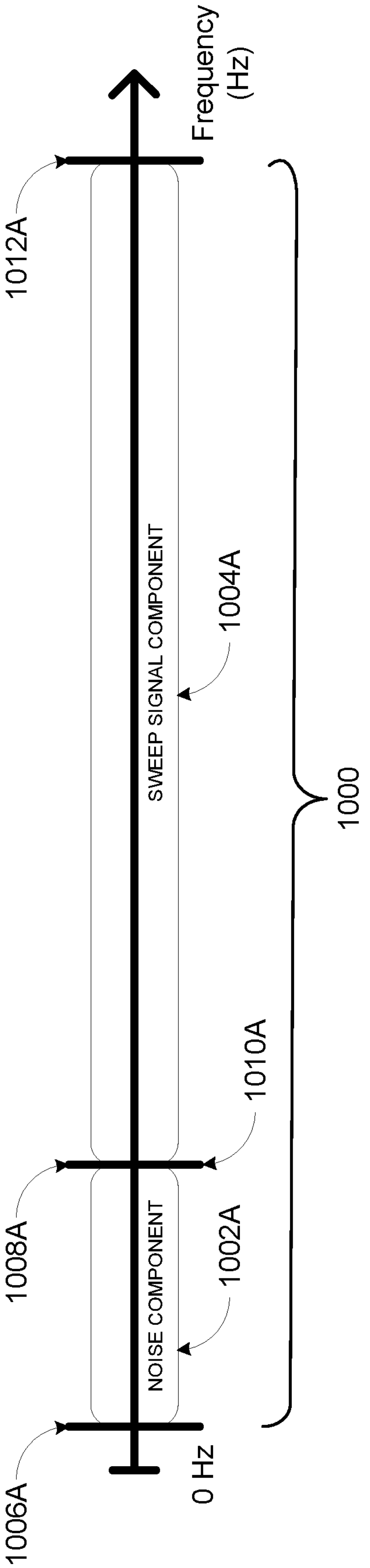
FIGS. 10A and 10B illustrate transition frequency ranges of example hybrid calibration sounds.
Figure 10B:
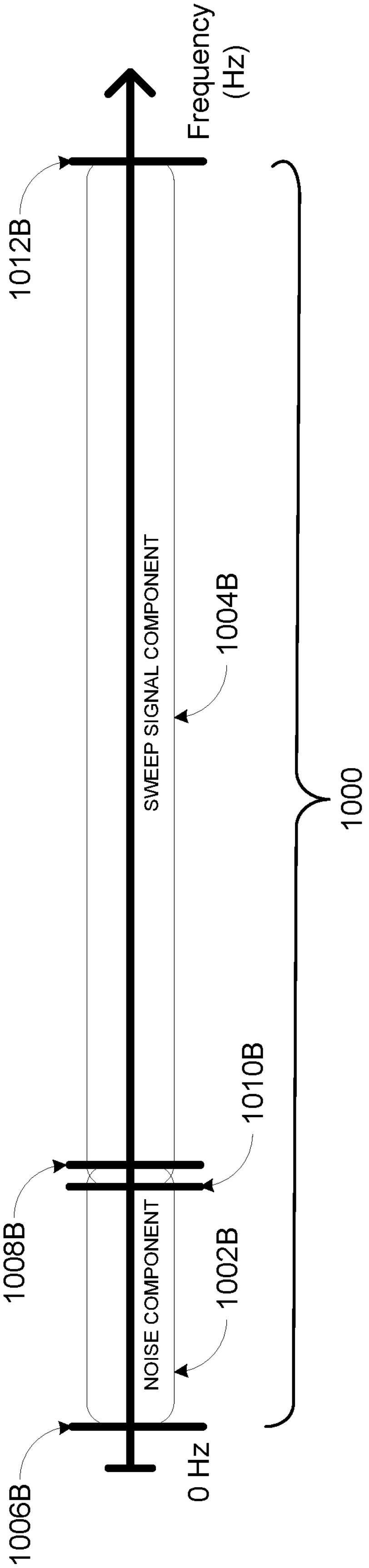

FIGS. 10A and 10B illustrate components of example hybrid calibration signals that cover a calibration frequency range 1000. FIG. 10A illustrates a first component 1002A (i.e., a noise component) and a second component 1004A of an example calibration sound. Component 1002A covers frequencies from a minimum 1008A of the calibration range 1000 to a first threshold frequency 1008A. Component 1004A covers frequencies from a second threshold 1010A to a maximum of the calibration frequency range 1000. As shown, the threshold frequency 1008A and the threshold frequency 1010A are the same frequency.

FIG. 10B illustrates a first component 1002B (i.e., a noise component) and a second component 1004B of another example calibration sound. Component 1002B covers frequencies from a minimum 1008B of the calibration range 1000 to a first threshold frequency 1008A. Component 1004A covers frequencies from a second threshold 1010B to a maximum 1012B of the calibration frequency range 1000. As shown, the threshold frequency 1010B is a lower frequency than threshold frequency 1008B such that component 1002B and component 1004B overlap in a transition frequency range that extends from threshold frequency 1010B to threshold frequency 1008B.

Figure 11:
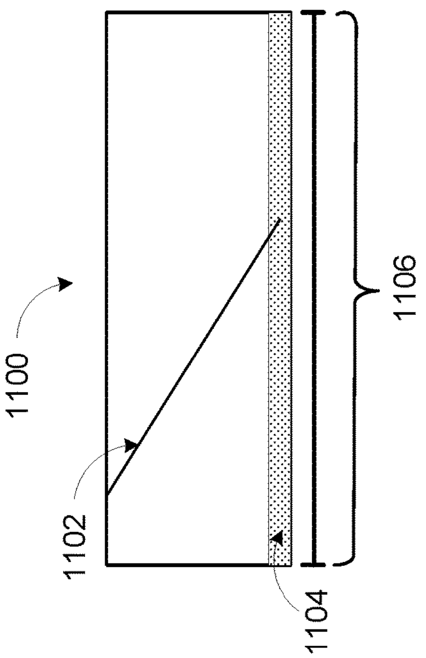
FIG. 11 shows a frame illustrating an iteration of an example periodic calibration sound.

FIG. 11 illustrates one example iteration (e.g., a period or cycle) of an example hybrid calibration sound that is represented as a frame 1100. The frame 1100 includes a swept signal component 1102 and noise component 1104. The swept signal component 1102 is shown as a downward sloping line to illustrate a swept signal that descends through frequencies of the calibration range. The noise component 1104 is shown as a region to illustrate low-frequency noise throughout the frame 1100. As shown, the swept signal component 1102 and the noise component overlap in a transition frequency range. The period 1106 of the calibration sound is approximately ⅜ths of a second (e.g., in a range of ¼ to ½ second), which in some implementation is sufficient time to cover the calibration frequency range of a single channel.

Figure 12:
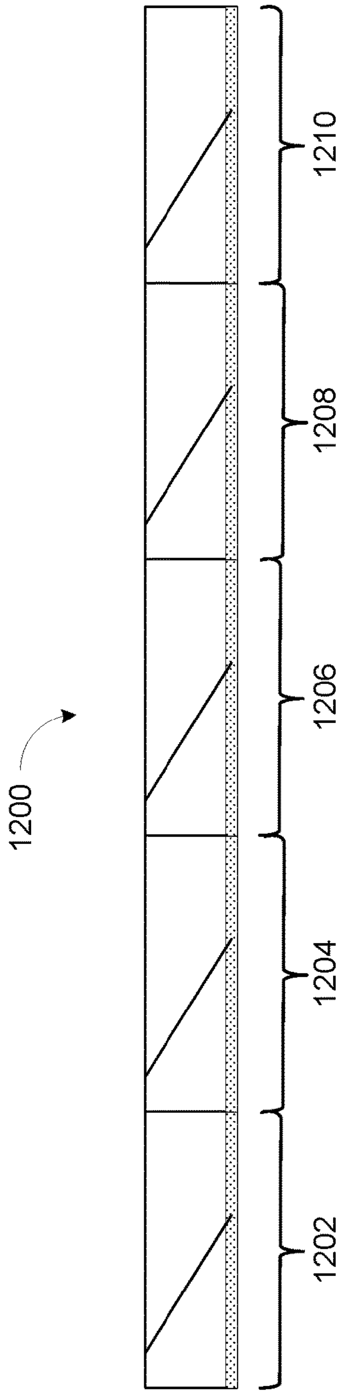
FIG. 12 shows a series of frames illustrating iterations of an example periodic calibration sound.

FIG. 12 illustrates an example periodic calibration sound 1200. Five iterations (e.g., periods) of hybrid calibration sound 1100 are represented as a frames 1202, 1204, 1206, 1208, and 1210. In each iteration, or frame, the periodic calibration sound 1200 covers a calibration frequency range using two components (e.g., a noise component and a swept signal component).

In some embodiments, a spectral adjustment may be applied to the calibration sound to give the calibration sound a desired shape, or roll off, which may avoid overloading speaker drivers. For instance, the calibration sound may be filtered to roll off at 3 dB per octave, or 1/f. Such a spectral adjustment might not be applied to vary low frequencies to prevent overloading the speaker drivers.

In some embodiments, the calibration sound may be pre-generated. Such a pre-generated calibration sound might be stored on the control device, the playback device, or on a server (e.g., a server that provides a cloud service to the media playback system). In some cases, the control device or server may send the pre-generated calibration sound to the playback device via a network interface, which the playback device may retrieve via a network interface of its own. Alternatively, a control device may send the playback device an indication of a source of the calibration sound (e.g., a URI), which the playback device may use to obtain the calibration sound.

Alternatively, the control device or the playback device may generate the calibration sound. For instance, for a given calibration range, the control device may generate noise that covers at least frequencies between a minimum of the calibration frequency range and a first threshold frequency and a swept sine that covers at least frequencies between a second threshold frequency and a maximum of the calibration frequency range. The control device may combine the swept sine and the noise into the periodic calibration sound by applying a crossover filter function. The cross-over filter function may combine a portion of the generated noise that includes frequencies below the first threshold frequency and a portion of the generated swept sine that includes frequencies above the second threshold frequency to obtain the desired calibration sound. The device generating the calibration sound may have an analog circuit and/or digital signal processor to generate and/or combine the components of the hybrid calibration sound.

Further example calibration procedures are described in U.S. patent application Ser. No. 14/805,140 filed Jul. 21, 2015, entitled "Hybrid Test Tone For Space-Averaged Room Audio Calibration Using A Moving Microphone," U.S. patent application Ser. No. 14/805,340 filed Jul. 21, 2015, entitled "Concurrent Multi-Loudspeaker Calibration with a Single Measurement," and U.S. patent application Ser. No. 14/864,393 filed Sep. 24, 2015, entitled "Facilitating Calibration of an Audio Playback Device," which are incorporated herein in their entirety.

Calibration may be facilitated via one or more control interfaces, as displayed by one or more devices. Example interfaces are described in U.S. patent application Ser. No. 14/696,014 filed Apr. 24, 2015, entitled "Speaker Calibration," and U.S. patent application Ser. No. 14/826,873 filed Aug. 14, 2015, entitled "Speaker Calibration User Interface," which are incorporated herein in their entirety.

Figure 13:
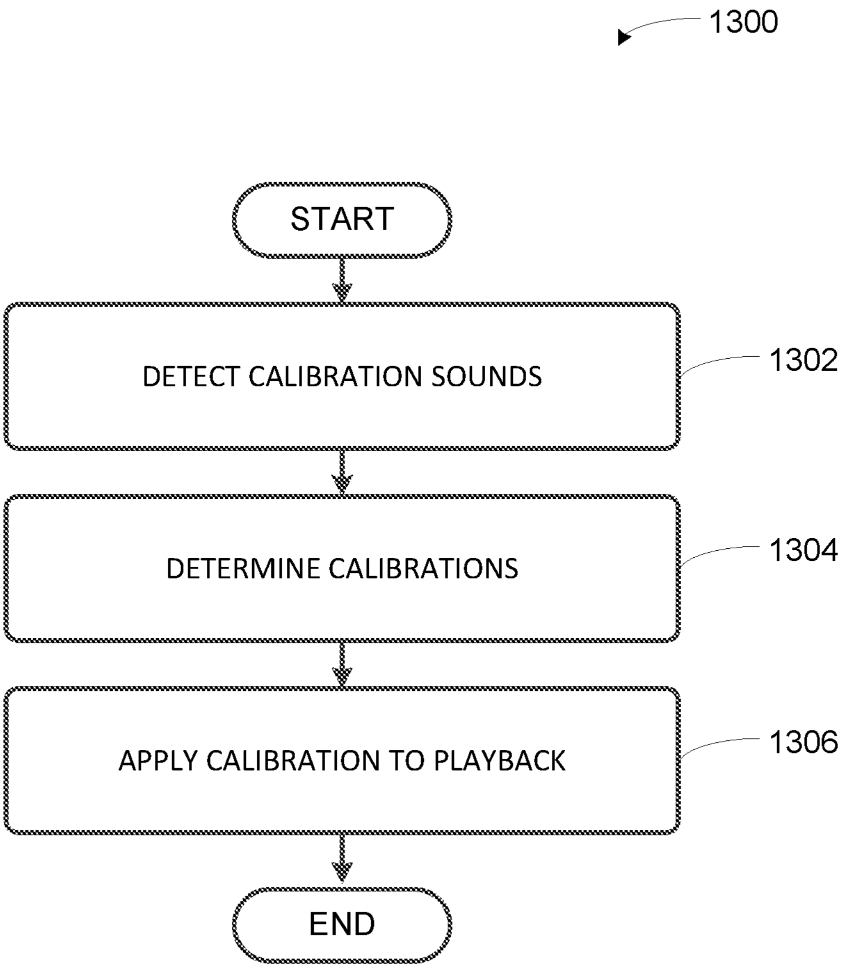
FIG. 13 shows an example flow diagram to facilitate the calibration of one or more playback devices by determining multiple calibrations.
Figure 15:
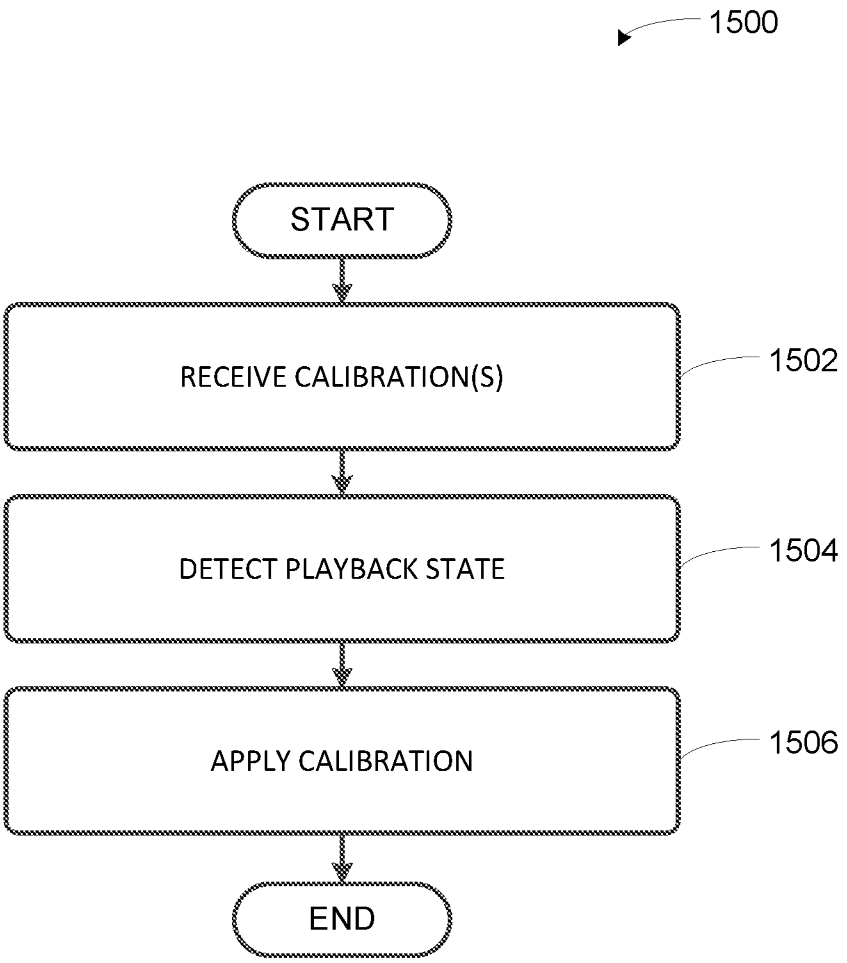
FIG. 15 shows an example flow diagram to facilitate applying one of multiple calibrations to playback.
Figure 16:
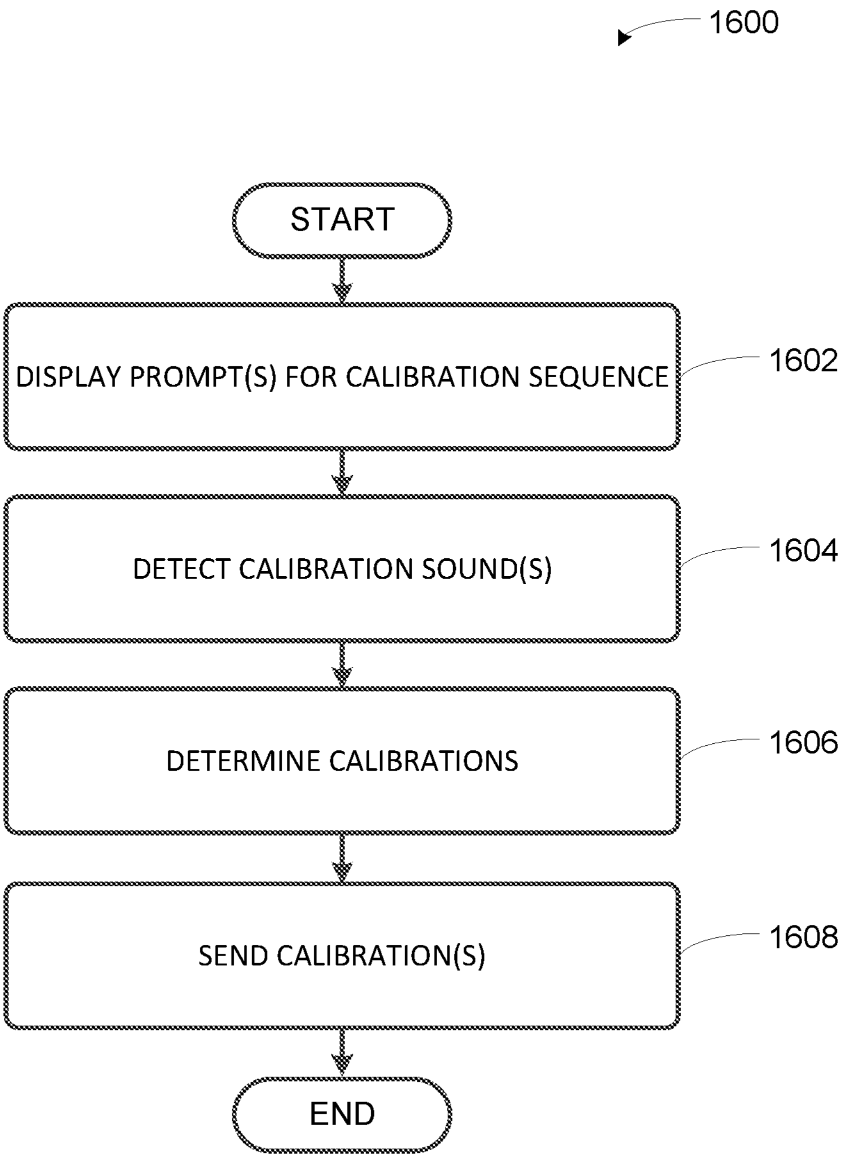
FIG. 16 shows an example flow diagram to facilitate the calibration of playback devices using a recording device.

Moving now to several example implementations, implementations 1300, 1500 and 1600 shown in FIGS. 13, 15 and 16, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3, as well as other devices described herein and/or other suitable devices. Further, operations illustrated by way of example as being performed by a media playback system can be performed by any suitable device, such as a playback device or a control device of a media playback system. Implementations 1300, 1500 and 1600 may include one or more operations, functions, or actions as illustrated by one or more of blocks shown in FIGS. 13, 15 and 16. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Techniques to Facilitate Calibration

As discussed above, embodiments described herein may facilitate the calibration of one or more playback devices by determining multiple calibrations. FIG. 13 illustrates an example implementation 1300 by which a media playback system determines a first and second calibration. One of the two calibrations may be applied to playback by one or more playback devices of the media playback system.

a. Detect Calibration Sounds as Emitted by Playback Device(s)

At block 1302, implementation 1300 involves detecting one or more calibration sounds as emitted by one or more playback devices during a calibration sequence. For instance, a recording device (e.g., control device 126 or 128 of FIG. 1) may detect one or more calibration sounds as emitted by playback devices of a media playback system (e.g., media playback system 100) via a microphone. In practice, some of the calibration sound may be attenuated or drowned out by the environment or by other conditions, which may interfere with the recording device detecting all of the calibration sound. As such, the recording device may measure a portion of the calibration sounds as emitted by playback devices of a media playback system. The calibration sound(s) may be any of the example calibration sounds described above with respect to the example calibration procedure, as well as any suitable calibration sound.

Given that the recording device is moving throughout the calibration environment, the recording device may detect iterations of the calibration sound at different physical locations of the environment, which may provide a better understanding of the environment as a whole. For example, referring back to FIG. 7, control device 126 of media playback system 100 may detect calibration sounds emitted by one or more playback devices (e.g., playback devices 104, 106, 108, and/or 110 of the Living Room Zone) at various points along the path 700 (e.g., at point 702 and/or point 704). Alternatively, the control device may record the calibration signal along the path.

As noted above, in some embodiment, a playback device may output a periodic calibration sound (or perhaps repeat the same calibration sound) such that the playback device measures a repetition of the calibration sound at different points along the paths. Each recorded repetition may be referred to as a frame. Different frames may represent responses of the environment to the calibration sound at various physical locations within the environment. Comparison of such frames may indicate how the acoustic characteristics change from one physical location in the environment to another, which influences the calibration determined for the playback device in that environment.

In some implementations, a recording device may measure one or more first samples (e.g., first frames) while in motion through a given environment. In some implementations, the first samples may indicate responses of the given environment to the calibration sound at a plurality of locations throughout the environment. In combination, such responses may indicate response of the environment generally. Such responses may ultimately be used in determining a first calibration for the one or more playback devices (e.g., a spectral calibration).

Further, a recording device may measure one or more second samples (e.g., second frames) while stationary at one or more particular locations within the given environment. The second samples may indicate responses of the given environment to the calibration sound at the one or more particular locations. Such locations may correspond to preferred listening locations (e.g., a favorite chair or other seated or standing location). Frames measured at such locations may represent respective response of the environment to the calibration sound as detected in those locations. A given listening location may cover a certain area (e.g., a sofa may cover a portion of a living room). As such, while measuring a response of such an location, remaining stationary while measuring samples at that location may involve some movement generally within a certain area associated with the location.

Such responses may ultimately be used in determining a second calibration for the one or more playback devices (e.g., a spatial calibration), which may configure output from the one or more speakers to those locations. In some cases, a recording device may measure multiple samples or frames at a particular location. These samples may be combined (e.g., averaged) to determine a response for that particular location.

While the recording device is detecting the one or more calibration sounds, movement of that recording device through the listening area may be detected. Such movement may be detected using a variety of sensors and techniques. For instance, the first recording device may receive movement data from a sensor, such as an accelerometer, GPS, or inertial measurement unit. In other examples, a playback device may facilitate the movement detection. For example, given that a playback device is stationary, movement of the recording device may be determined by analyzing changes in sound propagation delay between the recording device and the playback device.

Based on such detected movement, the recording device may identify first samples (e.g., frames) that were measured while the recording device was in motion and second samples that were measured while the recording device was stationary. For instance, if the movement data indicates that the recording device is stationary for a threshold period of time (e.g., more than a few seconds or so), the recording device may identify that location as a particular location (e.g., a preferred listening location) and further identify samples (e.g. frames) received at that location as corresponding to that location. Such samples may be used by a processing device to determine a calibration associated with the particular locations (e.g., a spatial calibration associated with preferred listening locations). Samples measured while the movement data indicates that the recording device is moving may be identified as first samples. These samples may be used by a processing device to determine a calibration associated with the environment generally (e.g., a spectral calibration).

In some embodiments, measuring the second samples at the one or more particular locations may include measuring distance from two or more playback devices to the one or more particular locations. For instance, a given zone under calibration may include a plurality of devices (e.g., playback devices 104, 106, 108, and/or 110 of the Living Room Zone). In operation, such devices may output audio jointly (e.g., in synchrony, or as respective channels of an audio content, such as stereo or surround sound content). Measure such distances may involve measuring respective propagation delays of sound from the playback devices to the recording device. Synchronization features of the playback devices described herein may facilitate such measurement, as sound emitted from the playback devices may be approximately simultaneous.

Using measured distances from such playback devices to a given location, a calibration can be determined to offset differences in the measured distances. For instance, a calibration may time output of audio by the respective playback devices to offset differences in the propagation delays of the respective playback devices. Such calibration may facilitate sound from two or more of the playback devices propagating to a particular location at around the same time. Yet further, such measured distances may be used to calibrate the two or more playback devices to different loudness such that a listener at the preferred location might perceive audio from the two or more to be approximately the same loudness. Other examples are possible as well.

Although some example calibration procedures contemplated herein suggest movement by the recording devices, such movement is not necessary. For instance, in an example calibration sequence, a first recording device may move through the environment while measuring moving frames (e.g., first frames) while a second recording device remains stationary at a preferred location. In other examples, each recording device may move and pause at one or more particular locations. Other combinations are possible as well.

b. Determine Calibrations

In FIG. 13, at block 1304, implementation 1300 involves determining two or more calibrations. For instance, a processing device may determine a first calibration and a second calibration (and possibly additional calibrations as well) for the one or more playback devices. In some cases, when applied to playback by the one or more playback devices, a given calibration may offset acoustics characteristics of the environment to achieve a given response (e.g., a flat response). For instance, if a given environment attenuates frequencies around 500 Hz and amplifies frequencies around 14000 Hz, a calibration might boost frequencies around 500 Hz and cut frequencies around 14000 Hz so as to offset these environmental effects.

Some example techniques for determining a calibration are described in U.S. patent application Ser. No. 13/536,493 filed Jun. 28, 2012, entitled "System and Method for Device Playback Calibration" and published as US 2014/0003625 A1, which is incorporated herein in its entirety. Example techniques are described in paragraphs [0019]-[0025] and [0068]-[0118] as well as generally throughout the specification.

Further example techniques for determining a calibration are described in U.S. patent application Ser. No. 14/216,306 filed Mar. 17, 2014, entitled "Audio Settings Based On Environment" and published as US 2015/0263692 A1, which is incorporated herein in its entirety. Example techniques are described in paragraphs [0014]-[0025] and [0063]-[0114] as well as generally throughout the specification.

Additional example techniques for determining a calibration are described in U.S. patent application Ser. No. 14/481,511 filed Sep. 9, 2014, entitled "Playback Device Calibration" and published as US 2016/0014534 A1, which is incorporated herein in its entirety. Example techniques are described in paragraphs [0017]-[0043] and [0082]-[0184] as well as generally throughout the specification.

The processing device may be implemented in various devices. In some cases, the processing device may be a control device or a playback device of the media playback system. Such a device may operate also as a recording device, such that the processing device and the recording device are the same device. Alternatively, the processing device may be a server (e.g., a server that is providing a cloud service to the media playback system via the Internet). Other examples are possible as well.

In some implementations, the processing device may determine a first calibration based on at least the first samples of the one or more calibrations sounds. As noted above, such first samples may represent respective responses of the given environment to the calibration sound at a plurality of locations throughout the environment. In combination, such responses may indicate response of the environment generally and may ultimately be used in determining a first calibration for the one or more playback devices. For instance, the processing device may determine a spectral calibration that offsets acoustics characteristics of the environment as indicated by the response(s), perhaps by boosting or cutting output at various frequencies to offset attenuation or amplification by the environment.

To illustrate, continuing the example above, control device 126 may determine a first calibration for the Living Room zone of media playback system 100, which includes playback devices 104, 106, 108, and 110. The shape of the Living Room, the open layout leading to the Kitchen and Dining Rooms, the furniture within such rooms, and other environmental factors may give the Living Room certain acoustic characteristics (e.g., by attenuating or amplifying certain frequencies). An example first calibration may be based on samples measured by control device 126 while moving through this room (e.g., along path 700). When applied to playback by this zone, the first calibration may offset some of these acoustic characteristics by boosting or cutting frequencies affected by the environment).

The processing device may determine a second calibration based on at least the second samples of the one or more calibrations sounds. As noted above, such samples may indicate responses of the given environment to the calibration sound at the one or more particular locations. Frames measured at such locations may represent respective response of the environment to the calibration sound as detected in those locations.

Based on such responses, the second calibration may determine a calibration that adjusts output of the playback devices spectrally (e.g., a spectral calibration). Such a calibration may use the first samples and/or the second samples. In some cases, the second samples may be weighted more heavily in the calibration than the first samples, so as to offset acoustics characteristics of the environment as detected in the particular location(s). In some cases, the second samples may be weighted more heavily by virtue of these samples being more numerous (as multiple samples are measured while the recording device is stationary), which may cause a combined response to weigh towards these locations. Alternatively, the particular locations might be emphasized in the spectral calibration more explicitly, or not at all.

The second calibration may also calibrate the one or more playback devices spatially. For instance, the second calibration may offset differences in the measured distances from such playback devices to the particular location(s) that correspond to the second samples. For instance, as noted above, a calibration may time output of audio by the respective playback devices to offset differences in the propagation delays of the respective playback devices. Such calibration may facilitate sound from two or more of the playback devices propagating to a particular location at around the same time.

Yet further, such measured distances may be used to calibrate the two or more playback devices to different gains. For instance, the second calibration may adjust respective gain of the one or more playback devices to offset differences such that a listener at the preferred location might perceive audio from the two or more to be approximately the same loudness. As noted above, two or more playback devices may be joined into a bonded zone or other grouping. For instance, two playback devices may be joined into a stereo pair. A second calibration for such a stereo pair may balance gain of the stereo pair to the one or more particular locations. Other examples are possible as well.

To illustrate, continuing the example above, control device 126 may determine a second calibration for the Living Room zone of media playback system 100, perhaps in addition to the first calibration for that zone described above. An example second calibration may be based on samples measured while stationary at one or more particular locations in this room (e.g., at point 704) and perhaps also on other samples measured while moving through this room (e.g., along path 700). When applied to playback by this zone, the second calibration may calibrate the Living Room zone spectrally, perhaps by offsetting acoustic characteristics of the room. Alternatively, or additionally, the second calibration may calibrate the Living Room zone spatially, perhaps by offsetting differences in respective distances between playback devices 104, 106, 108, and/or 110 and the one or more particular locations in this room (e.g., at point 704).

c. Apply a Calibration to Playback

At block 1306, implementation 1300 involves applying a calibration to playback. For instance, a recording device (e.g., a control device) may send one or more messages that instructs the one or more playback devices to apply a particular one of two or more calibrations to playback. Such messages may also include the determined calibration, which may be stored and/or maintained on the playback device(s) or a device that is communicatively coupled to the playback device(s). Alternatively, each of the one or more playback devices may identify a particular calibration to apply, perhaps based on a use case. Yet further, a playback device acting as a group coordinator for a group of playback devices (e.g., a zone group or bonded zone) may identify a particular calibration to apply to playback by the group of playback devices. In operation, when playing back media, the applied calibration may adjust output of the playback devices.

As noted above, playback devices undergoing calibration may be a member of a zone (e.g., the zones of media playback system 100). Further, such playback devices may be joined into a grouping, such as a bonded zone or zone group, and may undergo calibration as the grouping. In such embodiments, applying a calibration may be involve applying a calibration to a zone, a zone group, a bonded zone, or other configuration into which the playback devices are arranged. Further, a given calibration may include respective calibrations for multiple playback devices, perhaps adjusted for the types or capabilities of the playback device. Yet further, as noted above, individual calibrations may adjust for respective physical locations of the playback devices.

In some implementations, the media playback system may apply a particular one of the calibrations (e.g., a first or second calibration) based on one or more operating conditions, which may be indicative of different use cases. For instance, a control device may detect that a certain change has occurred such that a particular condition is present and then instruct the playback device(s) to apply a certain calibration corresponding to that particular condition. Alternatively, a playback device may detect the condition and apply a particular calibration that corresponds to that condition. Yet further, a group coordinator may detect a condition (or receive a message indicating that such a condition is present) and apply a particular condition to playback by the group.

In some examples, the media playback system may apply a certain calibration based on the audio content being played back (or that has been instructed to be played back) by the one or more playback devices. For instance, the media playback system may detect that the one or more playback devices are playing back media content that consists of only audio (e.g., music). In such cases, the media playback system may apply a particular calibration, such as a spectral calibration (e.g., the first calibration described above). Such a calibration may tune playback across an environment generally (e.g., throughout the Living Room zone).

In some configurations, the one or more playback devices may receive media content that is associated with both audio and video (e.g., a television show or movie). The playback device(s) may play back the audio portion of the content while a television or monitor plays back the video portion. When playing back such content, the media playback system may apply a particular calibration. In some cases, the media playback system may apply a spatial calibration (e.g., the second calibration described above), as such a calibration may configure playback to one or more particular locations (e.g., a seating location within the Living Room zone of media playback system 100, which may be used to watch and listen to the media content).

The media playback system may apply a certain calibration based on the source of the audio content. For instance, some playback devices may receive content via a network interface (e.g., streaming music) or via one or more physical inputs (e.g., analog line-in input or a digital input such as TOS-LINK® or HDMI®). Receiving content via a particular one of these sources may suggest a particular use case. For instance, receiving content via the network interface may indicate music playback. As such, while receiving content via the network interface, the media playback system may apply a particular calibration (e.g., the first calibration). As another example, receiving content via a particular physical input may indicate home theater use (i.e., playback of audio from a television show or movie). While playing back content from that input, the media playback system may apply a different calibration (e.g., the second calibration).

As noted above, playback devices may be joined into various groupings, such as a zone group or bonded zone. In some implementations, upon two or more playback devices being joined into a grouping, the two or more playback devices may apply a particular calibration. For instance, a zone group of two or more zones may configure the playback devices of those zones to playback media in synchrony (e.g., to playback music across multiple zones). Based on detecting that the zone group was formed, the media playback system may apply a certain calibration associated with zone groups (or the particular zone group that was formed). This might be a spectral calibration so as to tune playback across the multiple zones generally.

In some example media playback systems, one or more of the zones may be configured to operate in one or more "zone scenes." Zone scenes may cause one or more zones to play particular content at a particular time of day. For instance, a particular zone scene configured for the Kitchen zone of media playback system 100 might cause playback device 114 to playback a particular internet radio station (e.g., a news station) during breakfast (e.g., from 7:00 AM to 7:30 AM). Another example zone scene may cause the Living Room zone and the Dining Room zone to form a zone group to play a particular playlist at 6:00 PM (e.g., when the user typically arrives home from school or work). Further example zone scenes and techniques involving such scenes are described in U.S. patent application Ser. No. 11/853,790 filed Sep. 11, 2007, entitled "Controlling and manipulating groupings in a multi-zone media system," which is incorporated herein in its entirety.

A given zone scene may be associated with a particular calibration. For instance, upon entering a particular zone scene, the media playback system may apply a particular calibration associated with that zone scene to playback by the one or more playback devices. Alternatively, the content or configuration associated with a zone scene may cause the playback devices to apply a particular calibration. For example, a zone scene may involve playback of a particular media content or content source that causes the playback devices to apply a particular calibration.

In further examples, a media playback system may detect the presence and/or location of listeners in proximity to the one or more playback devices (e.g., within a zone). Such listeners may be detected using various techniques. For instance, Wi-Fi or other wireless signals from personal devices (e.g., smartphones or tablets) carried by the listeners may be detected by wireless receivers on the playback devices. Alternatively, voices may be detected by microphones on one or more devices of the media playback systems. As another example, the playback devices may detect movement of listeners near the playback devices via proximity sensors. Other examples are possible as well.

The media playback devices may apply a certain calibration based on the presence and/or location of listeners relative to the to the one or more playback devices. For instance, if there are multiple listeners in a room (e.g., in proximity to the playback devices of a zone), the media playback system may apply a particular calibration (e.g., the first calibration, so as to tune playback generally across the zone). However, if the listeners are clustered near the one or more particular locations, the media playback system may apply a different calibration (e.g., the second calibration, so as to configure playback to those locations).

Figure 14:
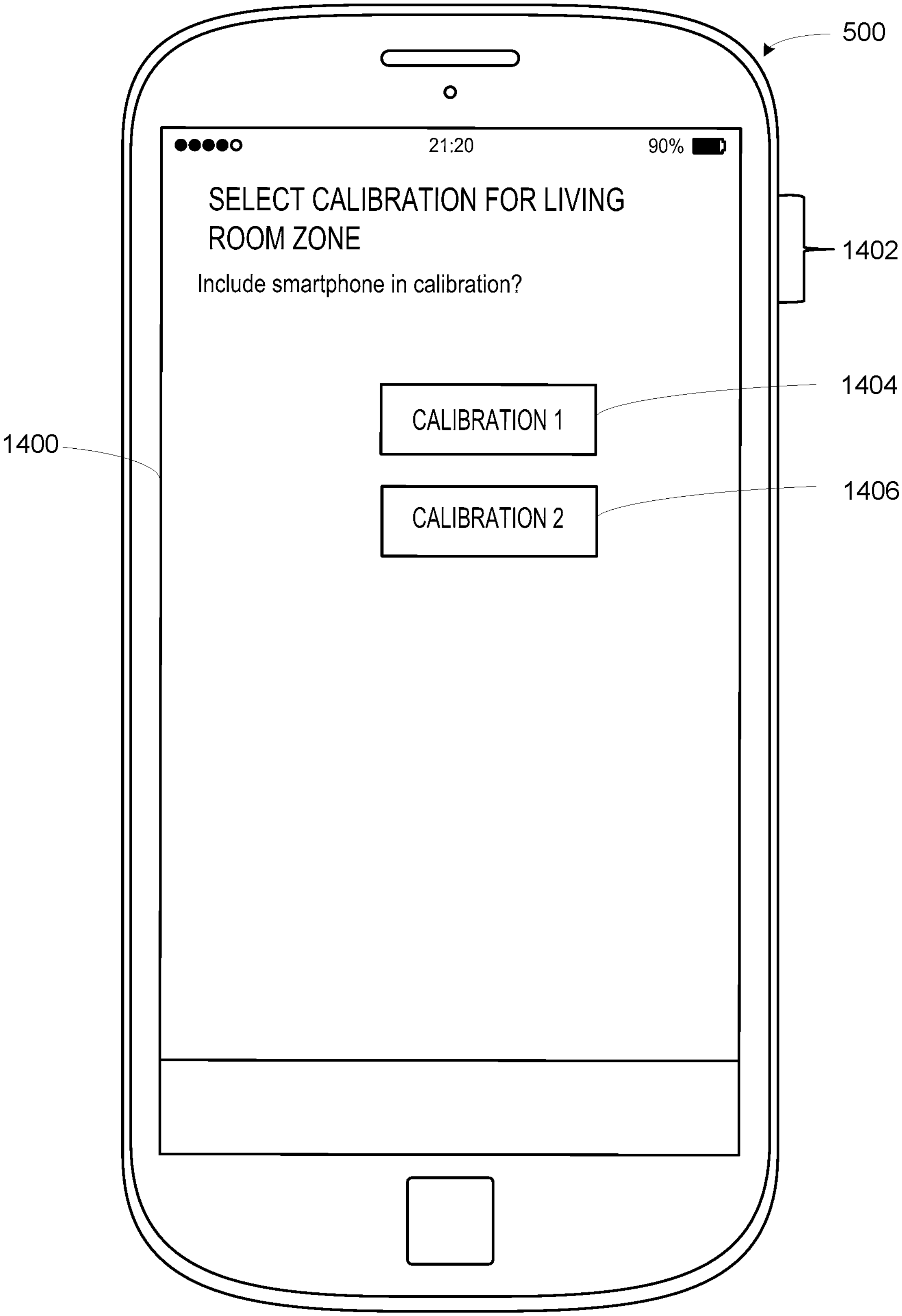
FIG. 14 shows a smartphone that is displaying an example control interface, according to an example implementation.

In yet further examples, a control device of the media playback system may display a control interface by which a particular calibration can be selected. To illustrate such an interface, FIG. 14 shows smartphone 500 which is displaying an example control interface 1400. Control interface 1400 includes a graphical region 1402 that include a prompt to select a calibration for the Living Room zone of media playback system 100. Smartphone 500 may detect input indicating a selection of selectable control 1402 or 1406. Selection of selectable control 1404 may indicate an instruction apply a first calibration to the Living Room zone. Similarly, selection of selectable control 1406 may indicate an instruction apply a second calibration to the Living Room zone.

In some examples, the calibration or calibration state may be shared among devices of a media playback system using one or more state variables. Some examples techniques involving calibration state variables are described in U.S. patent application Ser. No. 14/793,190 filed Jul. 7, 2015, entitled "Calibration State Variable," and U.S. patent application Ser. No. 14/793,205 filed Jul. 7, 2015, entitled "Calibration Indicator," which are incorporated herein in their entirety.

IV. Example Techniques to Apply a Calibration

As discussed above, embodiments described herein may involve applying one of multiple calibrations to playback by a media playback system. FIG. 15 illustrates an example implementation 1500 by which a playback device detects a particular playback state and applies a calibration corresponding to that playback state.

a. Receive Calibrations

At block 1502, implementation 1500 involves receiving two or more calibrations. For instance, a playback device may receive two or more calibrations (e.g., the first and second calibrations described above in connection with implementation 1300 of FIG. 13) via a network interface from a processing device. Such calibration may have been determined by way of a calibration sequence, such as the example calibration sequences described above. The playback device may maintain these calibrations in data storage, perhaps as one or calibration curves (e.g., as the coefficients of a bi-quad filter). Alternatively, such calibrations may be maintained on a device or system that is communicatively coupled to the playback device via a network. The playback device may receive the calibrations from this device or system, perhaps upon request from the playback device when applying a given calibration.

b. Detect Playback State

At block 1504, implementation 1500 involves detecting a playback state. For instance, the playback device may detect that it is playing back media content in a given playback state. Alternatively, the playback device may detect that it has been instructed to play back media content in a given playback state. Other examples are possible as well.

As described above, in some implementations, a particular may apply a particular one of the calibrations (e.g., a first or second calibration) based on one or more operating conditions, as described above in connection with block 1306 of implementation 1300. Such operating conditions may correspond to various playback states.

In some examples, the playback device may apply a certain calibration based on the audio content that the playback device is playing back (or that it has been instructed to play back). For instance, the playback device may detect that it is playing back media content that consists of only audio (e.g., music). In such cases, the playback device may apply a particular calibration, such as a spectral calibration (e.g., the first calibration described above). Such a calibration may tune playback across an environment generally (e.g., throughout the Living Room zone).

In some configurations, the playback device may receive media content that is associated with both audio and video (e.g., a television show or movie). When playing back such content, the playback device may apply a particular calibration. In some cases, the playback device may apply a spatial calibration (e.g., the second calibration described above), as such a calibration may configure playback to one or more particular locations (e.g., a seating location within the Living Room zone of media playback system 100, which may be used to watch and listen to the media content).

The playback device may apply a certain calibration based on the source of the audio content. Receiving content via a particular one of these sources may apply a particular use case. For instance, receiving content via a network interface may indicate music playback. As such, while receiving content via the network interface, the playback device may apply a particular calibration (e.g., the first calibration). As another example, receiving content via a particular physical input may indicate home theater use (i.e., playback of audio from a television show or movie). While playing back content from that input, the playback device may apply a different calibration (e.g., the second calibration).

As noted above, playback devices may be joined into various groupings, such as a zone group or bonded zone. In some implementations, upon being joined into a grouping with another playback device, the playback device may apply a particular calibration. For instance, based on detecting that the playback device has joined a particular zone group, the playback device may apply a certain calibration associated with zone groups (or with the particular zone group). This might be a spectral calibration so as to tune playback across the multiple zones generally.

As noted above, a given zone scene may be associated with a particular calibration. Upon entering a particular zone scene, the playback device may apply a particular calibration associated with that zone scene. Alternatively, the content or configuration associated with a zone scene may cause the playback device to apply a particular calibration. For example, a zone scene may involve playback of a particular media content or content source, which causes the playback device to apply a particular calibration.

As indicated above, a playback device may detect the presence and/or location of listeners in proximity to the one or more playback devices (e.g., within a zone). The playback device may apply a certain calibration based on the presence and/or location of listeners relative to the playback device. For instance, if there are multiple listeners in a room (e.g., in proximity to the playback devices of a zone), the playback device may apply a particular calibration (e.g., the first calibration, so as to configure playback generally across the zone). However, if the listeners are clustered near the one or more particular locations, the playback device may apply a different calibration (e.g., the second calibration, so as to configure playback to those locations).

In yet further examples, the playback state may be indicated to the playback device by way of one or more messages from a control device or another playback device. For instance, after receiving input that selects a particular calibration (e.g., via control interface 1400), a smartphone 500 may indicate to the playback device that a particular calibration is selected. The playback device may apply that calibration to playback. As another example, the playback device may be a member of a group, such as a bonded zone group. Another playback device, such as a group coordinator device of that group, may detect a playback state for the group and send a message indicating that playback state (or the calibration for that state) to the playback device.

c. Apply A Calibration

Referring again to FIG. 15, at block 1506, implementation 1500 involves applying a calibration. For instance, as described above, a playback device may apply a calibration to playback by the playback device. In operation, when playing back media, the calibration may adjust output of the playback device, perhaps to configure the playback device to its operating environment. The particular calibration applied by the playback device may be one of a plurality of calibrations that the playback device maintains or has access to, such as the first and second calibrations noted above.

In some cases, the playback device may also apply the calibration to one or more additional playback devices. For instance, the playback device may be a member (e.g., the group coordinator) of a group (e.g., a zone group). The playback device may send messages instructing other playback devices in the group to apply the calibration. Upon receiving such a message, these playback devices may apply the calibration.

V. Example Techniques to Facilitate Calibration Using a Recording Device

As noted above, embodiments described herein may facilitate the calibration of one or more playback devices. FIG. 16 illustrates an example implementation 1600 by which recording device (e.g., a control device) facilitates calibration of one or more playback devices.

a. Display Prompt(s) for Calibration Sequence

At block 1602, implementation 1600 involves displaying one or more prompts for a calibration sequence. Such prompts may serve as a guide through various aspects of a calibration sequence. For instance, such prompts may guide preparation of one or more playback devices to be calibrated, a recording device that will measure calibration sounds emitted by the one or more playback devices, and/or the environment in which the calibration will be carried out.

As noted above, example calibration sequences may involve a recording device moving through the environment so as to measure the calibration sounds at different locations. As such, example prompts displayed for a calibration sequence may include one or more prompts to move the control device. Such prompts may guide a user in moving the recording device during the calibration.

Figure 17:
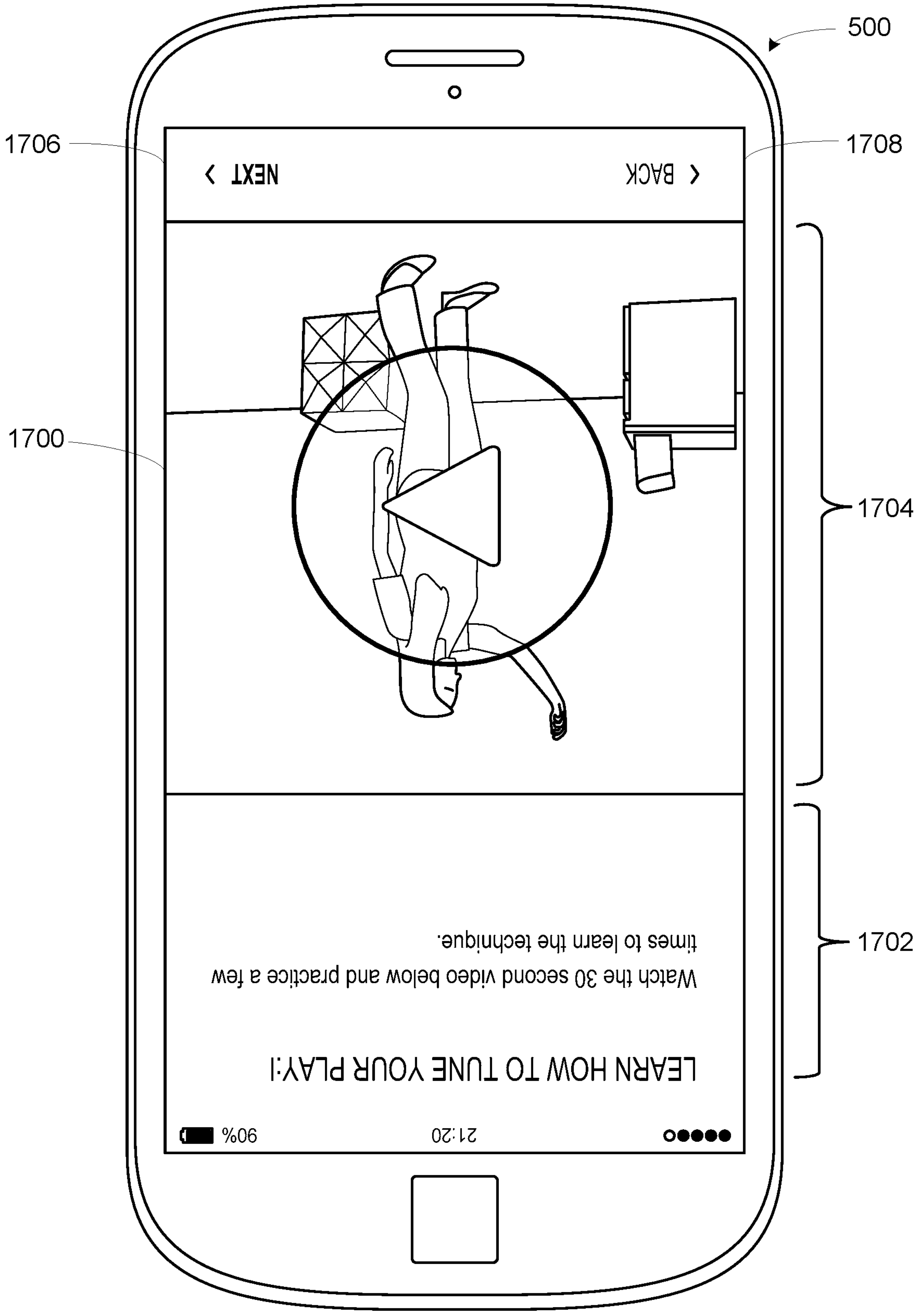
FIG. 17 shows a smartphone that is displaying an example control interface, according to an example implementation.

To illustrate, in FIG. 17, smartphone 500 is displaying control interface 1700 which includes graphical regions 1702 and 1704. Graphical region 1702 prompts to watch an animation in graphical region 1704. Such an animation may depict an example of how to move the smartphone within the environment during calibration to measure the calibration sounds at different locations. While an animation is shown in graphical region 1704 by way of example, the control device may alternatively show a video or other indication that illustrates how to move the control device within the environment during calibration. Control interface 1700 also includes selectable controls 1706 and 1708, which respectively advance and step backward in the calibration sequence.

Some recording devices, such as smartphones, have microphones that are mounted towards the bottom of the device, which may position the microphone nearer to the user's mouth during a phone call. However, when the recording device is held in a hand during the calibration procedure, such a mounting position might be less than ideal for detecting the calibration sounds. For instance, in such a position, the hand might fully or partially obstruct the microphone, which may affect the microphone measuring calibration sounds emitted by the playback device. In some cases, rotating the recording device such that its microphone is oriented upwards may improve the microphone's ability to measure the calibration sounds. To offset the rotation, the recording device may display a control interface that is rotated 180 degrees, as shown in FIG. 17. Such a control interface may offset the rotation of the device so as to orient the control interface in an appropriate orientation to view and interact with the control interface.

As described above, during an example calibration procedure, a recording device may measure one or more first samples while moving through the environment and one or more second samples while stationary at one or more particular locations (e.g., one or more preferred listening locations). To suggest such a pattern of movement, the prompts to move the recording device may include displaying a prompt to move the control device continuously through the given environment for one or more first portions of the calibration sequence and also to remain stationary with the control device at the one or more particular locations within the given environment for one or more second portions of the calibration sequence. Such prompts may guide a user in moving the recording device during the calibration so as to measure both stationary samples and samples at a plurality of other locations within the environment (e.g., as measured while moving along a path).

The one or more prompts may suggest different patterns of movement to obtain such samples. In some examples, a recording device may prompt to move to a particular location (e.g., a preferred listening location) to begin the calibration. While the recording device is at that location, the recording device may measure calibration sounds emitted by the playback devices. The recording device may then prompt to move throughout the room while the recording device measures calibration sounds emitted by the playback devices. In some examples, the recording device may pause at additional locations to obtain samples at additional preferred locations. In other examples, movement of the recording device might not begin at a preferred location. Instead, the recording device may display a prompt to move throughout the room and pause at preferred listening locations. Other patterns are possible as well.

Figure 18:
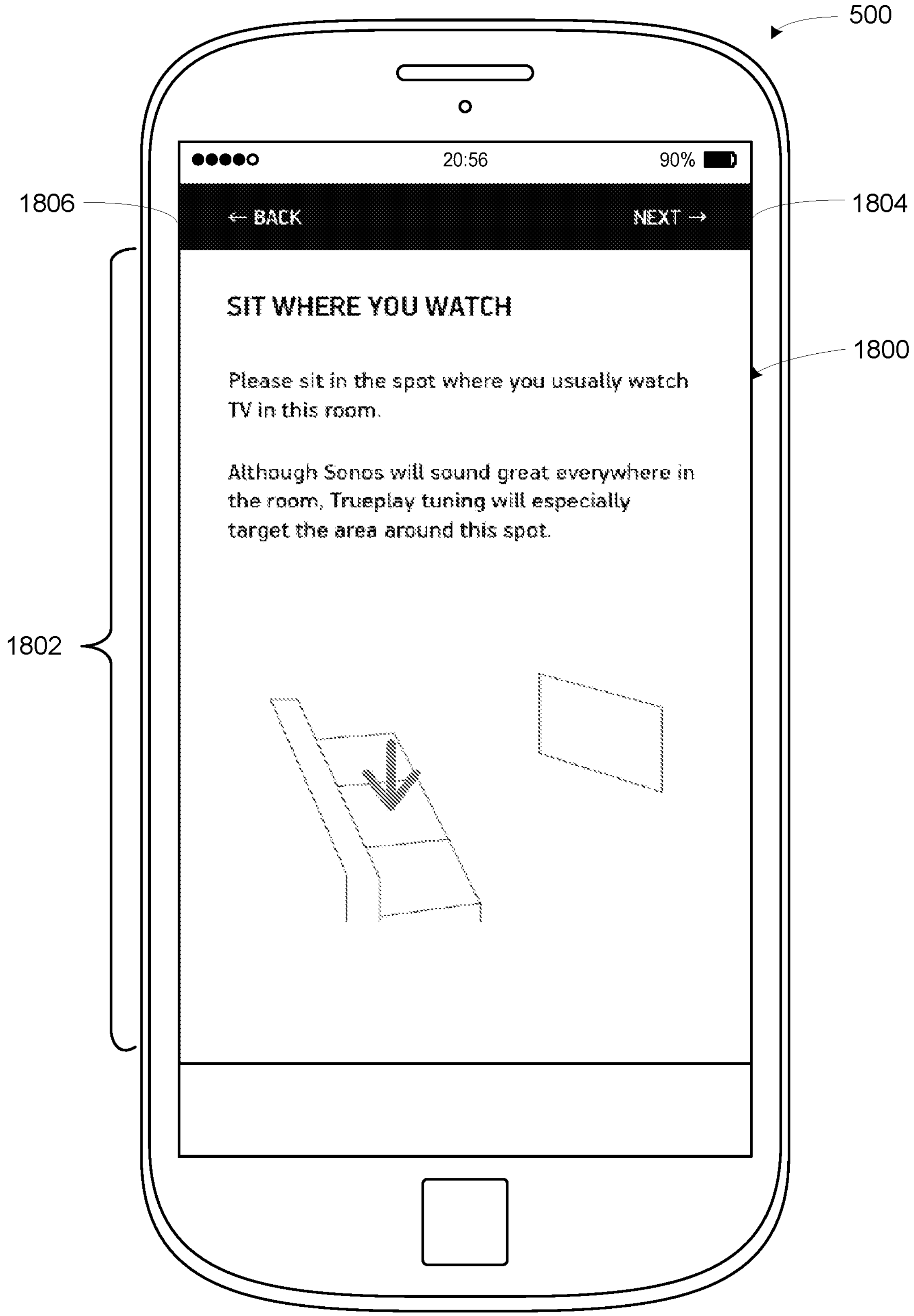
FIG. 18 shows a smartphone that is displaying an example control interface, according to an example implementation.

To illustrate such prompts, in FIG. 18, smartphone 500 is displaying control interface 1800 which includes graphical region 1802. Graphical region 1802 prompts to move to a particular location (i.e., where the user will usually watch TV in the room). Such a prompt may be displayed to guide a user to begin the calibration sequence in a preferred location. Control interface 1800 also includes selectable controls 1804 and 1806, which respectively advance and step backward in the calibration sequence.

Figure 19:
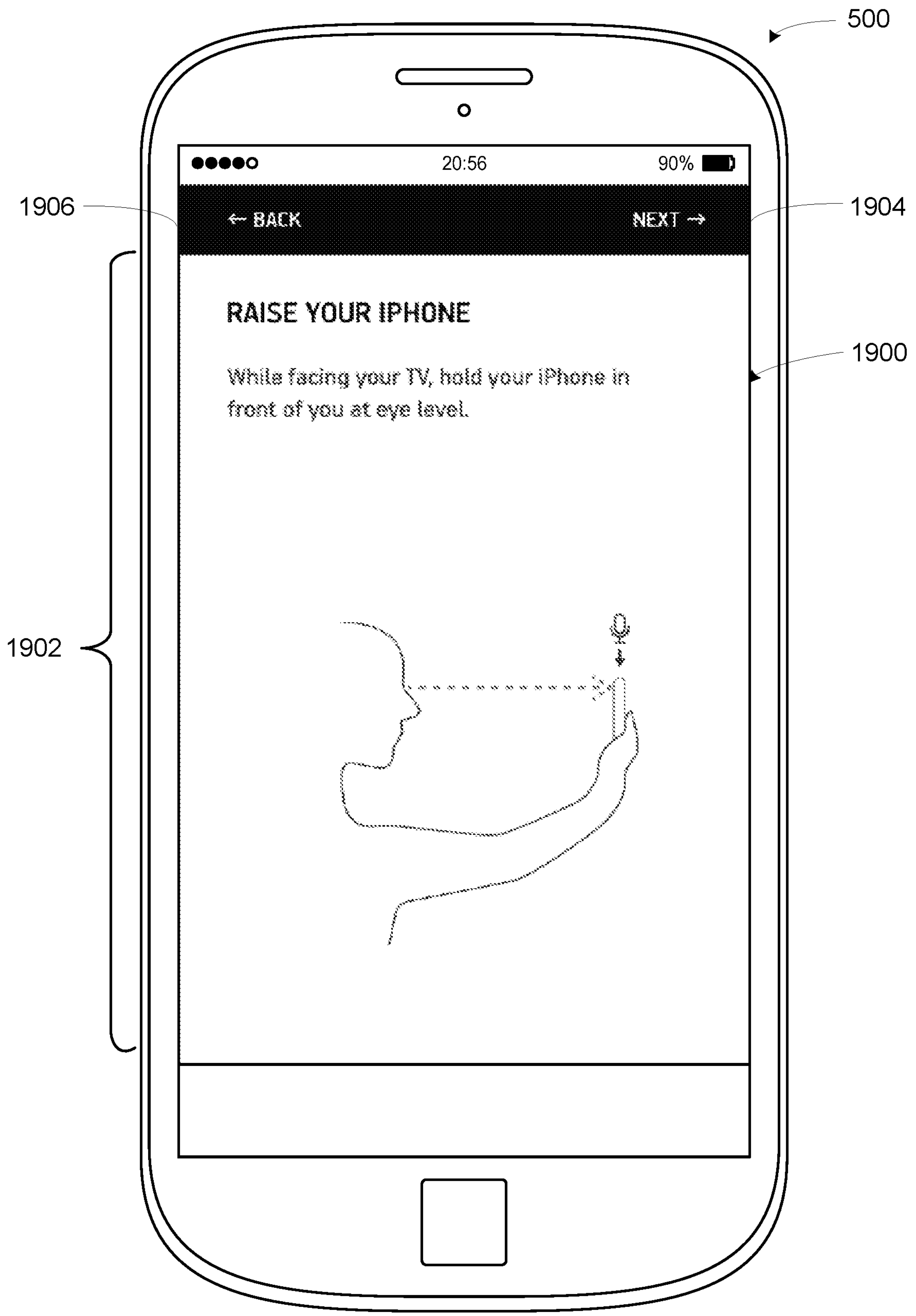
FIG. 19 shows a smartphone that is displaying an example control interface, according to an example implementation.

FIG. 19 depicts smartphone 500 displaying control interface 1900 which includes graphical region 1902. Graphical region 1902 prompts the user to raise the recording device to eye level. Such a prompt may be displayed to guide a user to position the phone in a position that facilitates measurement of the calibration sounds. Control interface 1800 also includes selectable controls 1904 and 1906, which respectively advance and step backward in the calibration sequence.

Figure 20:
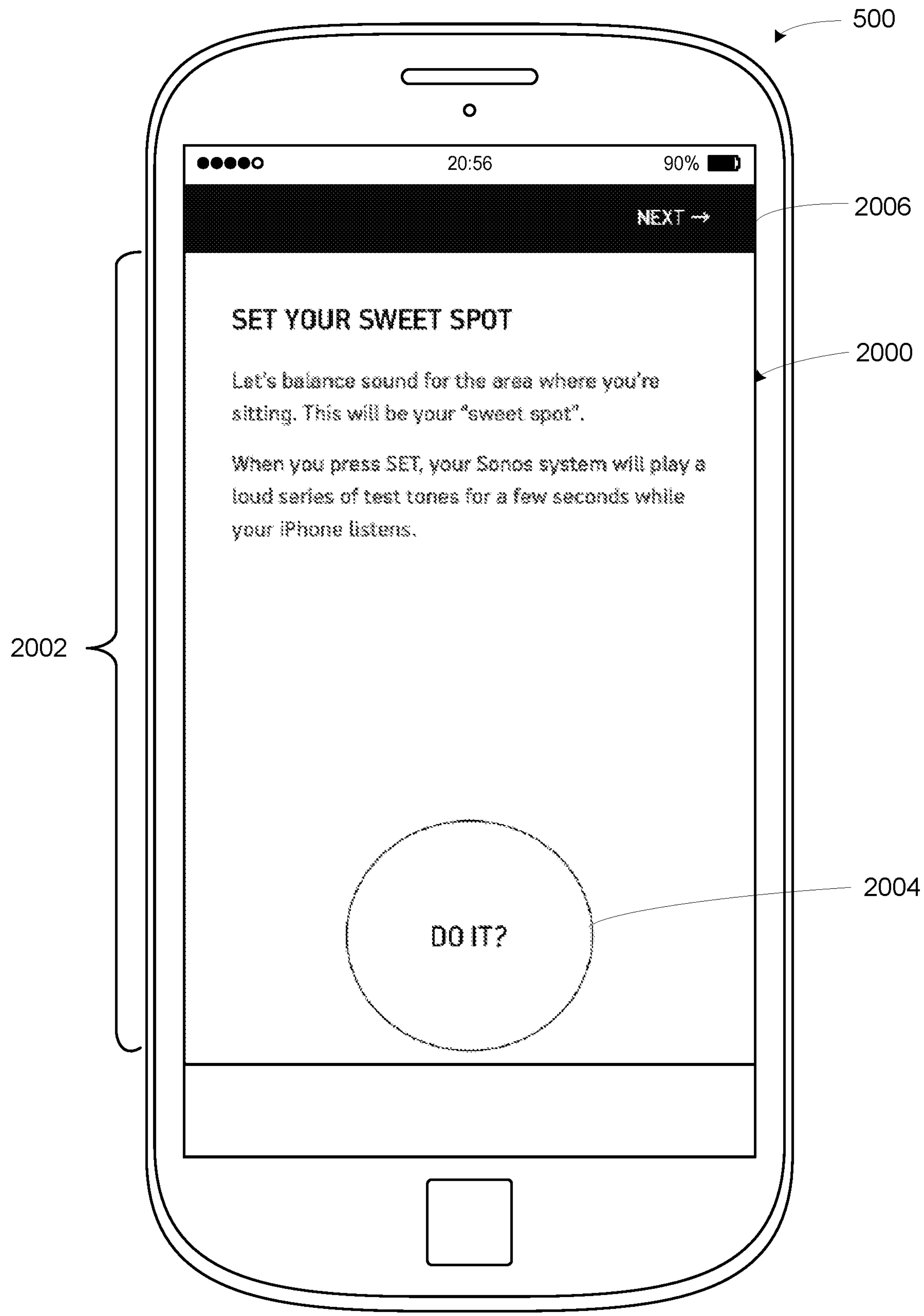
FIG. 20 shows a smartphone that is displaying an example control interface, according to an example implementation.

Next, FIG. 20 depicts smartphone 500 displaying control interface 2000 which includes graphical region 2002. Graphical region 2002 prompts the user to "set the sweet spot." (i.e., a preferred location within the environment). After smartphone 500 detects selection of selectable control 2004, smartphone 500 may begin measuring the calibration sound at its current location (and perhaps also instruct one or more playback devices to output the calibration sound). As shown, control interface 2000 also includes selectable control 2006, which advances the calibration sequence (e.g., by causing smartphone to begin measuring the calibration sound at its current location, as with selectable control 2004).

Figure 21:
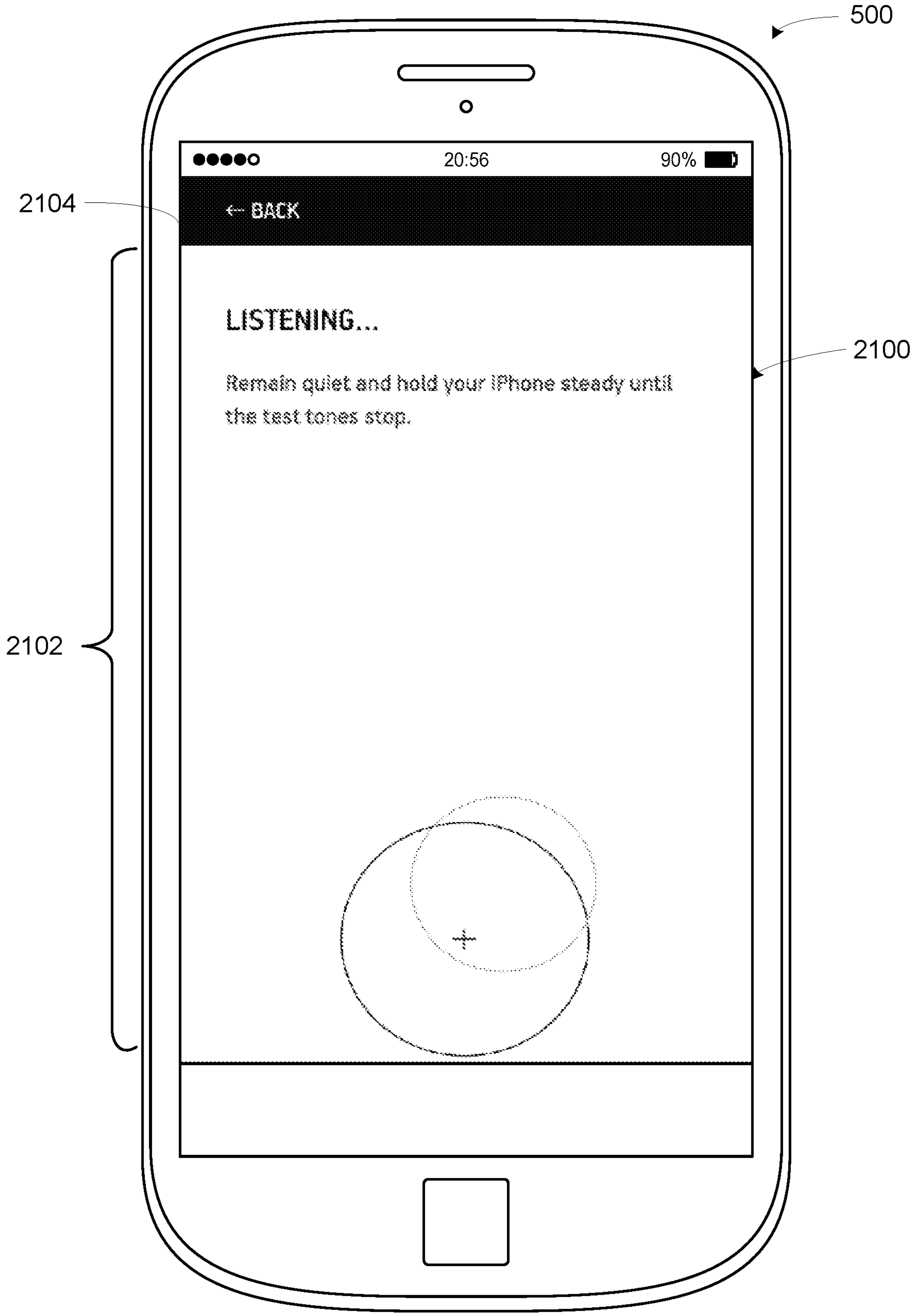
FIG. 21 shows a smartphone that is displaying an example control interface, according to an example implementation.

In FIG. 21, smartphone 500 is displaying control interface 2100 which includes graphical region 2102. Graphical region 2102 indicates that smartphone 500 is measuring the calibration sounds. Control interface 2100 also includes selectable control 2004, which step backwards in the calibration sequence.

Figure 22:
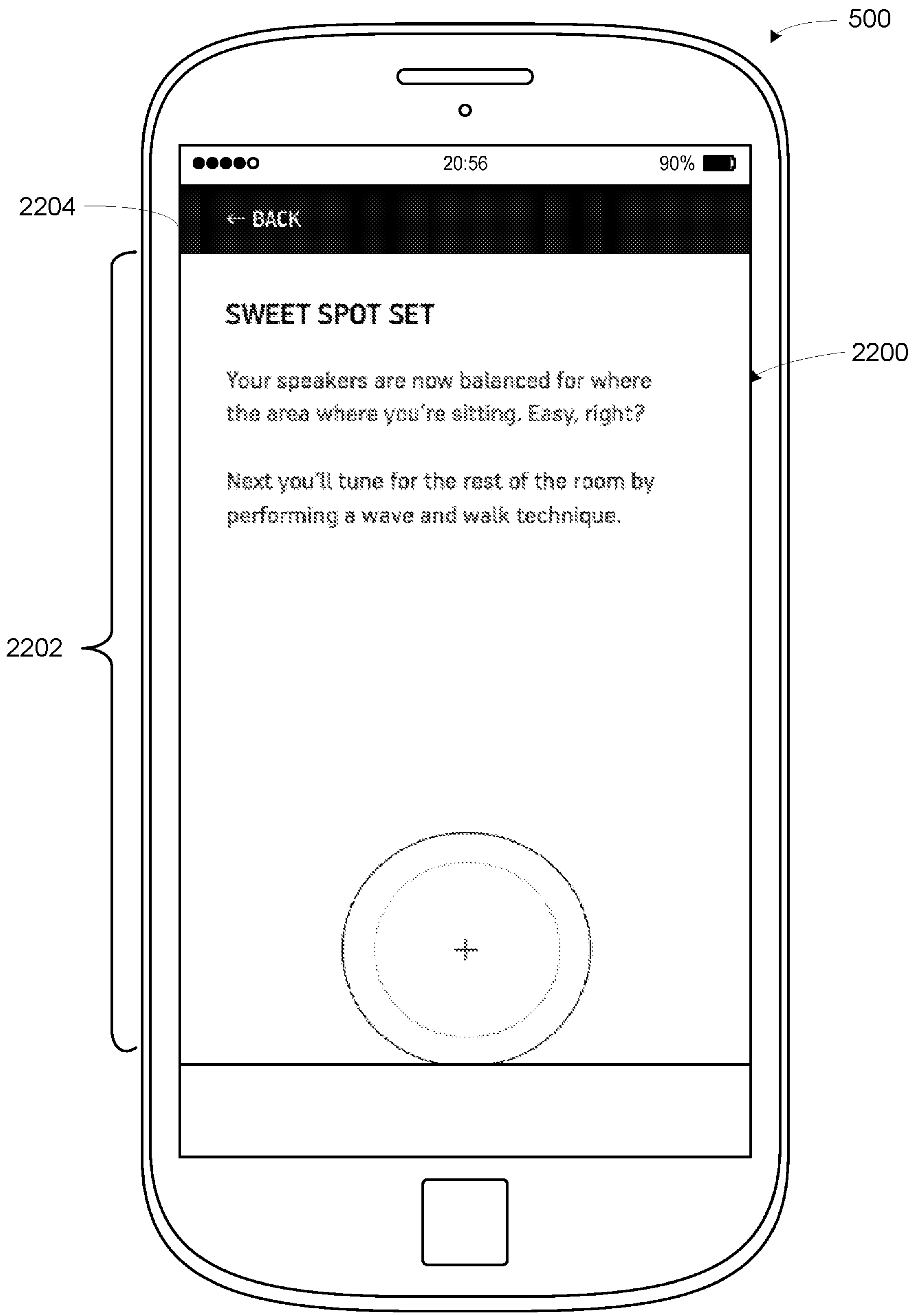
FIG. 22 shows a smartphone that is displaying an example control interface, according to an example implementation.

FIG. 22 depicts smartphone 500 displaying control interface 2200 which includes graphical region 2202. Graphical region 2202 indicates that smartphone 500 has measured the calibration sounds and that the rest of the room will be tuned using a wave and walk technique (i.e., movement through the environment). Smartphone 500 may subsequently prompt for movement through the environment, perhaps by displaying a control interface such as control interface 1700. As shown, control interface 2200 also includes selectable control 2204, which steps backward in the calibration sequence.

As indicated above, example interfaces are described in U.S. patent application Ser. No. 14/696,014 filed Apr. 24, 2015, entitled "Speaker Calibration," and U.S. patent application Ser. No. 14/826,873 filed Aug. 14, 2015, entitled "Speaker Calibration User Interface," which are incorporated herein in their entirety.

b. Detect Calibration Sound(s)

Referring again to FIG. 16, at block 1604, implementation 1600 involves detecting one or more calibration sounds. For instance, the recording device may detect calibration sounds emitted by the one or more playback device during the calibration sequence. Example techniques to detect calibration sounds are described above in connection with block 1302 of implementation 1300.

c. Determine Calibration

In FIG. 16, at block 1606, implementation 1600 involves determining a calibration. For example, a processing device (e.g., the recording device) may determine two or more calibrations for the one or more playback devices (e.g., a first and a second calibration). Examples techniques to determine calibrations are described with respect to block 1304 of implementation 1300.

d. Send Calibrations

At block 1608, implementation 1600 involves sending one or more calibrations. For instance, the processing device may send two or more calibrations to the one or more playback devices via a network interface. The one or more playback devices may store the calibrations and apply a given one of the calibrations to playback. In embodiments in which the playback devices are configured as one or more zones, the processing device may send the calibration(s) to the zone, perhaps to be maintained by a given playback device of the zone or a device that the zone is communicatively coupled to. In some cases, the processing device may maintain the calibrations and send one or more of the calibrations to the one or more playback devices, perhaps upon request (e.g., when the playback device is applying a particular calibration). Other examples are possible as well.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising: detecting, via one or more microphones during a calibration sequence: first samples including at least a portion of one or more calibration sounds as emitted by one or more playback devices of a zone while the one or more microphones are in motion in a given environment; and second samples of the one or more calibrations sounds while the one or more microphones are stationary at one or more particular locations within the given environment; determining first and second calibrations for the one or more playback devices based on at least the first and second samples, respectively; and causing at least one of the first and second calibrations to be applied to playback by the one or more playback devices.

(Feature 2) The method of feature 1, wherein, when applied to playback by the one or more playback devices: the first calibration is configured to offset acoustic characteristics of the given environment, and the second calibration is configured to offset acoustic characteristics of the given environment and to calibrate the one or more playback devices to the one or more particular locations.

(Feature 3) The method of feature 1 or 2, wherein the second calibration is determined based on a combination of the first and second samples.

(Feature 4) The method of feature 2 or 3, wherein calibrating the one or more playback devices to the one or more particular locations comprises one or more of: offsetting propagation delay from the one or more playback devices to the one or more particular locations, and adjusting respective gains of the one or more playback devices based on respective distances from the one or more playback devices to the one or more particular locations.

(Feature 5) The method of feature 4, wherein: the one or more playback devices comprise a stereo pair, and adjusting respective gains comprises balancing gain of the stereo pair to the one or more particular locations.

(Feature 6) The method of any preceding feature, wherein applying at least one of the first and second calibrations comprises determining one of the first and second calibrations to apply to playback based on at least one of: a determination that media content being played back consists of audio; a determination that media content being played back comprises audio and video; a determination that media content being played back is received via a physical input of a given playback device, a determination that media content being played back is from a network source; a determination that one or more listeners are located in the one or more particular locations; and a determination that a plurality of listeners are located in the given environment; and a determination that the zone is joined into a zone group with a second zone of the media playback system comprising one or more additional playback devices.

(Feature 7) A control device comprising: a graphical interface; one or more microphones; and a processor configured for: causing the graphical interface to display one or more prompts to instruct a user to move the control device within a given environment during a calibration sequence of a given zone that comprises one or more playback devices; performing the method of one of features 1 to 6, wherein causing at least one of the first and second calibrations to be applied comprises sending at least one of the first and second calibrations to the zone.

(Feature 8) The control device of feature 7, wherein recording the first samples comprises: detecting, via one or more sensors, that the control device is in motion; and recording, as respective first samples, one or more first frames corresponding to respective periods of a periodic calibration tone of the emitted calibration sounds.

(Feature 9) The control device of feature 7 or 8, wherein: the control device comprises one or more sensors; and recording the second samples comprises: detecting, via the one or more sensors, that control device is stationary for a threshold period of time at a given location of the one or more particular locations; and while the control device is stationary, recording, as respective second samples, one or more second frames corresponding to respective periods of a periodic calibration tone of the emitted calibration sounds.

(Feature 10) The control device of one of features 7 to 9, wherein the displayed one or more prompts comprise: a prompt to move the control device continuously through the given environment for one or more first portions of the calibration sequence; and a prompt to remain stationary with the control device at the one or more particular locations within the given environment for one or more second portions of the calibration sequence.

(Feature 11) A processor configured for use with the control device of one of features 7 to 10.

(Feature 12) A system comprising: a control device according to one of features 7 to 10 and at least one playback device comprising one or more processors configured for: receiving first and second calibrations; and applying the one of the first and second calibrations to playback by the playback device based on a detected given playback state of the playback device.

(Feature 13) The system of feature 12, wherein the at least one playback device is configured to detect a playback state that is at least one of: media content being played back consists of audio; media content being played back comprises audio and video; media content being played back is received via physical input of a given playback device, media content being played back is from a network source; one or more listeners are located in the one or more particular locations; and a plurality of listeners are located in the given environment; and a zone comprising the playback device is joined into a zone group with a second zone one or more additional playback devices.

(Feature 14) A playback device for use with the system of feature 12 or 13.

As noted above, example techniques may involve determining two or more calibrations and/or applying a given calibration to playback by one or more playback devices. A first implementation may include detecting, via one or more microphones, at least a portion of one or more calibration sounds as emitted by one or more playback devices of a zone during a calibration sequence. Such detecting may include recording first samples of the one or more calibrations sounds while the one or more microphones are in motion through a given environment and recording second samples of the one or more calibrations sounds while the one or more microphones are stationary at one or more particular locations within the given environment. The implementation may also include determining a first calibration for the one or more playback devices based on at least the first samples of the one or more calibrations sounds and determining a second calibration for the one or more playback devices based on at least the second samples of the one or more calibrations sounds. The implementation may further include applying at least one of (a) the first calibration or (b) the second calibration to playback by the one or more playback devices.

A second implementation may include displaying, via a graphical interface one or more prompts to move the control device within a given environment during a calibration sequence of a given zone that comprises one or more playback devices and detecting, via one or more microphones, at least a portion of one or more calibration sounds as emitted by the one or more playback devices during the calibration sequence. Such detecting may include recording first samples of the one or more calibrations sounds while the one or more microphones are in motion through the given environment and recording second samples of the one or more calibrations sounds while the one or more microphones are stationary at one or more particular locations within the given environment. The implementation may also include determining a first calibration for the one or more playback devices based on at least the first samples of the one or more calibrations sounds and determining a second calibration for the one or more playback devices based on at least the second samples of the one or more calibrations sounds. The implementation may further include sending at least one of the first calibration and the second calibration to the zone.

A third implementation includes a playback device receiving (i) a first calibration and (ii) a second calibration, detecting that the playback device is playing back media content in a given playback state, and applying the one of (a) the first calibration or (b) the second calibration to playback by the playback device based on the detected given playback state.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:

a network interface;

at least one processor; and at least one non-transitory computer-readable medium comprising program instructions that are executable by the at least one processor such that the first playback device is configured to:

stream, via the network interface from at least one server, data representing multiple media items;

select respective calibrations for media items of the multiple media items from among multiple stored calibrations based on respective types of the media items, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a first calibration for a first media item of the multiple media items when the type of the first media item comprises primarily pre-recorded spoken dialog; and select a second calibration for a second media item of the multiple media items when the type of the second media item consists of music;

before playing back each media item, cause the first playback device and a second playback device to apply the selected calibration for the media item, wherein application of the selected calibration modifies respective equalizations of the first playback device and the second playback device; and while the selected calibration is applied, play back the respective media item; and cause, via the network interface, the second playback device to play back the respective media item synchronously with playback of the respective media item by the first playback device.

2. The first playback device of claim 1, further comprising at least one audio amplifier, and wherein the program instructions that are executable by the at least one processor such that the first playback device is configured to play back the respective media item comprise program instructions that are executable by the at least one processor such that the first playback device is configured to:

play back the respective media item via the at least one audio amplifier.

3. The first playback device of claim 2, further comprising at least one audio transducer, and wherein the program instructions that are executable by the at least one processor such that the first playback device is configured to play back the respective media item comprise program instructions that are executable by the at least one processor such that the first playback device is configured to:

play back the respective media item via the at least one audio amplifier and the at least one audio transducer.

4. The first playback device of claim 1, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a particular first calibration that at least partially offsets differences in relative positions between the first playback device and the second playback device relative to one or more listener locations.

5. The first playback device of claim 1, wherein the first media item is an audio track of a video.

6. The first playback device of claim 1, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a particular second calibration that at least partially offsets acoustic characteristics of an environment in which the first playback device and the second playback device are located.

7. The first playback device of claim 1, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a particular calibration for a particular media item of the multiple media items when the type of the particular media item comprises audio received by the first playback device from a particular source.

8. The first playback device of claim 7, wherein the particular source is a particular type of streaming audio service.

9. At least one non-transitory computer-readable medium comprising program instructions that are executable by at least one processor such that a first playback device is configured to:

stream, via a network interface from at least one server, data representing multiple media items;

select respective calibrations for media items of the multiple media items from among multiple stored calibrations based on respective types of the media items, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a first calibration for a first media item of the multiple media items when the type of the particular first media item comprises primarily pre-recorded spoken dialog; and select a second calibration for a second media item of the multiple media items when the type of the particular second media item consists of music;

before playing back each media item, cause the first playback device and a second playback device to apply the selected calibration for the media item, wherein application of the selected calibration modifies respective equalizations of the first playback device and the second playback device;

while the selected calibration is applied, play back the respective media item; and cause, via the network interface, the second playback device to play back the respective media item synchronously with playback of the respective media item by the first playback device.

10. The at least one non-transitory computer-readable medium of claim 9, wherein the first playback device comprises at least one audio amplifier, and wherein the program instructions that are executable by the at least one processor such that the first playback device is configured to play back the respective media item comprise program instructions that are executable by the at least one processor such that the first playback device is configured to:

play back the respective media item via the at least one audio amplifier.

11. The at least one non-transitory computer-readable medium of claim 10, wherein the first playback device comprises at least one audio transducer, and wherein the program instructions that are executable by the at least one processor such that the first playback device is configured to play back the respective media item comprise program instructions that are executable by the at least one processor such that the first playback device is configured to:

play back the respective media item via the at least one audio amplifier and the at least one audio transducer.

12. The at least one non-transitory computer-readable medium of claim 9, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a particular first calibration that at least partially offsets differences in relative positions between the first playback device and the second playback device relative to one or more listener locations.

13. The at least one non-transitory computer-readable medium of claim 9, wherein the first media item is an audio track of a video.

14. The at least one non-transitory computer-readable medium of claim 9, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a particular second calibration that at least partially offsets acoustic characteristics of an environment in which the first playback device and the second playback device are located.

15. The at least one non-transitory computer-readable medium of claim 9, wherein the program instructions that are executable by the at least one processor such that the first playback device is configured to select the respective calibrations for the media items of the multiple media items from among the multiple stored calibrations based on the respective types of the media items comprise program instructions that are executable by the at least one processor such that the first playback device is configured to:

select a particular calibration for a particular media item of the multiple media items when the type of the particular media item comprises audio received by the first playback device from a particular source.

16. The at least one non-transitory computer-readable medium of claim 15, wherein the particular source is a particular type of streaming audio service.

17. A method comprising:

streaming, via a network interface of a first playback device from at least one server, data representing multiple media items;

selecting, via at least one processor of the first playback device, respective calibrations for media items of the multiple media items from among multiple stored calibrations based on respective types of the media items, wherein selecting the respective calibrations for the media items of the multiple media items from among the multiple stored calibrations based on the respective types of the media items comprises:

selecting a first calibration for a first media item of the multiple media items when the type of the first media item comprises primarily pre-recorded spoken dialog; and selecting a second calibration for a second media item of the multiple media items when the type of the second media item consists of music;

before playing back each media item, causing the first playback device and a second playback device to apply the selected calibration for the media item, wherein application of the selected calibration modifies respective equalizations of the first playback device and the second playback device;

while the selected calibration is applied, playing back the respective media item via the first playback device; and causing, via the network interface, the second playback device to play back the respective media item synchronously with playback of the respective media item by the first playback device.

18. The method of claim 17, wherein the first playback device comprises at least one audio amplifier, and wherein playing back the respective media item comprises:

playing back the respective media item via the at least one audio amplifier.

19. The method of claim 18, wherein the first playback device comprises at least one audio transducer, and wherein playing back the respective media item comprises:

playing back the respective media item via the at least one audio amplifier and the at least one audio transducer.

20. The method of claim 17, wherein selecting the respective calibrations for the media items of the multiple media items from among the multiple stored calibrations based on the respective types of the media items comprises:

selecting a particular first calibration that at least partially offsets differences in relative positions between the first playback device and the second playback device relative to one or more listener locations.

* * * * *